(12) United States Patent
Gray et al.

(10) Patent No.: US 12,124,245 B2
(45) Date of Patent: *Oct. 22, 2024

(54) SOURCE AND SENSOR OPERATIVE ELECTROMAGNETIC WAVE AND/OR RF SIGNAL DEVICE

(71) Applicant: SIGMASENSE, LLC., Wilmington, DE (US)

(72) Inventors: Patrick Troy Gray, Cedar Park, TX (US); Gerald Dale Morrison, Redmond, WA (US); Daniel Keith Van Ostrand, Leander, TX (US); Richard Stuart Seger, Jr., Belton, TX (US)

(73) Assignee: SIGMASENSE, LLC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,352

(22) Filed: Mar. 30, 2023

(65) Prior Publication Data

US 2023/0236579 A1 Jul. 27, 2023

Related U.S. Application Data

(63) Continuation of application No. 17/733,014, filed on Apr. 29, 2022, now Pat. No. 11,644,820, which is a (Continued)

(51) Int. Cl.
*G05B 19/418* (2006.01)
*H04L 67/12* (2022.01)

(52) U.S. Cl.
CPC ....... *G05B 19/418* (2013.01); *G05B 19/4185* (2013.01); *H04L 67/12* (2013.01); *G05B 2219/31229* (2013.01)

(58) Field of Classification Search
CPC ........ G05B 19/418; G05B 2219/31229; G05B 19/4185; H04L 67/12
(Continued)

(56) References Cited

U.S. PATENT DOCUMENTS 5,437,178 A 8/1995 Esin et al.
6,218,972 B1 4/2001 Groshong
(Continued)

FOREIGN PATENT DOCUMENTS

CN 103995626 A 8/2014
CN 104182105 A 12/2014
(Continued)

OTHER PUBLICATIONS

European Patent Office; Extended European Search Report; Application No. 19853507.2; Jun. 13, 2023; 7 pgs.
(Continued)

*Primary Examiner* — Khai M Nguyen
(74) *Attorney, Agent, or Firm* — Garlick & Markison; Timothy W. Markison; Shayne X. Short

(57) ABSTRACT

An automated system includes transducers, at least one computing device, and at least one automated apparatus. The transducer(s) is/are driven and sensed using drive-sense circuit(s). A drives and senses drive and sense a transducer via a single line, generates a digital signal representative of a sensed analog feature to which the transducer is exposed, and transmits the digital signal to the computing device. The computing device receives digital signals from at least some of drive-sense circuits and process them in accordance with the automation process to produce an automated process command. The automated apparatus executes a portion of an automated process based on the automated process command.

20 Claims, 53 Drawing Sheets

Related U.S. Application Data continuation of application No. 17/537,888, filed on Nov. 30, 2021, now Pat. No. 11,681,275, which is a continuation of application No. 17/138,040, filed on Dec. 30, 2020, now Pat. No. 11,215,973, which is a continuation of application No. 16/113,275, filed on Aug. 27, 2018, now Pat. No. 10,895,867.

(58) Field of Classification Search
USPC .................................. 341/141, 155; 700/28
See application file for complete search history.

(56) References Cited

U.S. PATENT DOCUMENTS

| | | | |
|---|---|---|---|
| 6,665,013 | B1 | 12/2003 | Fossum et al. |
| 6,744,376 | B1* | 6/2004 | Pascalidis .............. G08C 15/00 340/870.11 |
| 7,209,868 | B2* | 4/2007 | Kuo ....................... G05B 15/02 702/126 |
| 7,476,233 | B1 | 1/2009 | Wiener et al. |
| 7,528,755 | B2 | 5/2009 | Hammerschmidt |
| 8,031,094 | B2 | 10/2011 | Hotelling |
| 8,089,289 | B1 | 1/2012 | Kremin et al. |
| 8,279,180 | B2 | 10/2012 | Hotelling et al. |
| 8,547,114 | B2 | 10/2013 | Kremin |
| 8,587,535 | B2 | 11/2013 | Oda et al. |
| 8,625,726 | B2 | 1/2014 | Kuan |
| 8,982,097 | B1 | 3/2015 | Kuzo et al. |
| 9,081,437 | B2 | 7/2015 | Oda |
| 9,201,547 | B2 | 12/2015 | Elias |
| 2003/0052657 | A1 | 3/2003 | Koernle et al. |
| 2005/0235758 | A1 | 10/2005 | Kowal et al. |
| 2011/0063154 | A1 | 3/2011 | Hotelling et al. |
| 2011/0298745 | A1 | 12/2011 | Souchkov |
| 2012/0278031 | A1 | 11/2012 | Oda |
| 2013/0278447 | A1 | 10/2013 | Kremin |
| 2014/0327644 | A1 | 11/2014 | Mohindra |
| 2015/0091847 | A1 | 4/2015 | Chang |
| 2015/0346889 | A1 | 12/2015 | Chen |
| 2016/0188049 | A1 | 6/2016 | Yang et al. |
| 2018/0157354 | A1 | 6/2018 | Blondin et al. |
| 2018/0275824 | A1 | 9/2018 | Li |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Baker; How delta-sigma ADCs work, Part 1; Analog Applications Journal; Oct. 1, 2011; 6 pgs.

Brian Pisani, Digital Filter Types in Delta-Sigma ADCs, Application Report SBAA230, May 2017, pp. 1-8, Texas Instruments Incorporated, Dallas, Texas.

* cited by examiner communication system 10 computing device 14 computing device 18

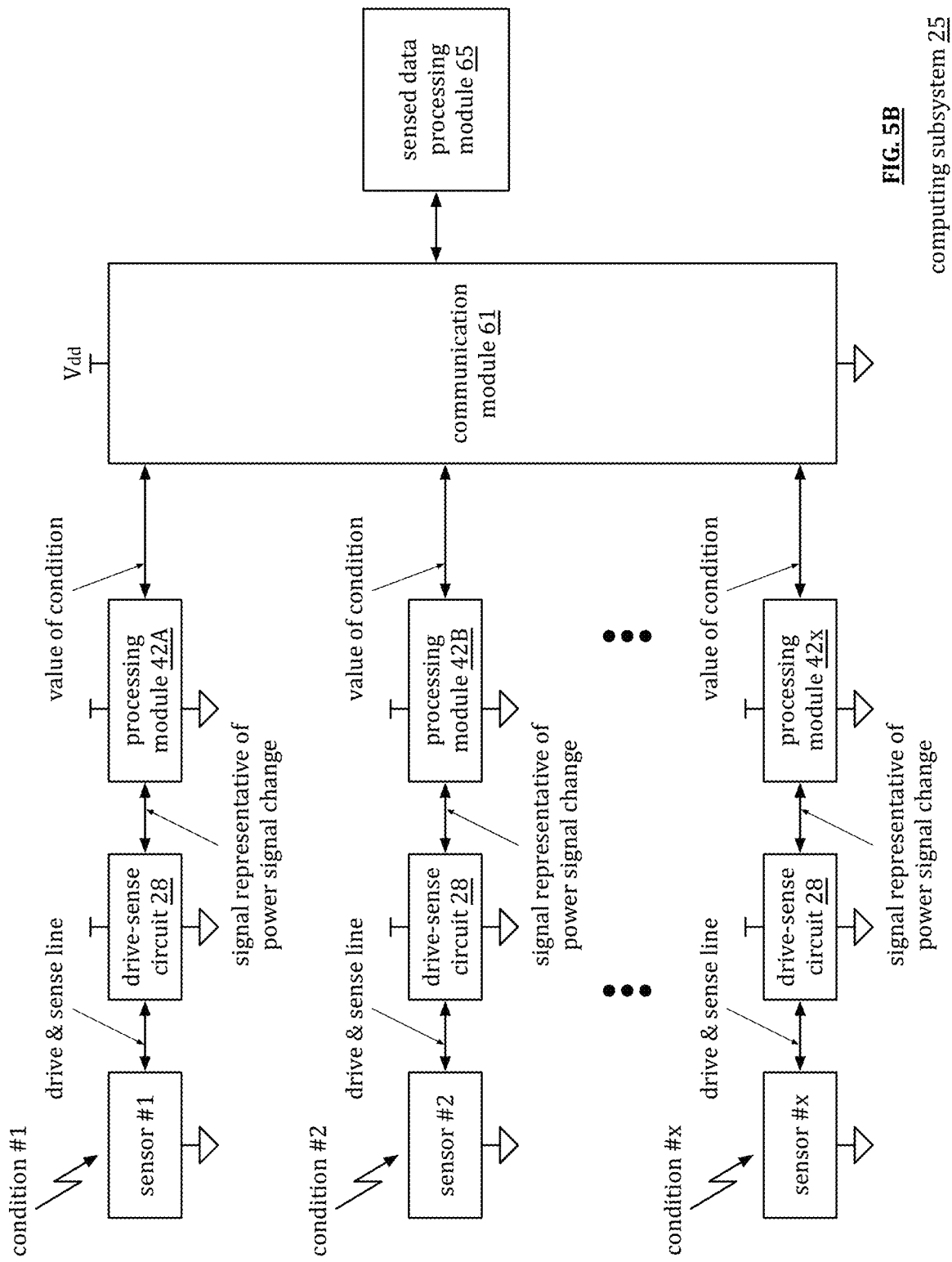
FIG. 5B computing subsystem 25 computing subsystem 25

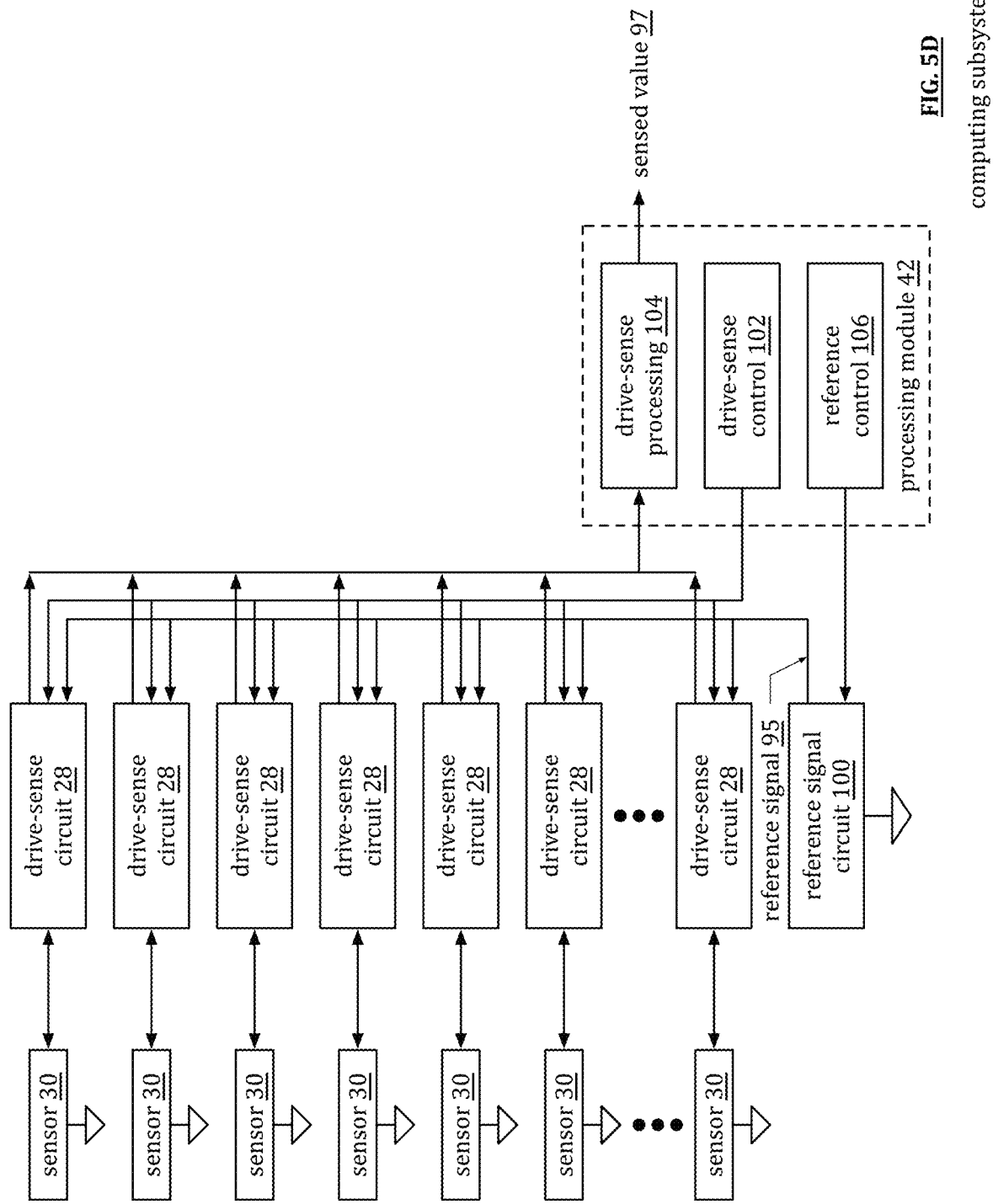

sensor graph power signal graph

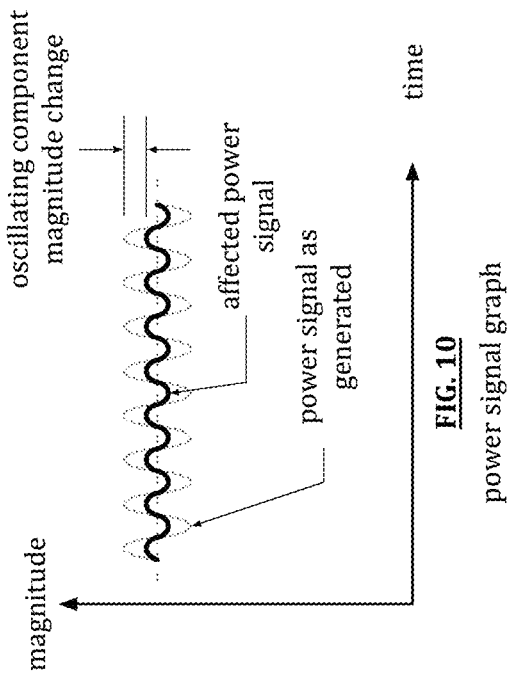
FIG. 10
power signal graph
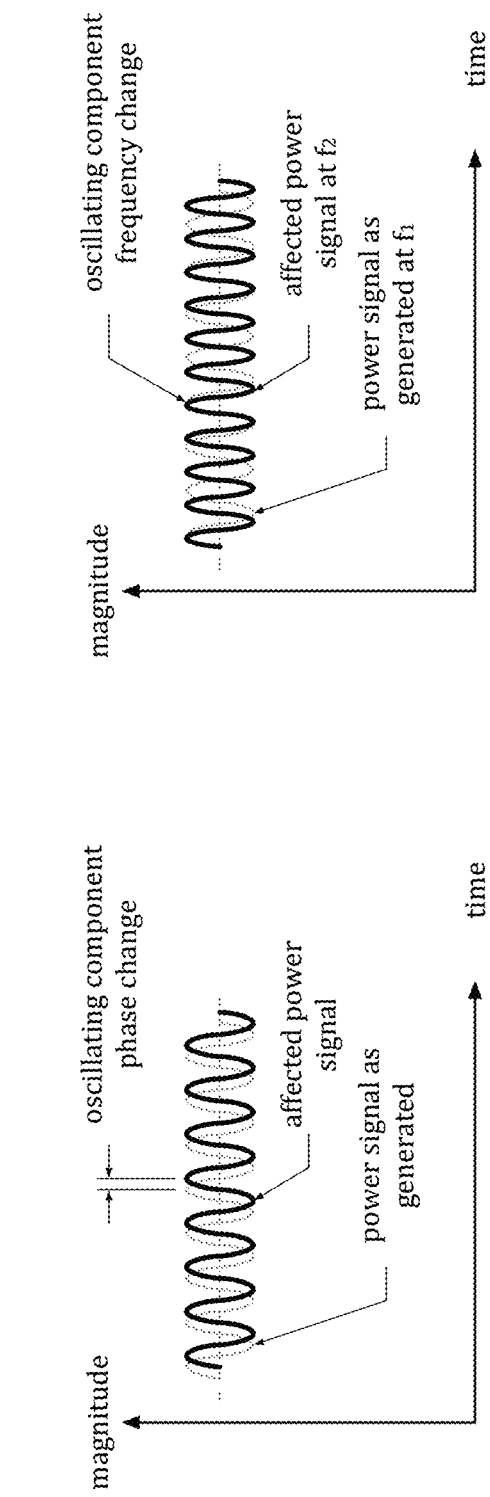
FIG. 11A
power signal graph
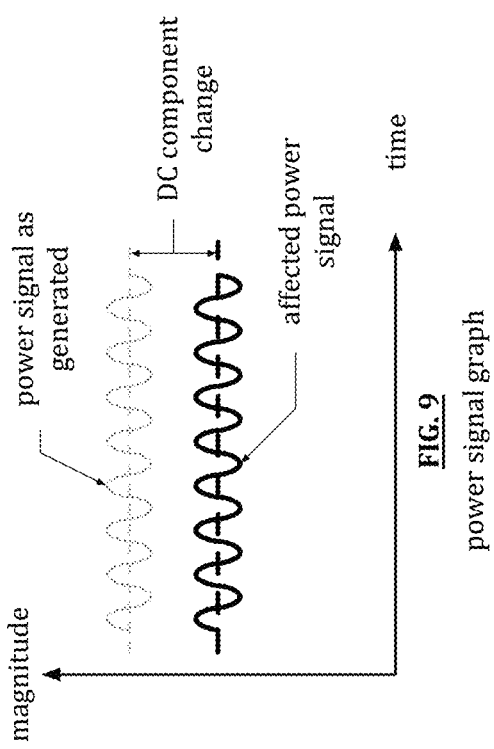
FIG. 9
power signal graph
FIG. 11
power signal graph

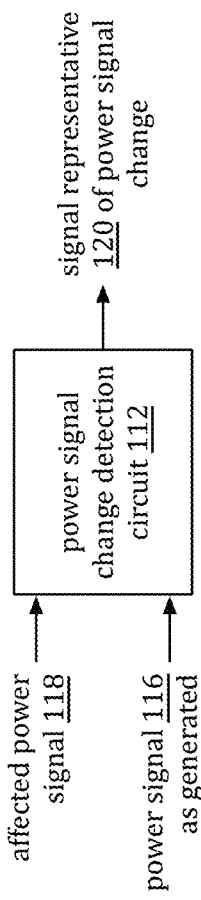
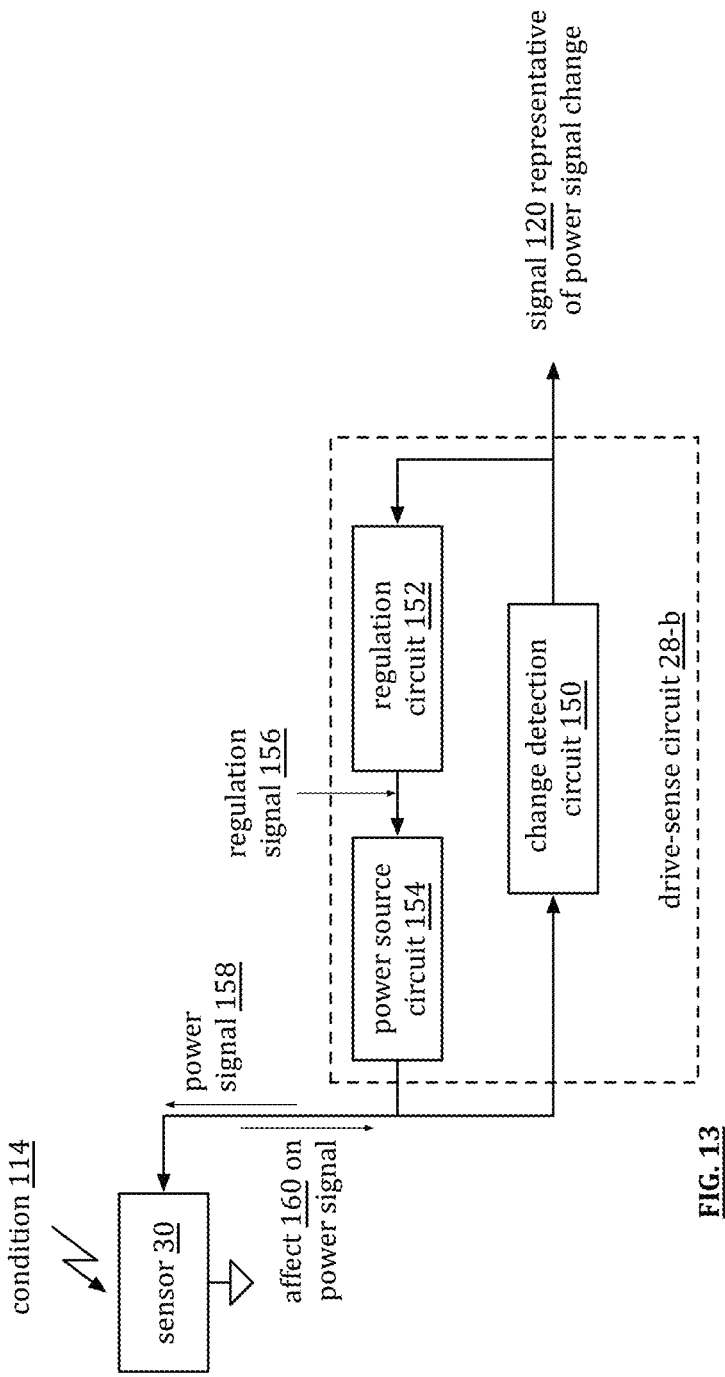

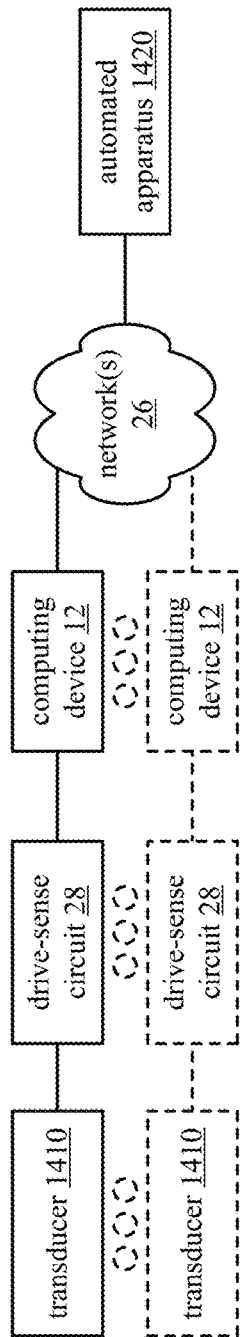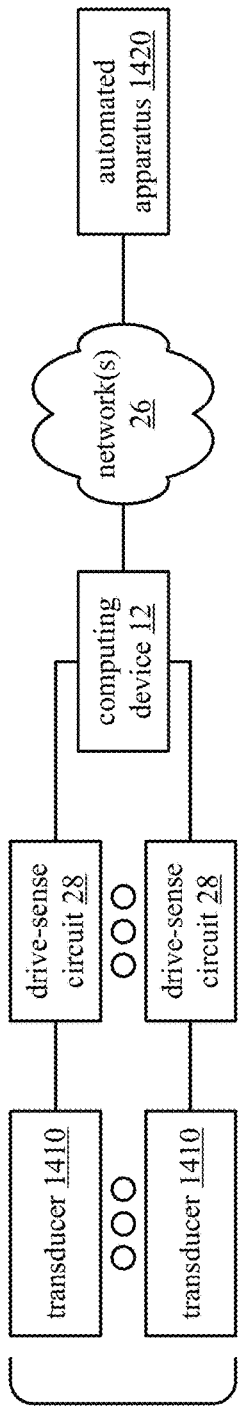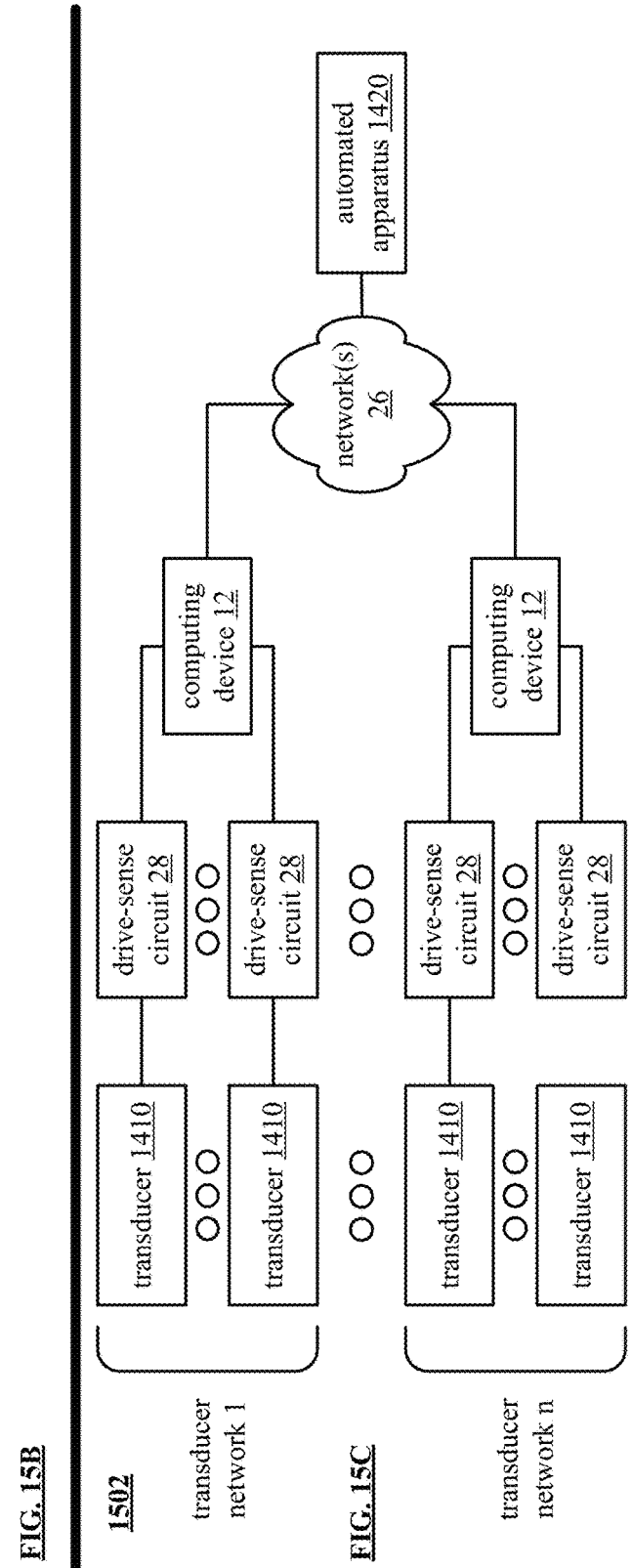
FIG. 15A
FIG. 15B
FIG. 15C

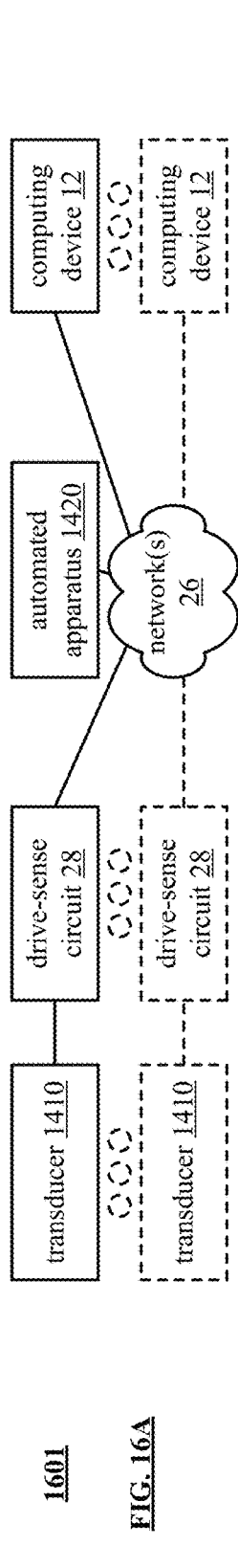
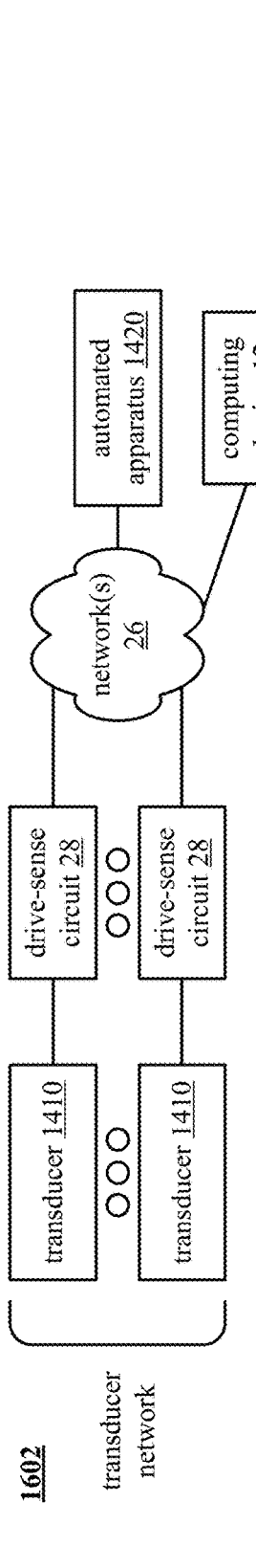
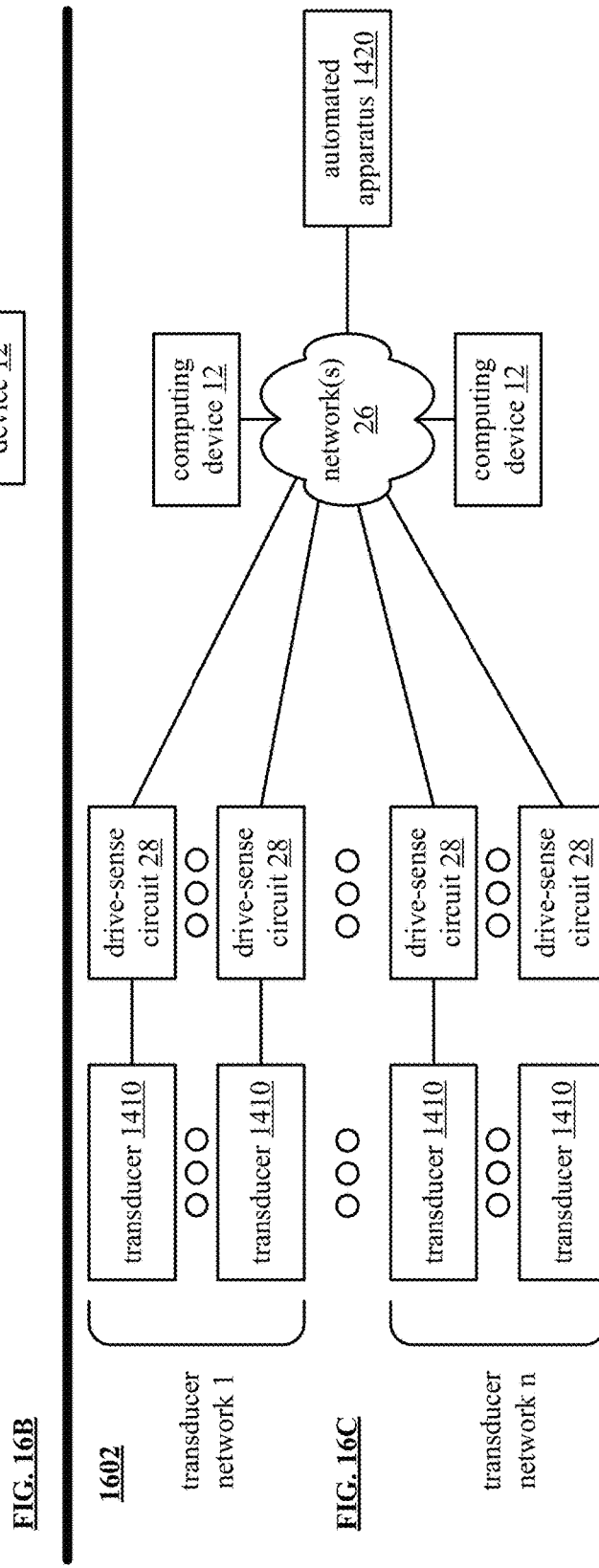
FIG. 16A
FIG. 16B
FIG. 16C

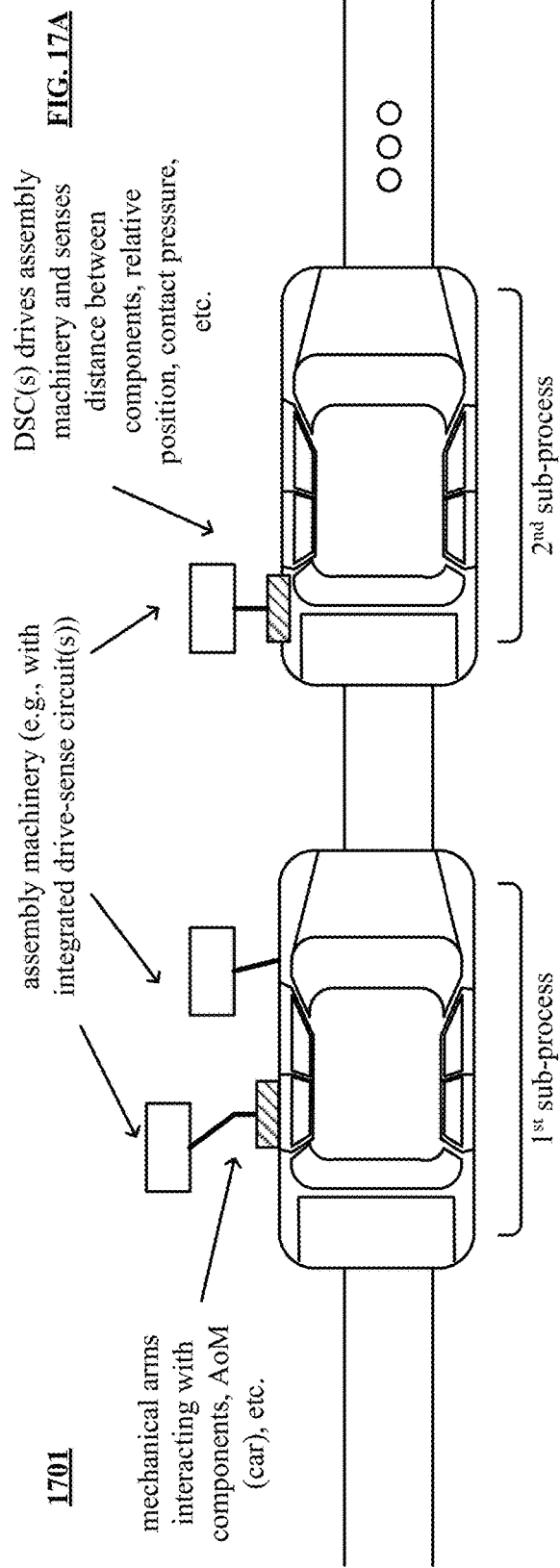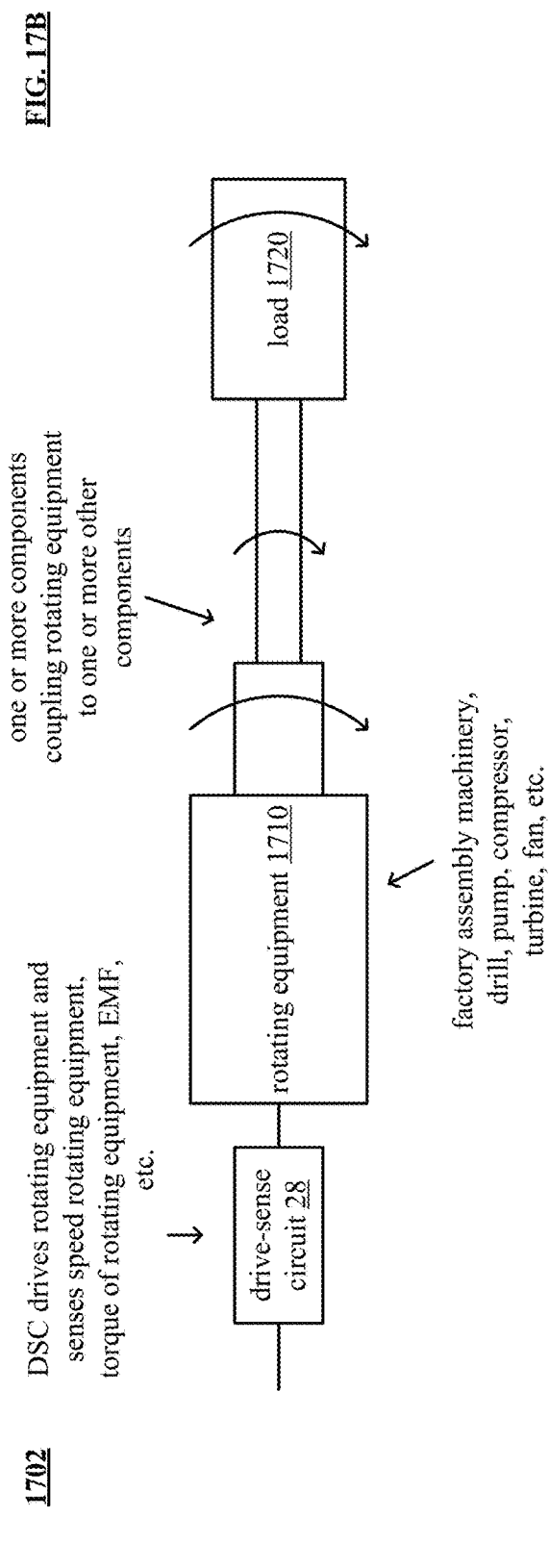

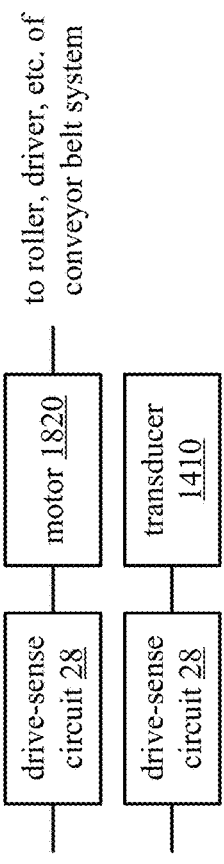
FIG. 18   1800
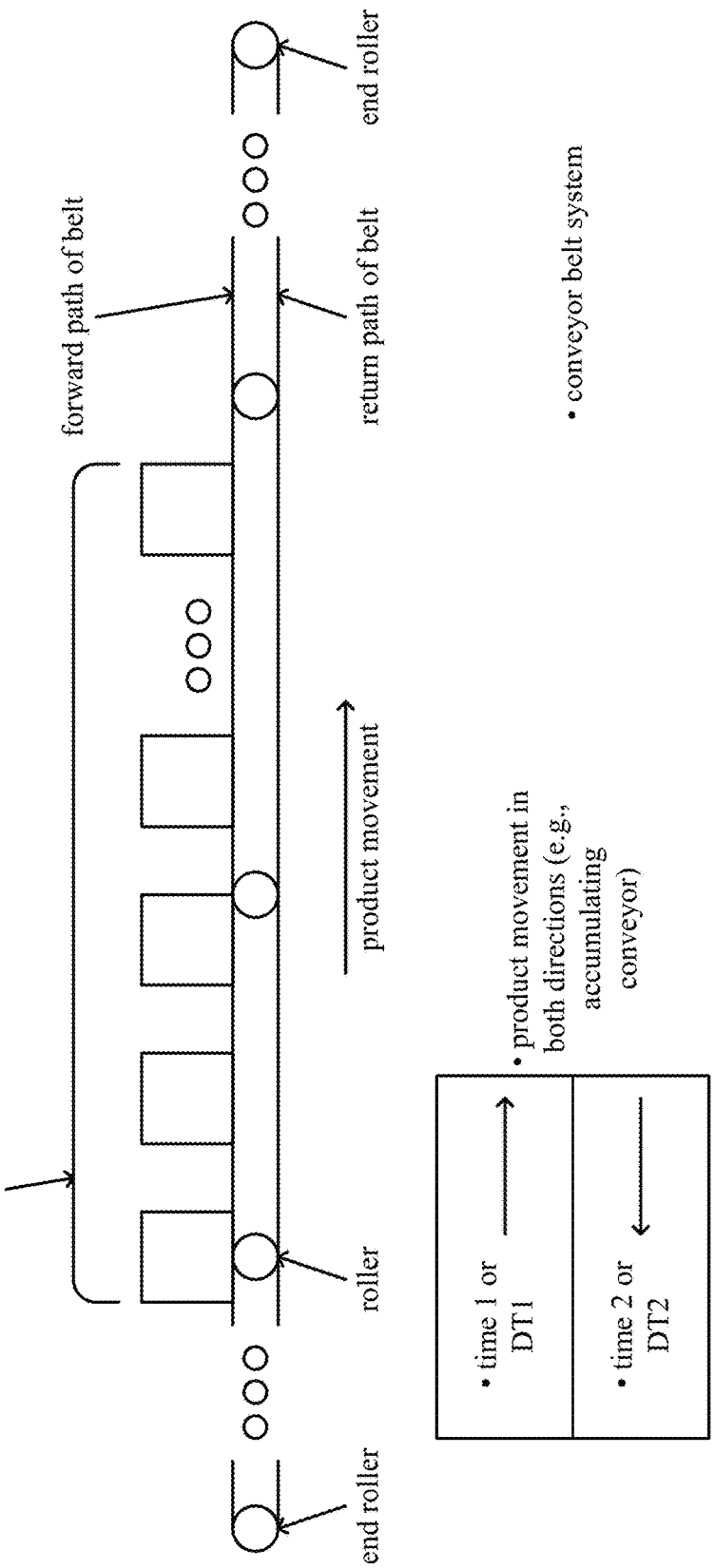

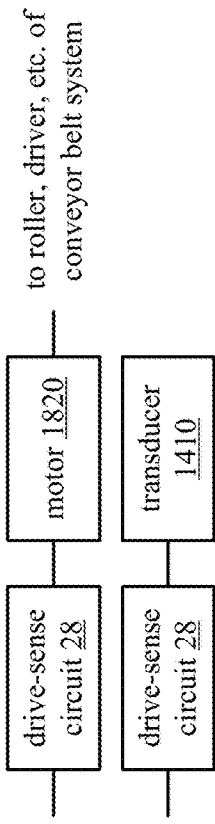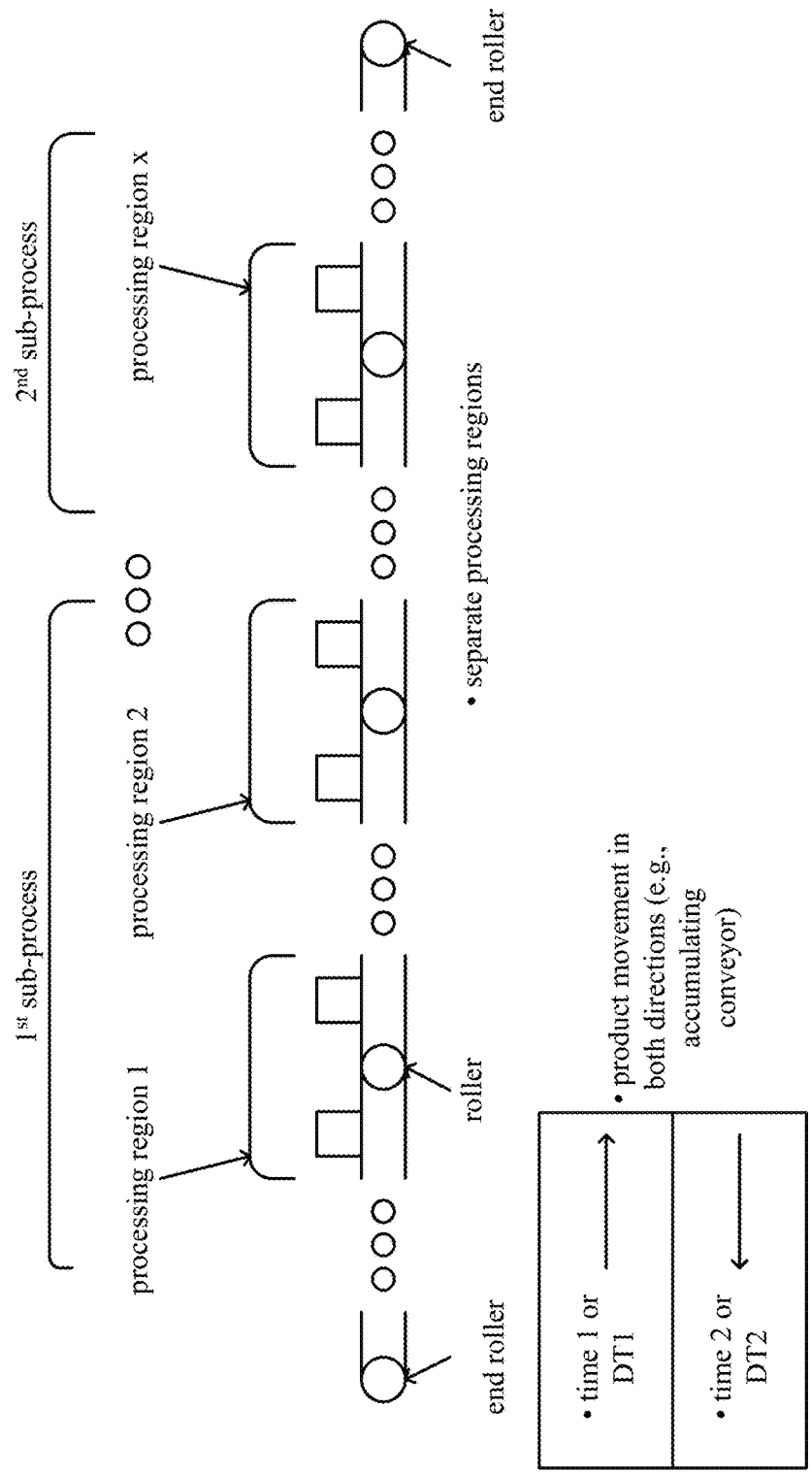
FIG. 19

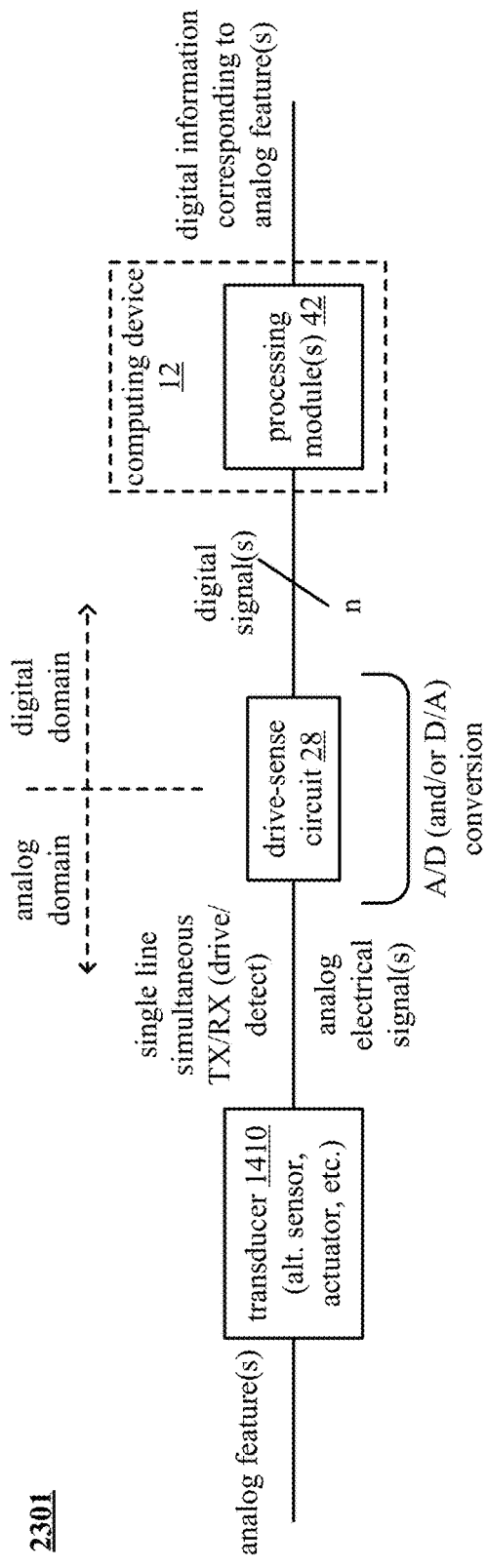
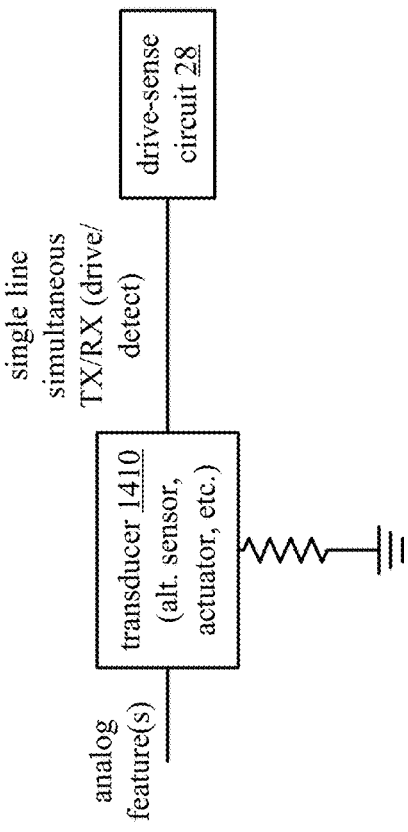

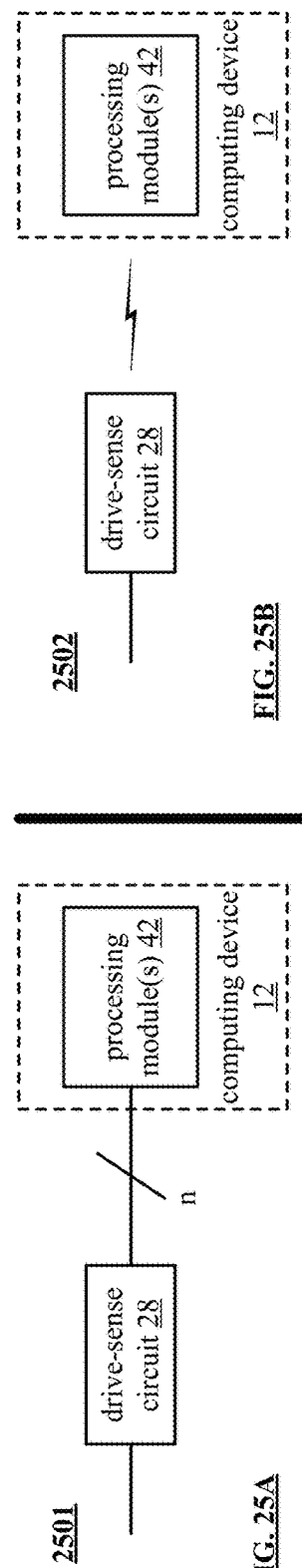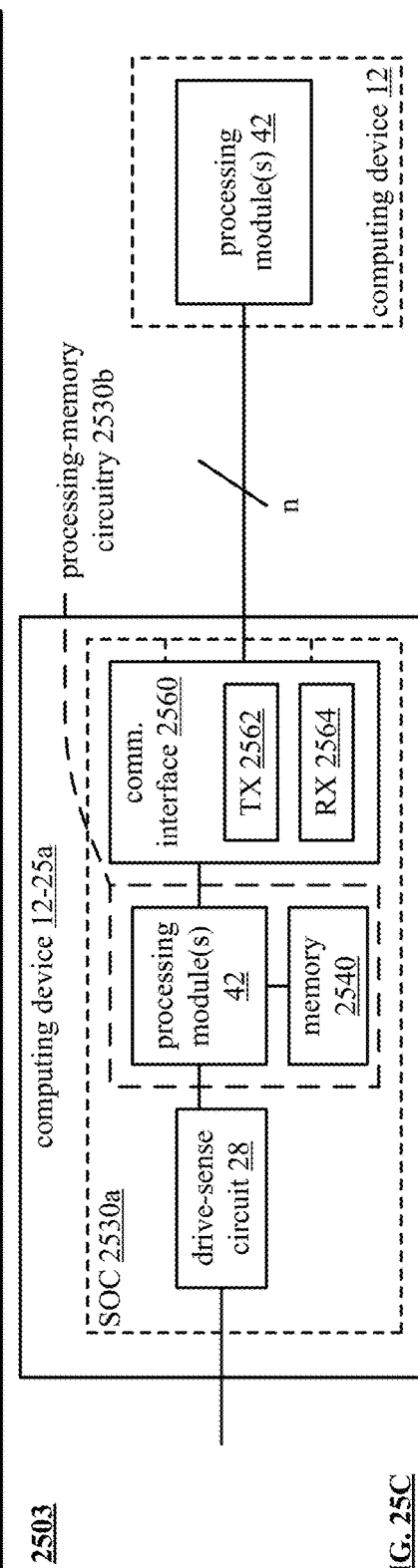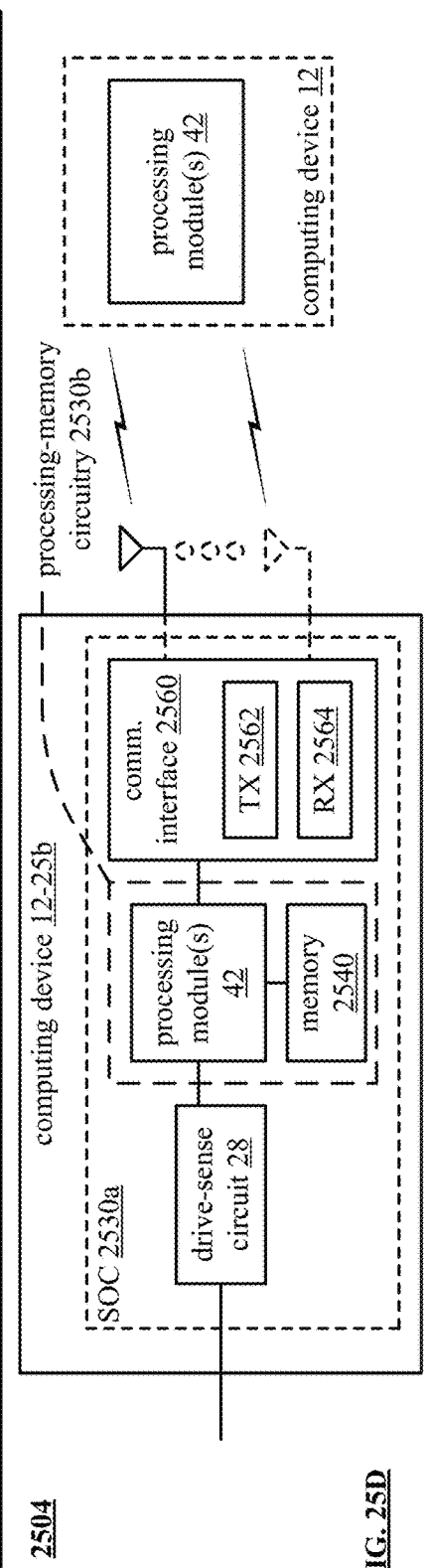

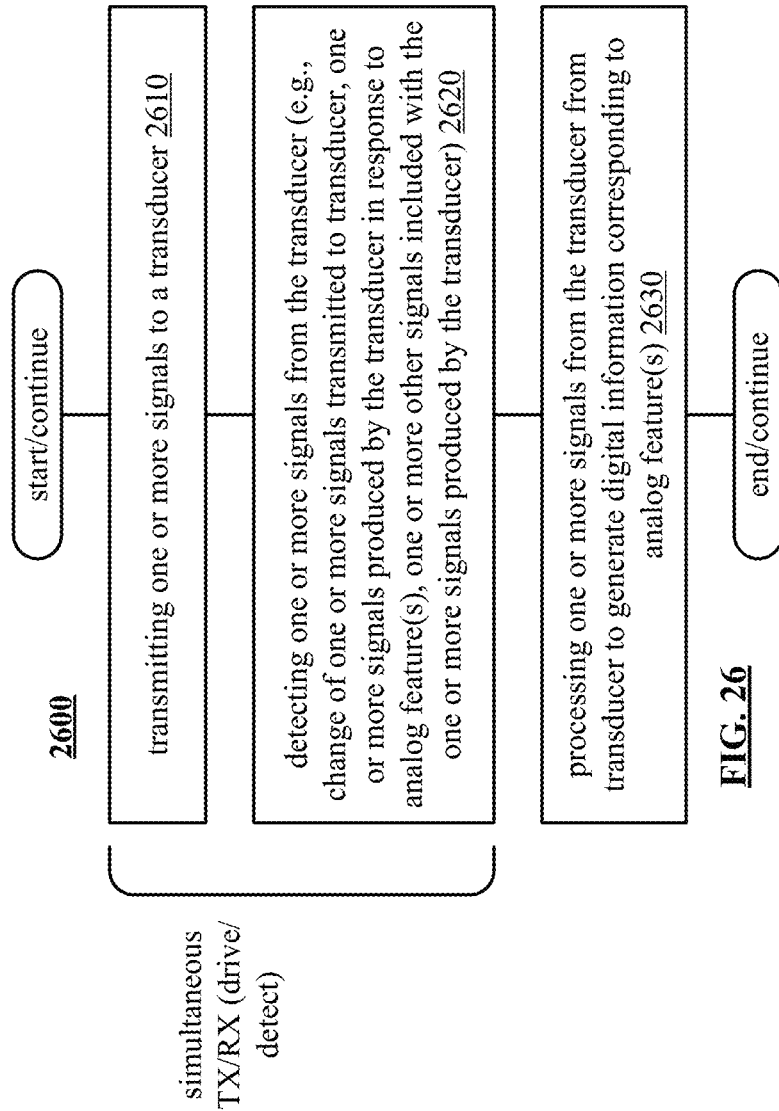

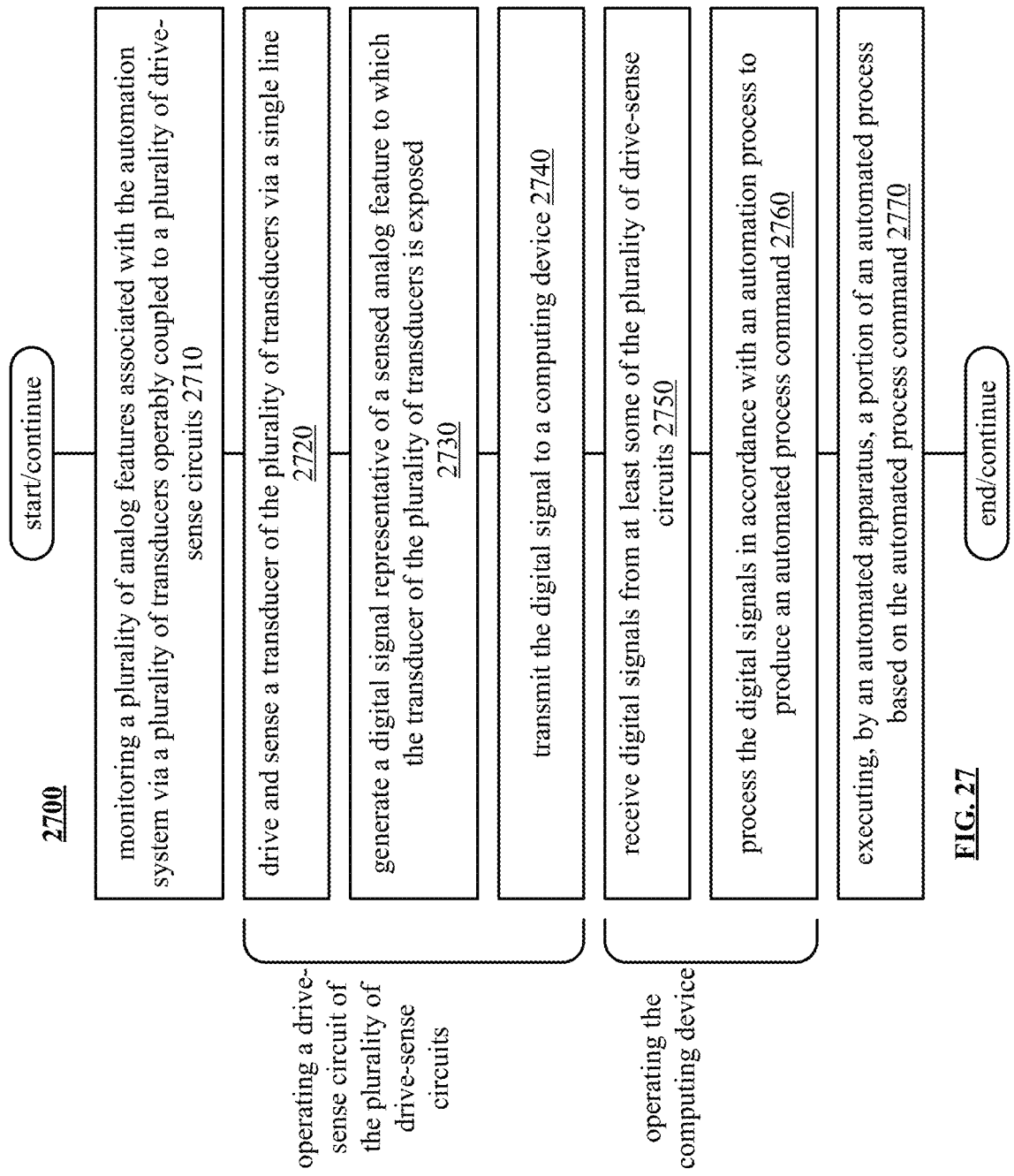

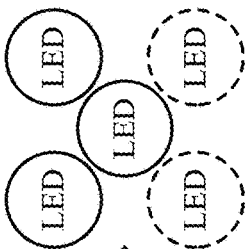
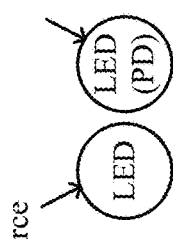
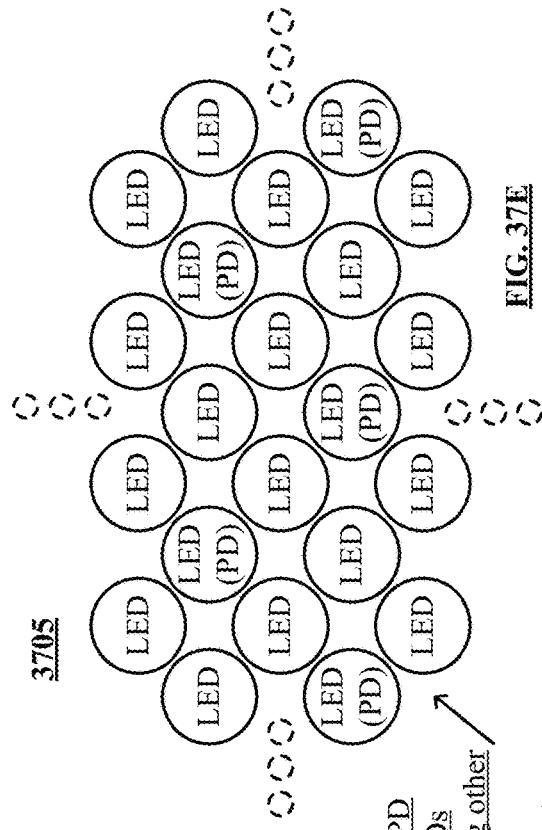
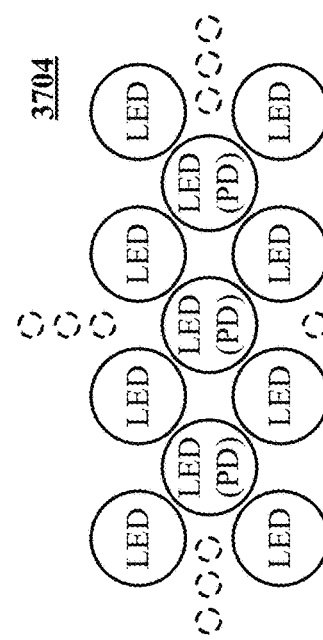

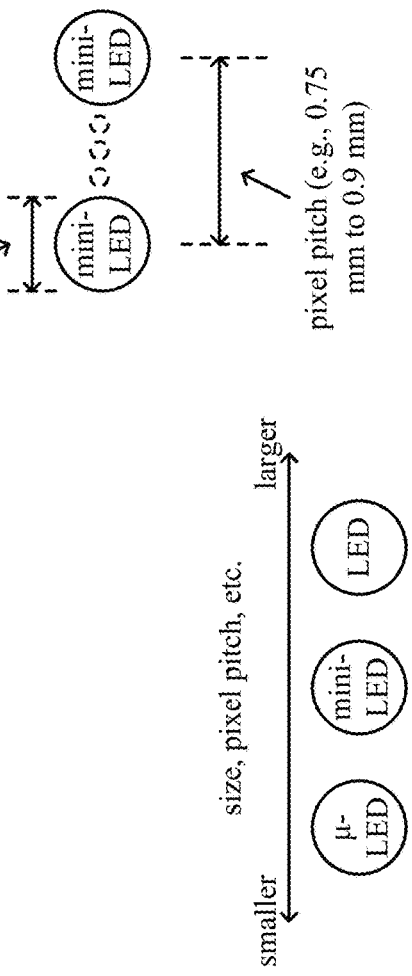
FIG. 38A — LED 3801 — pixel pitch (e.g., >1 mm, indoor 4-20 mm, outdoor 16-25 mm, large billboard 25-32 mm)
FIG. 38B — mini-LED 3802 — mini-LED size (e.g., 100-200 micrometers), pixel pitch (e.g., 0.75 mm to 0.9 mm)
smaller ← size, pixel pitch, etc. → larger
FIG. 38C — micro-LED (LED matrix/array on wafer surface) 3803 — micro-LED size (e.g., under 100 micrometers, e.g., 12 micron elements with 15 micron spacing between), (<1 mm pixel pitch), ~600 dots per inch (dpi)
micro-LED = μ-LED

3901

3902

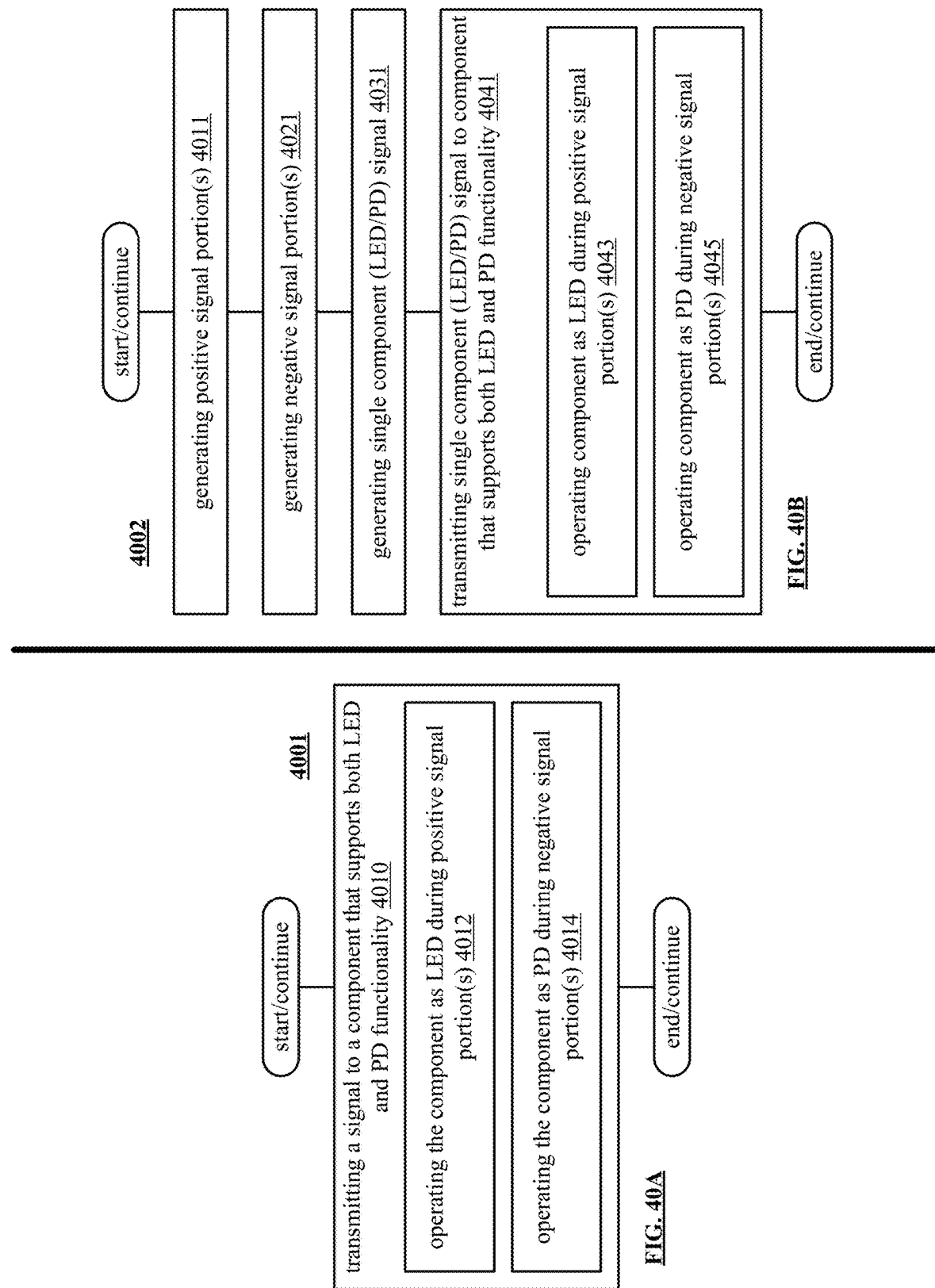

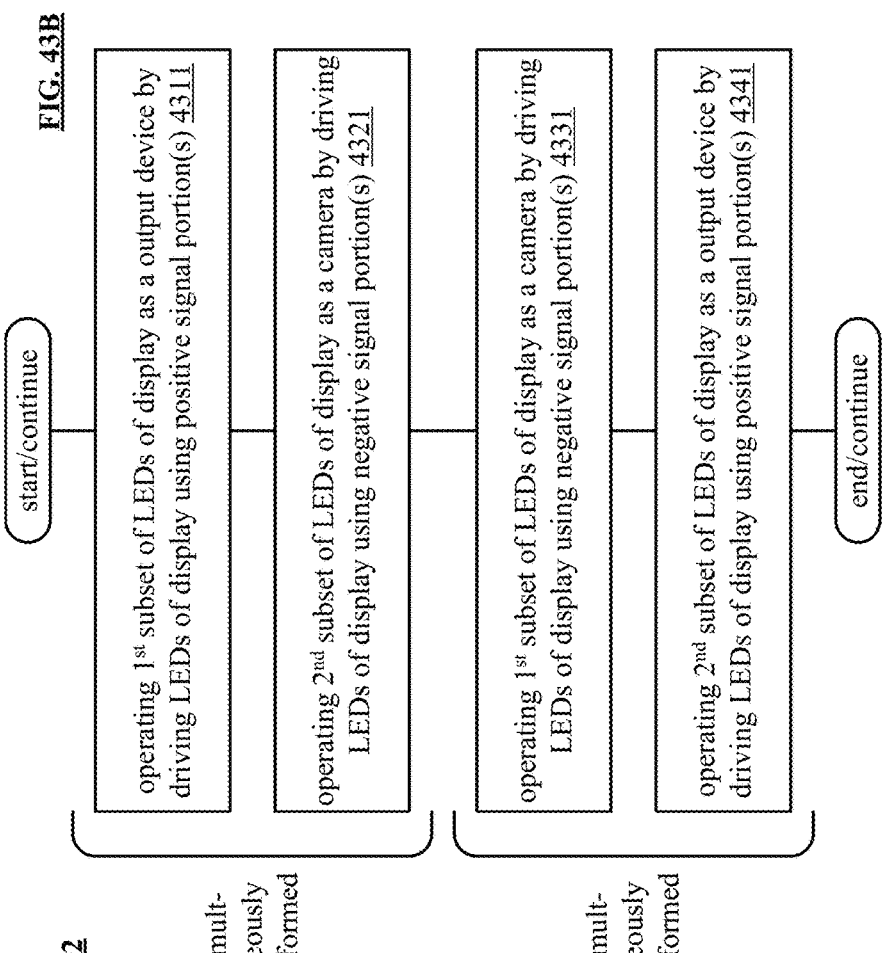
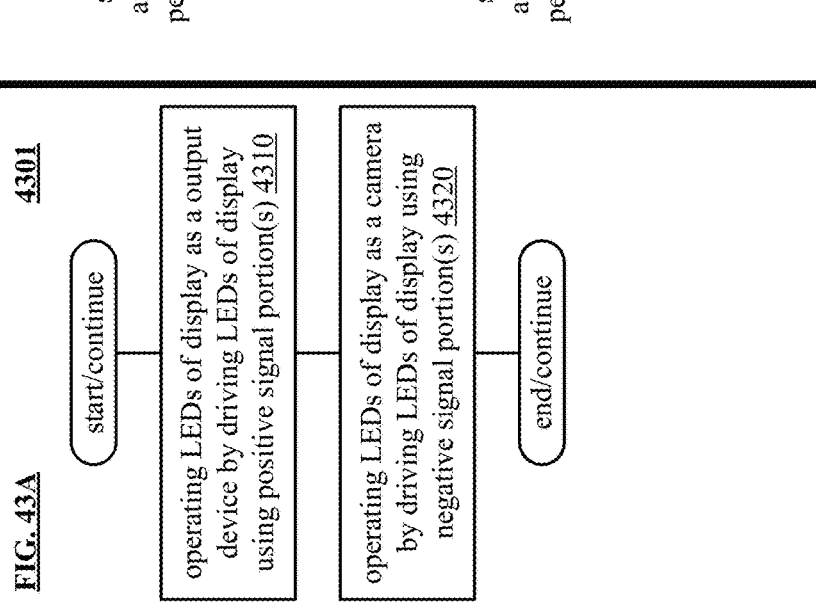

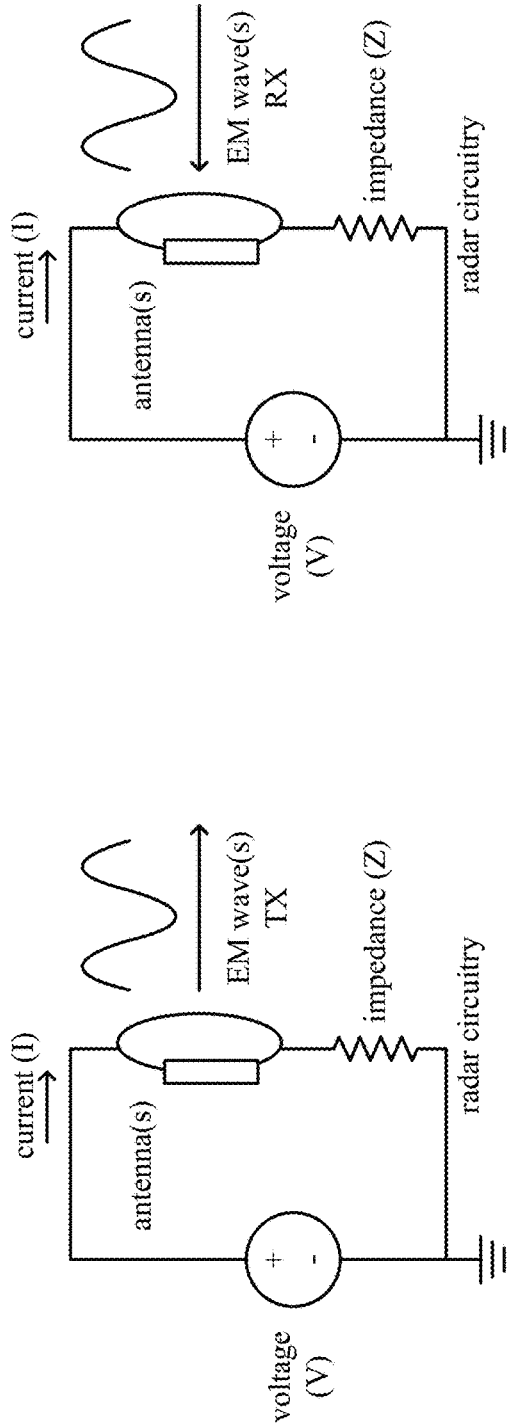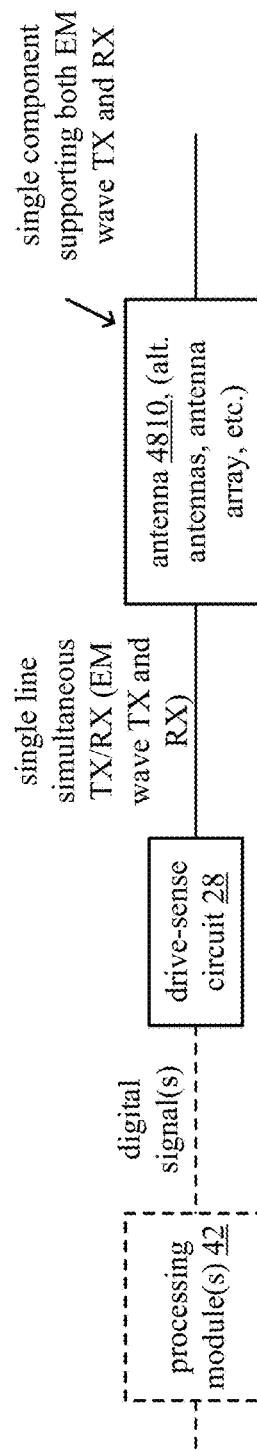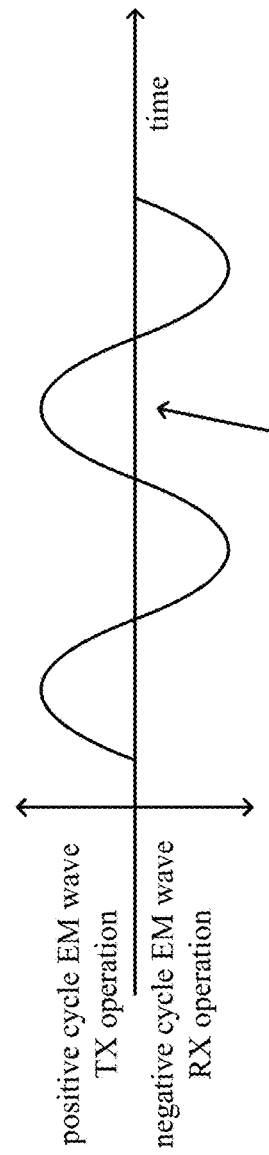
FIG. 48

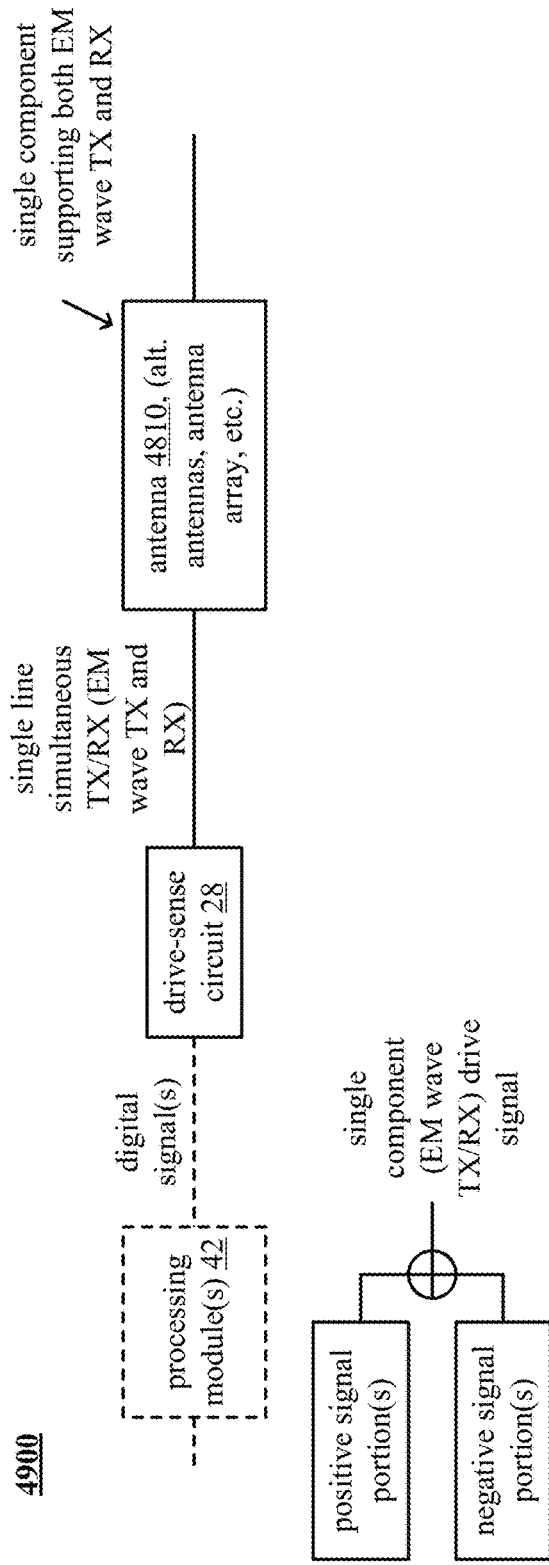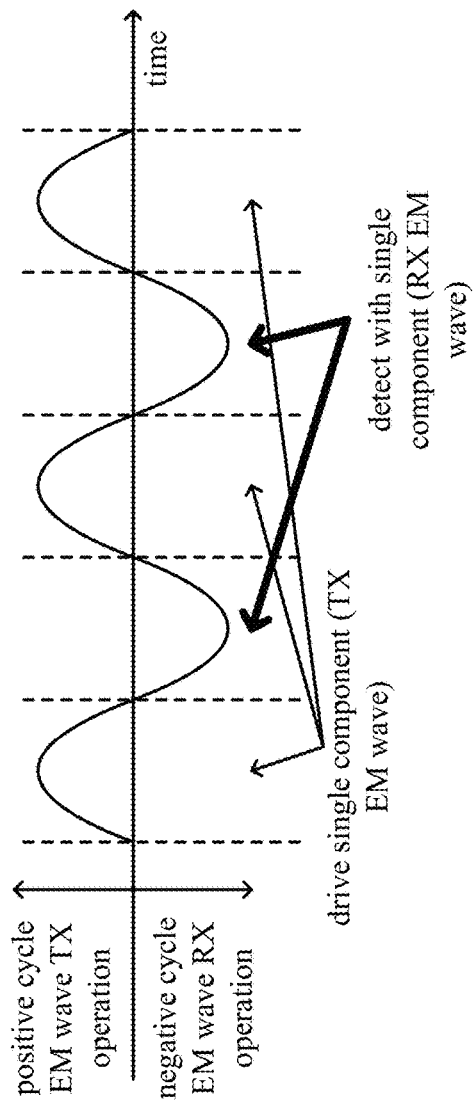
FIG. 49

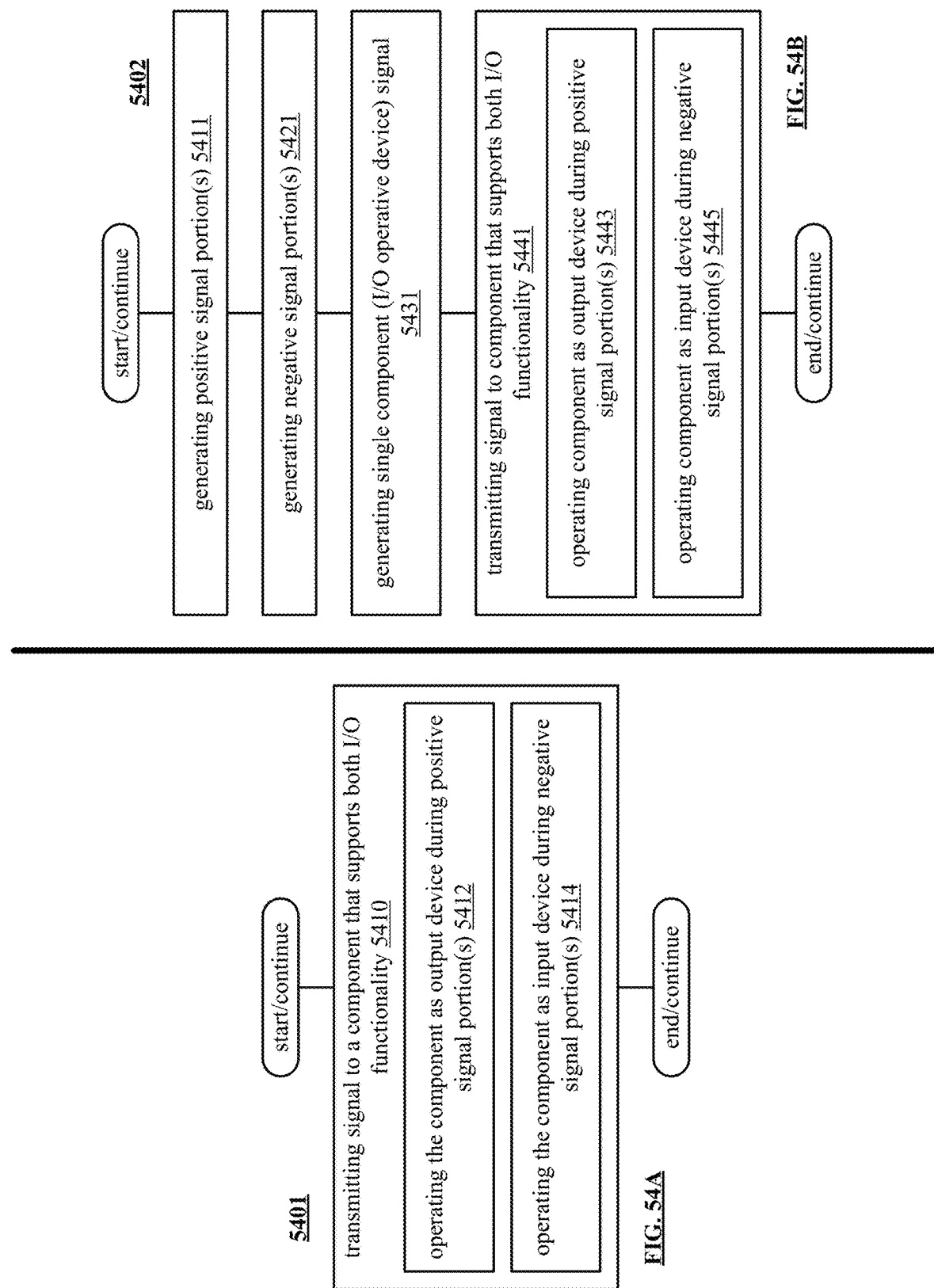

SOURCE AND SENSOR OPERATIVE ELECTROMAGNETIC WAVE AND/OR RF SIGNAL DEVICE

CROSS REFERENCE TO RELATED PATENTS

The present U.S. Utility patent application claims priority pursuant to 35 U.S.C. § 120 as a continuation of U.S. Utility application Ser. No. 17/733,014 entitled "Source and sensor operative electromagnetic wave and/or RF signal device," filed Apr. 29, 2022, pending, which claims priority pursuant to 35 U.S.C. § 120 as a continuation of U.S. Utility application Ser. No. 17/537,888 entitled "ANALOG WORLD INTERFACING FOR AUTOMATED SYSTEMS," filed Nov. 30, 2021, pending, which claims priority pursuant to 35 U.S.C. § 120 as a continuation of U.S. Utility application Ser. No. 17/138,040 entitled "ANALOG WORLD INTERFACING FOR AUTOMATED SYSTEMS," filed Dec. 30, 2020, now issued as U.S. Pat. No. 11,215,973 on Jan. 4, 2022, which claims priority pursuant to 35 U.S.C. § 120 as a continuation of U.S. Utility application Ser. No. 16/113,275 entitled "ANALOG WORLD INTERFACING FOR AUTOMATED SYSTEMS," filed Aug. 27, 2018, now issued as U.S. Pat. No. 10,895,867 on Jan. 19, 2021, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to sensed data collection and/or communication.

Description of Related Art

Sensors are used in a wide variety of applications ranging from in-home automation, to industrial systems, to health care, to transportation, and so on. For example, sensors are placed in bodies, automobiles, airplanes, boats, ships, trucks, motorcycles, cell phones, televisions, touch-screens, industrial plants, appliances, motors, checkout counters, etc. for the variety of applications.

In general, a sensor converts a physical quantity into an electrical or optical signal. For example, a sensor converts a physical phenomenon, such as a biological condition, a chemical condition, an electric condition, an electromagnetic condition, a temperature, a magnetic condition, mechanical motion (position, velocity, acceleration, force, pressure), an optical condition, and/or a radioactivity condition, into an electrical signal.

A sensor includes a transducer, which functions to convert one form of energy (e.g., force) into another form of energy (e.g., electrical signal). There are a variety of transducers to support the various applications of sensors. For example, a transducer is capacitor, a piezoelectric transducer, a piezoresistive transducer, a thermal transducer, a thermal-couple, a photoconductive transducer such as a photoresistor, a photodiode, and/or phototransistor.

A sensor circuit is coupled to a sensor to provide the sensor with power and to receive the signal representing the physical phenomenon from the sensor. The sensor circuit includes at least three electrical connections to the sensor: one for a power supply; another for a common voltage reference (e.g., ground); and a third for receiving the signal representing the physical phenomenon. The signal representing the physical phenomenon will vary from the power supply voltage to ground as the physical phenomenon changes from one extreme to another (for the range of sensing the physical phenomenon).

The sensor circuits provide the received sensor signals to one or more computing devices for processing. A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

The computing device processes the sensor signals for a variety of applications. For example, the computing device processes sensor signals to determine temperatures of a variety of items in a refrigerated truck during transit. As another example, the computing device processes the sensor signals to determine a touch on a touch screen. As yet another example, the computing device processes the sensor signals to determine various data points in a production line of a product.

BRIEF DESCRIPTION OF THE SEVERAL VIEWS OF THE DRAWING(S)

FIG. 5B is a schematic block diagram of another embodiment of a computing subsystem in accordance with the present invention;

FIG. 5D is a schematic block diagram of another embodiment of a computing subsystem in accordance with the present invention;

FIG. 9 is a schematic block diagram of another example of a power signal graph in accordance with the present invention;

FIG. 10 is a schematic block diagram of another example of a power signal graph in accordance with the present invention;

FIG. 11 is a schematic block diagram of another example of a power signal graph in accordance with the present invention;

FIG. 11A is a schematic block diagram of another example of a power signal graph in accordance with the present invention;

FIG. 12 is a schematic block diagram of an embodiment of a power signal change detection circuit in accordance with the present invention;

FIG. 13 is a schematic block diagram of another embodiment of a drive-sense circuit in accordance with the present invention;

FIG. 15A is a schematic block diagram of an embodiment of a communication system in accordance with the present invention;

FIG. 15B is a schematic block diagram of an embodiment of a communication system in accordance with the present invention;

FIG. 15C is a schematic block diagram of an embodiment of a communication system in accordance with the present invention;

FIG. 16A is a schematic block diagram of an embodiment of a communication system in accordance with the present invention;

FIG. 16B is a schematic block diagram of an embodiment of a communication system in accordance with the present invention;

FIG. 16C is a schematic block diagram of an embodiment of a communication system in accordance with the present invention;

FIG. 17A is a schematic block diagram of an embodiment of an assembly system in accordance with the present invention;

FIG. 17B is a schematic block diagram of an embodiment of components including rotating equipment in accordance with the present invention;

FIG. 18 is a schematic block diagram of an embodiment of a conveyor belt system in accordance with the present invention;

FIG. 19 is a schematic block diagram of an embodiment of a conveyor belt system in accordance with the present invention;

FIG. 23A is a schematic block diagram of an embodiment of a drive-sense circuit in communication with a transducer and a computing device in accordance with the present invention;

FIG. 23B is a schematic block diagram of an embodiment of a drive-sense circuit in communication with a transducer in accordance with the present invention;

FIG. 25A is a schematic block diagram of an embodiment of a transducer circuitry in communication with one or more processing modules (and/or computing devices) in accordance with the present invention;

FIG. 25B is a schematic block diagram of an embodiment of a transducer circuitry in communication with one or more processing modules (and/or computing devices) in accordance with the present invention;

FIG. 25C is a schematic block diagram of an embodiment of a communication system in accordance with the present invention;

FIG. 25D is a schematic block diagram of an embodiment of a communication system in accordance with the present invention;

FIG. 26 is a schematic block diagram illustrating an embodiment of a method for execution by one or more devices in accordance with the present invention;

FIG. 27 is a schematic block diagram illustrating an embodiment of a method for execution by one or more devices in accordance with the present invention;

FIG. 37A is a schematic block diagram of an embodiment of an optical device operating as both a source and a detector in accordance with the present invention;

FIG. 37B is a schematic block diagram of an embodiment of optical devices operating as sources and detectors in accordance with the present invention;

FIG. 37C is a schematic block diagram of an embodiment of optical devices operating as sources and detectors in accordance with the present invention;

FIG. 37D is a schematic block diagram of an embodiment of optical devices operating as sources and detectors in accordance with the present invention;

FIG. 37E is a schematic block diagram of an embodiment of optical devices operating as sources and detectors in accordance with the present invention;

FIG. 38A is a schematic block diagram of an embodiment of a type of optical device in accordance with the present invention;

FIG. 38B is a schematic block diagram of an embodiment of a type of optical device in accordance with the present invention;

FIG. 38C is a schematic block diagram of an embodiment of a type of optical device in accordance with the present invention;

FIG. 40A is a schematic block diagram illustrating an embodiment of a method for execution by one or more devices in accordance with the present invention;

FIG. 40B is a schematic block diagram illustrating an embodiment of a method for execution by one or more devices in accordance with the present invention;

FIG. 43A is a schematic block diagram illustrating an embodiment of a method for execution by one or more devices in accordance with the present invention;

FIG. 43B is a schematic block diagram illustrating an embodiment of a method for execution by one or more devices in accordance with the present invention;

FIG. 48 is a schematic block diagram of an embodiment of an electromagnetic wave device operating as both a source and a detector in accordance with the present invention;

FIG. 49 is a schematic block diagram of an embodiment of an electromagnetic wave device operating as both a source and a detector in accordance with the present invention;

FIG. 54A is a schematic block diagram illustrating an embodiment of a method for execution by one or more devices in accordance with the present invention; and FIG. 54B is a schematic block diagram illustrating an embodiment of a method for execution by one or more devices in accordance with the present invention.

DETAILED DESCRIPTION OF THE INVENTION

Figure 1:
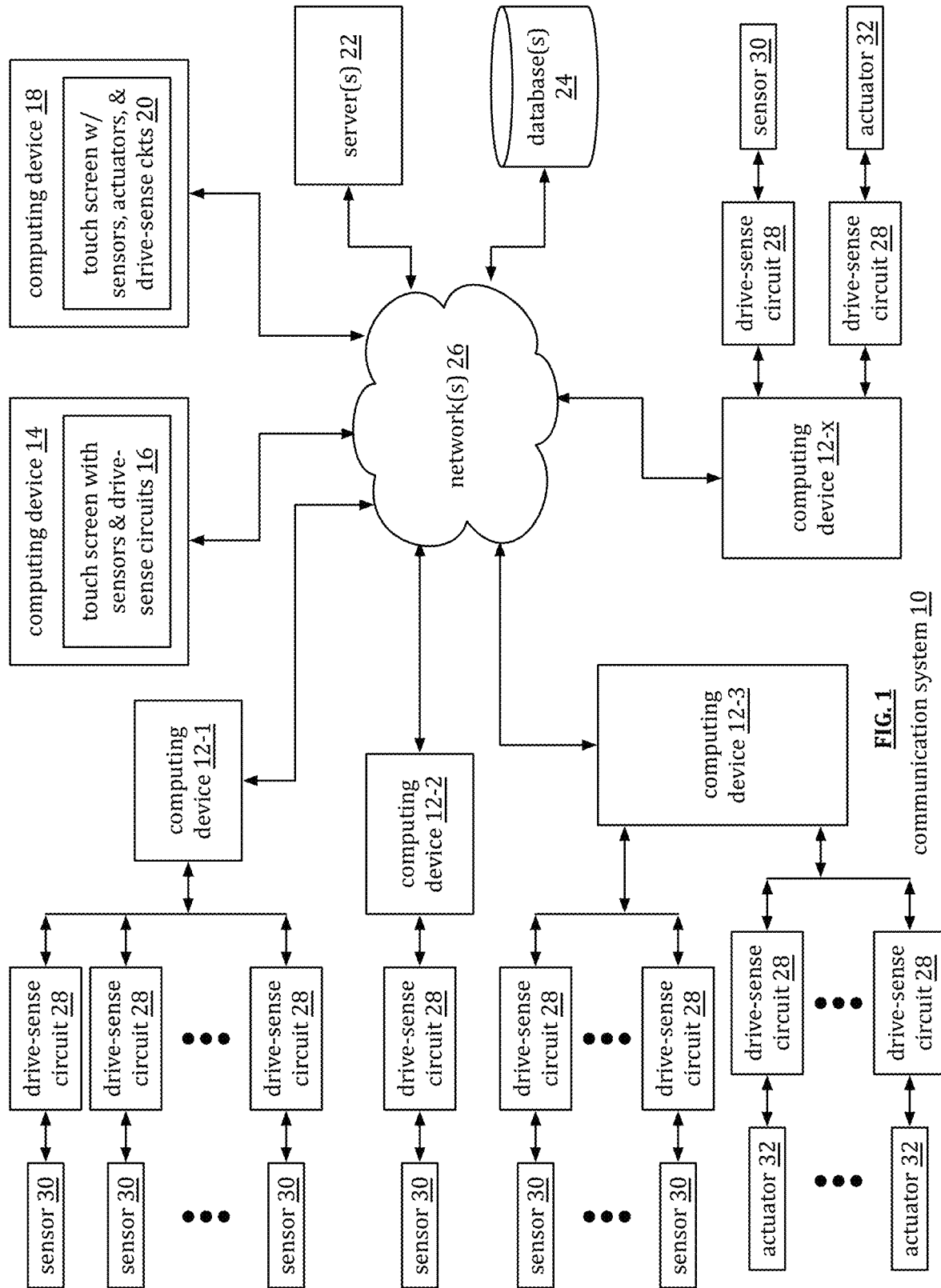
FIG. 1 is a schematic block diagram of an embodiment of a communication system in accordance with the present invention.

FIG. 1 is a schematic block diagram of an embodiment of a communication system 10 that includes a plurality of computing. devices 12-10, one or more servers 22, one or more databases 24, one or more networks 26, a plurality of drive-sense circuits 28, a plurality of sensors 30, and a plurality of actuators 32. Computing devices 14 include a touch screen 16 with sensors and drive-sensor circuits and computing devices 18 include a touch & tactic screen 20 that includes sensors, actuators, and drive-sense circuits.

A sensor 30 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linear are factors for interpreting the measure of the physical condition based on the received electrical and/or optical signal (e.g., measure of temperature, pressure, etc.).

An actuator 32 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 32 may be one of a variety of actuators. For example, an actuator 32 is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

The computing devices 12, 14, and 18 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. The computing devices 12, 14, and 18 will be discussed in greater detail with reference to one or more of FIGS. 2-4.

A server 22 is a special type of computing device that is optimized for processing large amounts of data requests in parallel. A server 22 includes similar components to that of the computing devices 12, 14, and/or 18 with more robust processing modules, more main memory, and/or more hard drive memory (e.g., solid state, hard drives, etc.). Further, a server 22 is typically accessed remotely; as such it does not generally include user input devices and/or user output devices. In addition, a server may be a standalone separate computing device and/or may be a cloud computing device.

A database 24 is a special type of computing device that is optimized for large scale data storage and retrieval. A database 24 includes similar components to that of the computing devices 12, 14, and/or 18 with more hard drive memory (e.g., solid state, hard drives, etc.) and potentially with more processing modules and/or main memory. Further, a database 24 is typically accessed remotely; as such it does not generally include user input devices and/or user output devices. In addition, a database 24 may be a standalone separate computing device and/or may be a cloud computing device.

The network 26 includes one more local area networks (LAN) and/or one or more wide area networks WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a LAN may be a personal home or business's wireless network and a WAN is the Internet, cellular telephone infrastructure, and/or satellite communication infrastructure.

In an example of operation, computing device 12-1 communicates with a plurality of drive-sense circuits 28, which, in turn, communicate with a plurality of sensors 30. The sensors 30 and/or the drive-sense circuits 28 are within the computing device 12-1 and/or external to it. For example, the sensors 30 may be external to the computing device 12-1 and the drive-sense circuits are within the computing device 12-1. As another example, both the sensors 30 and the drive-sense circuits 28 are external to the computing device 12-1. When the drive-sense circuits 28 are external to the computing device, they are coupled to the computing device 12-1 via wired and/or wireless communication links as will be discussed in greater detail with reference to one or more of FIGS. 5A-5C.

The computing device 12-1 communicates with the drive-sense circuits 28 to; (a) turn them on, (b) obtain data from the sensors (individually and/or collectively), (c) instruct the drive sense circuit on how to communicate the sensed data to the computing device 12-1, (d) provide signaling attributes (e.g., DC level, AC level, frequency, power level, regulated current signal, regulated voltage signal, regulation of an impedance, frequency patterns for various sensors, different frequencies for different sensing applications, etc.) to use with the sensors, and/or (e) provide other commands and/or instructions.

As a specific example, the sensors 30 are distributed along a pipeline to measure flow rate and/or pressure within a section of the pipeline. The drive-sense circuits 28 have their own power source (e.g., battery, power supply, etc.) and are proximally located to their respective sensors 30. At desired time intervals (milliseconds, seconds, minutes, hours, etc.), the drive-sense circuits 28 provide a regulated source signal or a power signal to the sensors 30. An electrical characteristic of the sensor 30 affects the regulated source signal or power signal, which is reflective of the condition (e.g., the flow rate and/or the pressure) that sensor is sensing.

The drive-sense circuits 28 detect the effects on the regulated source signal or power signals as a result of the electrical characteristics of the sensors. The drive-sense circuits 28 then generate signals representative of change to the regulated source signal or power signal based on the detected effects on the power signals. The changes to the regulated source signals or power signals are representative of the conditions being sensed by the sensors 30.

The drive-sense circuits 28 provide the representative signals of the conditions to the computing device 12-1. A representative signal may be an analog signal or a digital signal. In either case, the computing device 12-1 interprets the representative signals to determine the pressure and/or flow rate at each sensor location along the pipeline. The computing device may then provide this information to the server 22, the database 24, and/or to another computing device for storing and/or further processing.

As another example of operation, computing device 12-2 is coupled to a drive-sense circuit 28, which is, in turn, coupled to a senor 30. The sensor 30 and/or the drive-sense circuit 28 may be internal and/or external to the computing device 12-2. In this example, the sensor 30 is sensing a condition that is particular to the computing device 12-2. For example, the sensor 30 may be a temperature sensor, an ambient light sensor, an ambient noise sensor, etc. As described above, when instructed by the computing device 12-2 (which may be a default setting for continuous sensing or at regular intervals), the drive-sense circuit 28 provides the regulated source signal or power signal to the sensor 30 and detects an effect to the regulated source signal or power signal based on an electrical characteristic of the sensor. The drive-sense circuit generates a representative signal of the affect and sends it to the computing device 12-2.

In another example of operation, computing device 12-3 is coupled to a plurality of drive-sense circuits 28 that are coupled to a plurality of sensors 30 and is coupled to a plurality of drive-sense circuits 28 that are coupled to a plurality of actuators 32. The generally functionality of the drive-sense circuits 28 coupled to the sensors 30 in accordance with the above description.

Since an actuator 32 is essentially an inverse of a sensor in that an actuator converts an electrical signal into a physical condition, while a sensor converts a physical condition into an electrical signal, the drive-sense circuits 28 can be used to power actuators 32. Thus, in this example, the computing device 12-3 provides actuation signals to the drive-sense circuits 28 for the actuators 32. The drive-sense circuits modulate the actuation signals on to power signals or regulated control signals, which are provided to the actuators 32. The actuators 32 are powered from the power signals or regulated control signals and produce the desired physical condition from the modulated actuation signals.

As another example of operation, computing device 12-x is coupled to a drive-sense circuit 28 that is coupled to a sensor 30 and is coupled to a drive-sense circuit 28 that is coupled to an actuator 32. In this example, the sensor 30 and the actuator 32 are for use by the computing device 12-x. For example, the sensor 30 may be a piezoelectric microphone and the actuator 32 may be a piezoelectric speaker.

Figure 2:
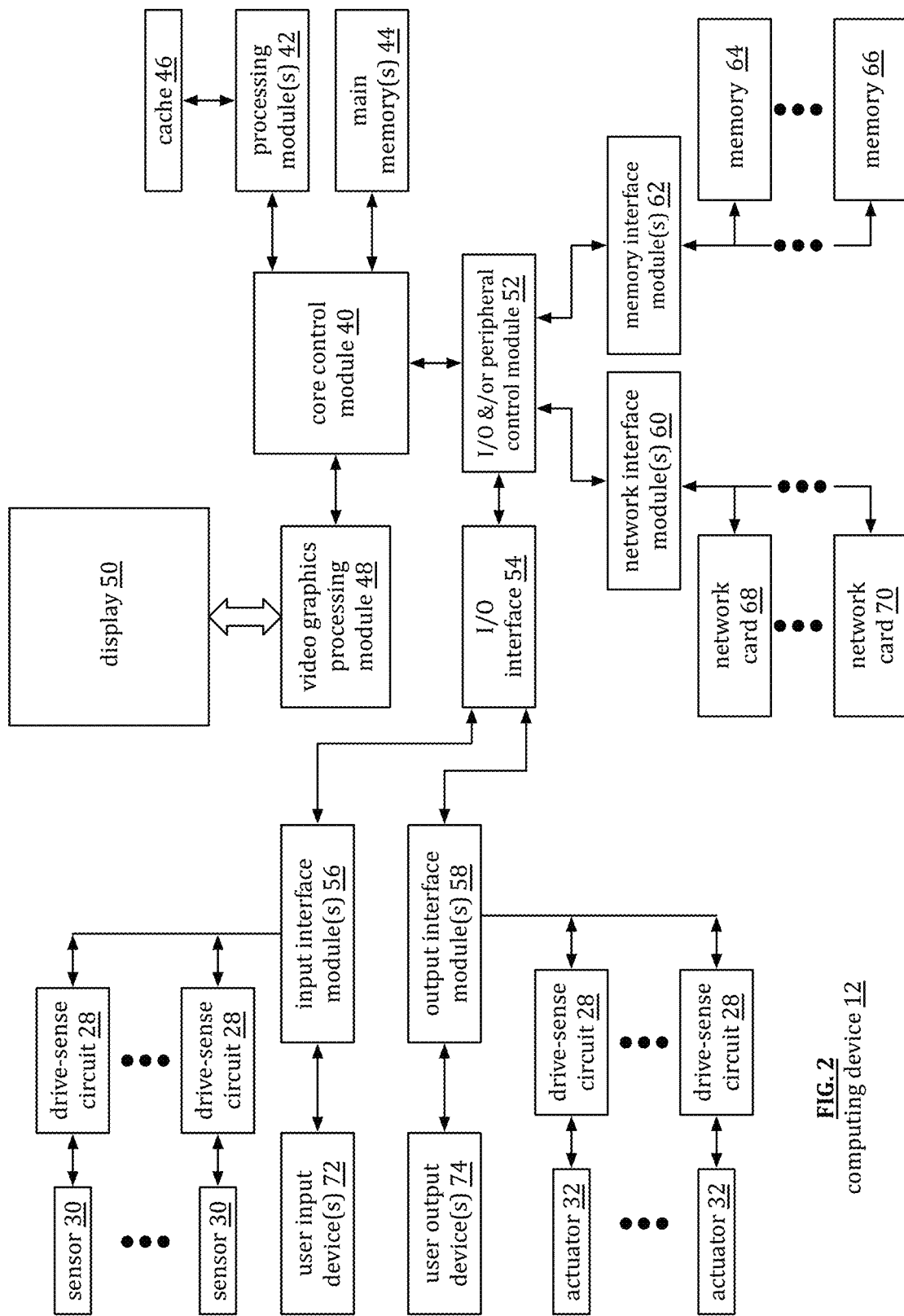
FIG. 2 is a schematic block diagram of an embodiment of a computing device in accordance with the present invention.

FIG. 2 is a schematic block diagram of an embodiment of a computing device 12 (e.g., any one of 12-1 through 12-x). The computing device 12 includes a core control module 40, one or more processing modules 42, one or more main memories 44, cache memory 46, a video graphics processing module 48, a display 50, an Input-Output (I/O) peripheral control module 52, one or more input interface modules 56, one or more output interface modules 58, one or more network interface modules 60, and one or more memory interface modules 62. A processing module 42 is described in greater detail at the end of the detailed description of the invention section and, in an alternative embodiment, has a direction connection to the main memory 44. In an alternate embodiment, the core control module 40 and the I/O and/or peripheral control module 52 are one module, such as a chipset, a quick path interconnect (QPI), and/or an ultra-path interconnect (UPI).

Each of the main memories 44 includes one or more Random Access Memory (RAM) integrated circuits, or chips. For example, a main memory 44 includes four DDR4 ($4^{th}$ generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieve from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 52 and via one or more memory interface modules 62. In an embodiment, the I/O and/or peripheral control module 52 includes one or more Peripheral Component Interface (PCI) buses to which peripheral components connect to the core control module 40. A memory interface module 62 includes a software driver and a hardware connector for coupling a memory device to the I/O and/or peripheral control module 52. For example, a memory interface 62 is in accordance with a Serial Advanced Technology Attachment (SATA) port.

The core control module 40 coordinates data communications between the processing module(s) 42 and the network(s) 26 via the I/O and/or peripheral control module 52, the network interface module(s) 60, and a network card 68 or 70. A network card 68 or 70 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 60 includes a software driver and a hardware connector for coupling the network card to the I/O and/or peripheral control module 52. For example, the network interface module 60 is in accordance with one or more versions of IEEE 802.11, cellular telephone protocols, 10/100/1000 Gigabit LAN protocols, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, a camera, etc. An input interface module 56 includes a software driver and a hardware connector for coupling an input device to the I/O and/or peripheral control module 52. In an embodiment, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 includes a speaker, etc. An output interface module 58 includes a software driver and a hardware connector for coupling an output device to the I/O and/or peripheral control module 52. In an embodiment, an output interface module 56 is in accordance with one or more audio codec protocols.

The processing module 42 communicates directly with a video graphics processing module 48 to display data on the display 50. The display 50 includes an LED (light emitting diode) display, an LCD (liquid crystal display), and/or other type of display technology. The display has a resolution, an aspect ratio, and other features that affect the quality of the display. The video graphics processing module 48 receives data from the processing module 42, processes the data to produce rendered data in accordance with the characteristics of the display, and provides the rendered data to the display 50.

FIG. 2 further illustrates sensors 30 and actuators 32 coupled to drive-sense circuits 28, which are coupled to the input interface module 56 (e.g., USB port). Alternatively, one or more of the drive-sense circuits 28 is coupled to the computing device via a wireless network card (e.g., WLAN) or a wired network card (e.g., Gigabit LAN). While not shown, the computing device 12 further includes a BIOS (Basic Input Output System) memory coupled to the core control module 40.

Figure 3:
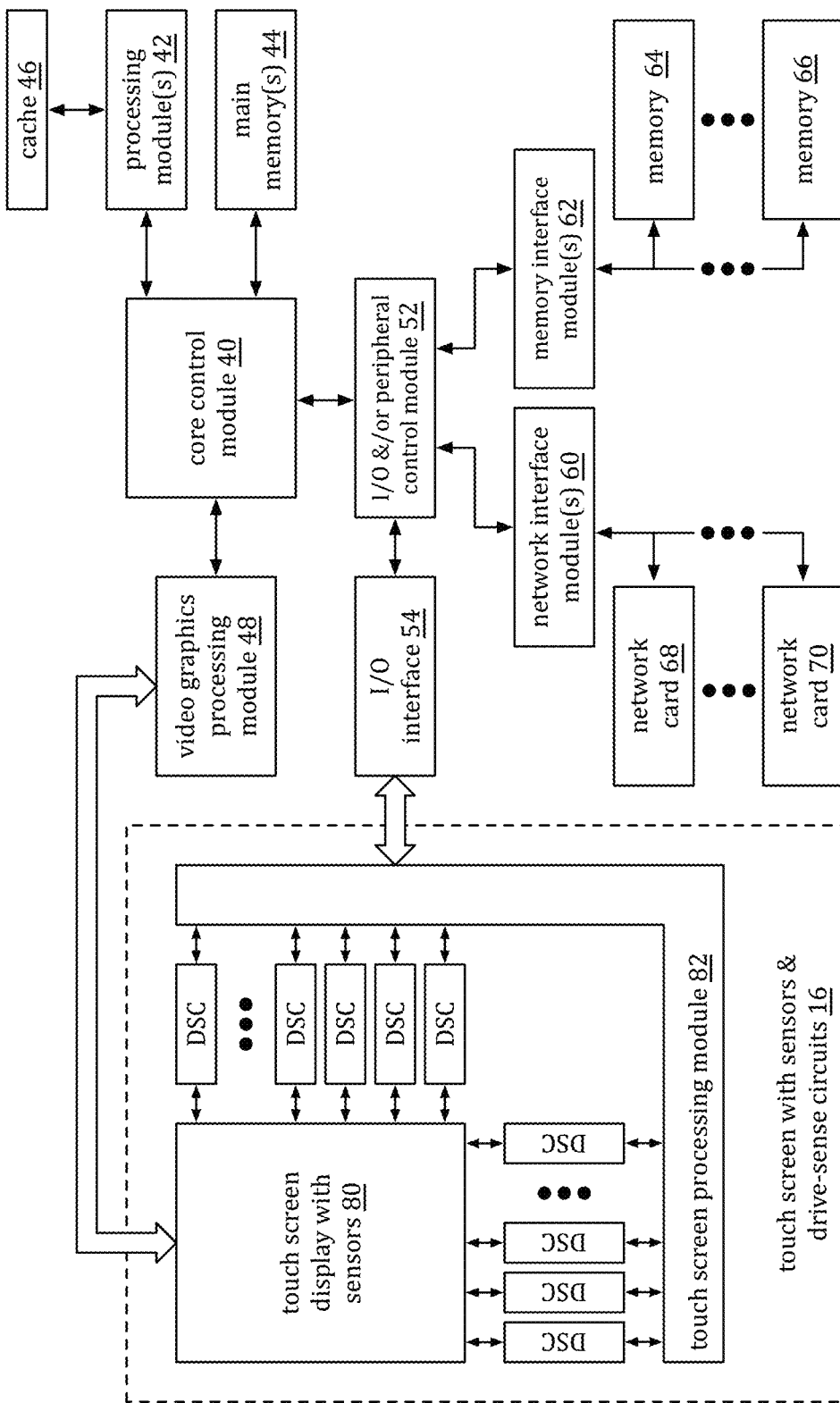
FIG. 3 is a schematic block diagram of another embodiment of a computing device in accordance with the present invention.

FIG. 3 is a schematic block diagram of another embodiment of a computing device 14 that includes a core control module 40, one or more processing modules 42, one or more main memories 44, cache memory 46, a video graphics processing module 48, a touch screen 16, an Input-Output (I/O) peripheral control module 52, one or more input interface modules 56, one or more output interface modules 58, one or more network interface modules 60, and one or more memory interface modules 62. The touch screen 16 includes a touch screen display 80, a plurality of sensors 30, a plurality of drive-sense circuits (DSC), and a touch screen processing module 82.

Computing device 14 operates similarly to computing device 12 of FIG. 2 with the addition of a touch screen as an input device. The touch screen includes a plurality of sensors (e.g., electrodes, capacitor sensing cells, capacitor sensors, inductive sensor, etc.) to detect a proximal touch of the screen. For example, when one or more fingers touches the screen, capacitance of sensors proximal to the touch(es) are affected (e.g., impedance changes). The drive-sense circuits (DSC) coupled to the affected sensors detect the change and provide a representation of the change to the touch screen processing module 82, which may be a separate processing module or integrated into the processing module 42.

The touch screen processing module 82 processes the representative signals from the drive-sense circuits (DSC) to determine the location of the touch(es). This information is inputted to the processing module 42 for processing as an input. For example, a touch represents a selection of a button on screen, a scroll function, a zoom in-out function, etc.

Figure 4:
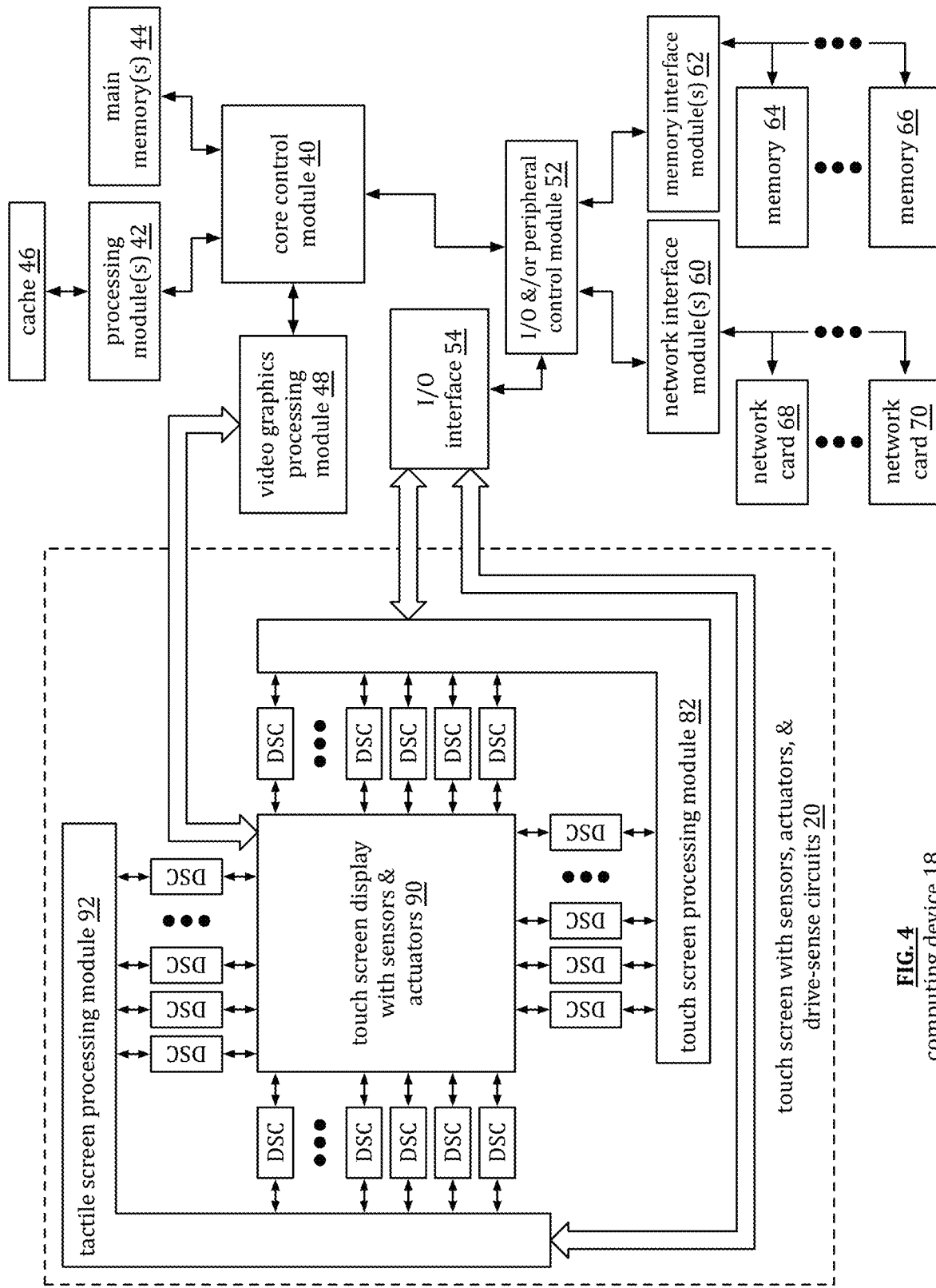
FIG. 4 is a schematic block diagram of another embodiment of a computing device in accordance with the present invention.

FIG. 4 is a schematic block diagram of another embodiment of a computing device 18 that includes a core control module 40, one or more processing modules 42, one or more main memories 44, cache memory 46, a video graphics processing module 48, a touch and tactile screen 20, an Input-Output (I/O) peripheral control module 52, one or more input interface modules 56, one or more output interface modules 58, one or more network interface modules 60, and one or more memory interface modules 62. The touch and tactile screen 20 includes a touch and tactile screen display 90, a plurality of sensors 30, a plurality of actuators 32, a plurality of drive-sense circuits (DSC), a touch screen processing module 82, and a tactile screen processing module 92.

Computing device 18 operates similarly to computing device 14 of FIG. 3 with the addition of a tactile aspect to the screen 20 as an output device. The tactile portion of the screen 20 includes the plurality of actuators (e.g., piezoelectric transducers to create vibrations, solenoids to create movement, etc.) to provide a tactile feel to the screen 20. To do so, the processing module creates tactile data, which is provided to the appropriate drive-sense circuits (DSC) via the tactile screen processing module 92, which may be a stand-alone processing module or integrated into processing module 42. The drive-sense circuits (DSC) convert the tactile data into drive-actuate signals and provide them to the appropriate actuators to create the desired tactile feel on the screen 20.

Figure 5A:
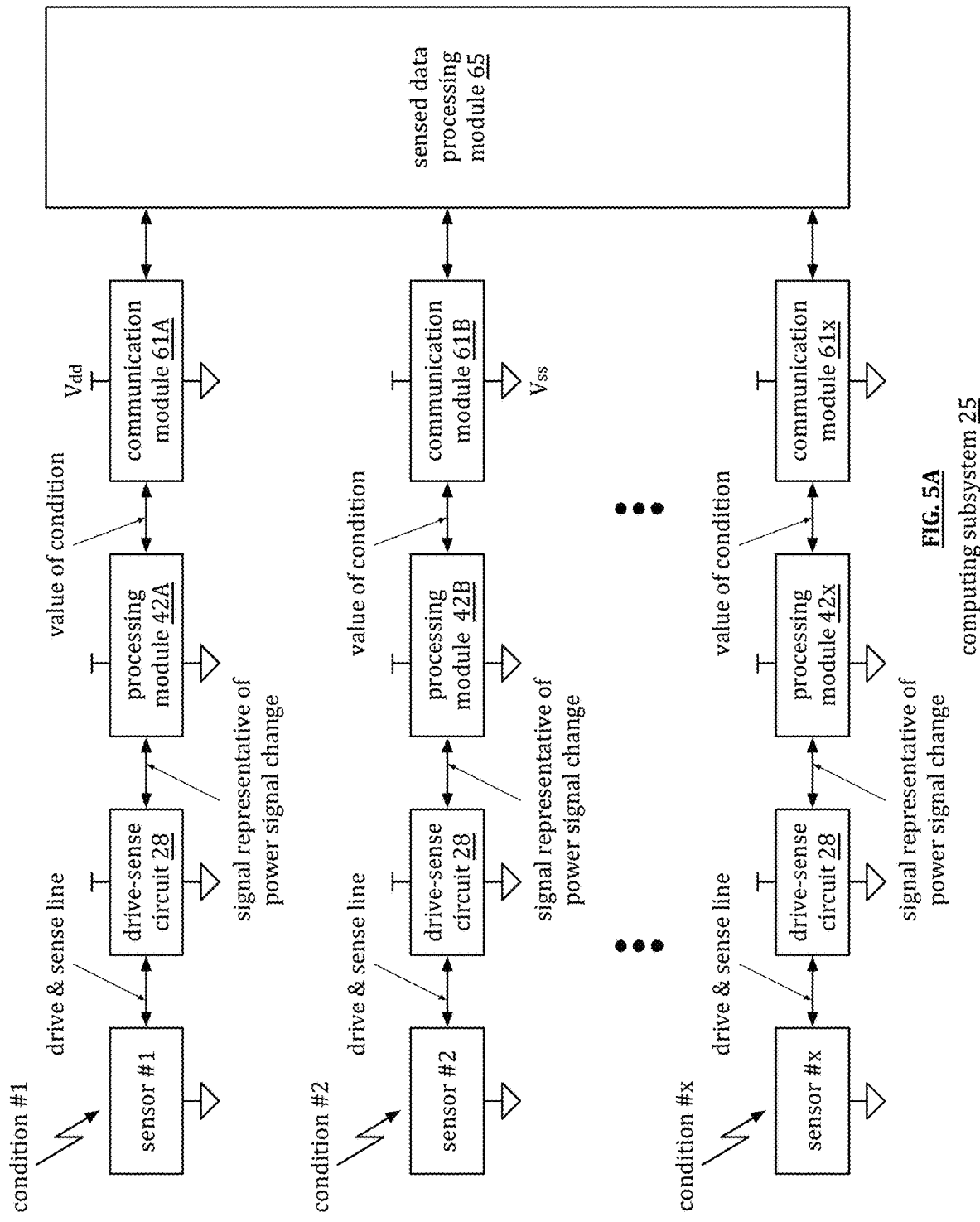
FIG. 5A is a schematic plot diagram of a computing subsystem in accordance with the present invention.

FIG. 5A is a schematic plot diagram of a computing subsystem 25 that includes a sensed data processing module 65, a plurality of communication modules 61A-x, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing devices in which processing modules 42A-x reside.

A drive-sense circuit 28 (or multiple drive-sense circuits), a processing module (e.g., 41A), and a communication module (e.g., 61A) are within a common computing device. Each grouping of a drive-sense circuit(s), processing module, and communication module is in a separate computing device. A communication module 61A-x is constructed in accordance with one or more wired communication protocol and/or one or more wireless communication protocols that is/are in accordance with the one or more of the Open System Interconnection (OSI) model, the Transmission Control Protocol/Internet Protocol (TCP/IP) model, and other communication protocol module.

In an example of operation, a processing module (e.g., 42A) provides a control signal to its corresponding drive-sense circuit 28. The processing module 42 A may generate the control signal, receive it from the sensed data processing module 65, or receive an indication from the sensed data processing module 65 to generate the control signal. The control signal enables the drive-sense circuit 28 to provide a drive signal to its corresponding sensor. The control signal may further include a reference signal having one or more frequency components to facilitate creation of the drive signal and/or interpreting a sensed signal received from the sensor.

Based on the control signal, the drive-sense circuit 28 provides the drive signal to its corresponding sensor (e.g., 1) on a drive & sense line. While receiving the drive signal (e.g., a power signal, a regulated source signal, etc.), the sensor senses a physical condition 1-x (e.g., acoustic waves, a biological condition, a chemical condition, an electric condition, a magnetic condition, an optical condition, a thermal condition, and/or a mechanical condition). As a result of the physical condition, an electrical characteristic (e.g., impedance, voltage, current, capacitance, inductance, resistance, reactance, etc.) of the sensor changes, which affects the drive signal. Note that if the sensor is an optical sensor, it converts a sensed optical condition into an electrical characteristic.

The drive-sense circuit 28 detects the effect on the drive signal via the drive & sense line and processes the affect to produce a signal representative of power change, which may be an analog or digital signal. The processing module 42A receives the signal representative of power change, interprets it, and generates a value representing the sensed physical condition. For example, if the sensor is sensing pressure, the value representing the sensed physical condition is a measure of pressure (e.g., x PSI (pounds per square inch)).

In accordance with a sensed data process function (e.g., algorithm, application, etc.), the sensed data processing module 65 gathers the values representing the sensed physical conditions from the processing modules. Since the sensors 1-x may be the same type of sensor (e.g., a pressure sensor), may each be different sensors, or a combination thereof; the sensed physical conditions may be the same, may each be different, or a combination thereof. The sensed data processing module 65 processes the gathered values to produce one or more desired results. For example, if the computing subsystem 25 is monitoring pressure along a pipeline, the processing of the gathered values indicates that the pressures are all within normal limits or that one or more of the sensed pressures is not within normal limits.

As another example, if the computing subsystem 25 is used in a manufacturing facility, the sensors are sensing a variety of physical conditions, such as acoustic waves (e.g., for sound proofing, sound generation, ultrasound monitoring, etc.), a biological condition (e.g., a bacterial contamination, etc.) a chemical condition (e.g., composition, gas concentration, etc.), an electric condition (e.g., current levels, voltage levels, electro-magnetic interference, etc.), a magnetic condition (e.g., induced current, magnetic field strength, magnetic field orientation, etc.), an optical condition (e.g., ambient light, infrared, etc.), a thermal condition (e.g., temperature, etc.), and/or a mechanical condition (e.g., physical position, force, pressure, acceleration, etc.).

The computing subsystem 25 may further include one or more actuators in place of one or more of the sensors and/or in addition to the sensors. When the computing subsystem 25 includes an actuator, the corresponding processing module provides an actuation control signal to the corresponding drive-sense circuit 28. The actuation control signal enables the drive-sense circuit 28 to provide a drive signal to the actuator via a drive & actuate line (e.g., similar to the drive & sense line, but for the actuator). The drive signal includes one or more frequency components and/or amplitude components to facilitate a desired actuation of the actuator.

In addition, the computing subsystem 25 may include an actuator and sensor working in concert. For example, the sensor is sensing the physical condition of the actuator. In this example, a drive-sense circuit provides a drive signal to the actuator and another drive sense signal provides the same drive signal, or a scaled version of it, to the sensor. This allows the sensor to provide near immediate and continuous sensing of the actuator's physical condition. This further allows for the sensor to operate at a first frequency and the actuator to operate at a second frequency.

In an embodiment, the computing subsystem is a stand-alone system for a wide variety of applications (e.g., manufacturing, pipelines, testing, monitoring, security, etc.). In another embodiment, the computing subsystem 25 is one subsystem of a plurality of subsystems forming a larger system. For example, different subsystems are employed based on geographic location. As a specific example, the computing subsystem 25 is deployed in one section of a factory and another computing subsystem is deployed in another part of the factory. As another example, different subsystems are employed based function of the subsystems. As a specific example, one subsystem monitors a city's traffic light operation and another subsystem monitors the city's sewage treatment plants.

Regardless of the use and/or deployment of the computing system, the physical conditions it is sensing, and/or the physical conditions it is actuating, each sensor and each actuator (if included) is driven and sensed by a single line as opposed to separate drive and sense lines. This provides many advantages including, but not limited to, lower power requirements, better ability to drive high impedance sensors, lower line to line interference, and/or concurrent sensing functions.

FIG. 5B is a schematic block diagram of another embodiment of a computing subsystem 25 that includes a sensed data processing module 65, a communication module 61, a plurality of processing modules 42A-x, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device, devices, in which processing modules 42A— x reside.

In an embodiment, the drive-sense circuits 28, the processing modules, and the communication module are within a common computing device. For example, the computing device includes a central processing unit that includes a plurality of processing modules. The functionality and operation of the sensed data processing module 65, the communication module 61, the processing modules 42A-x, the drive sense circuits 28, and the sensors 1-x are as discussed with reference to FIG. 5A.

Figure 5C:
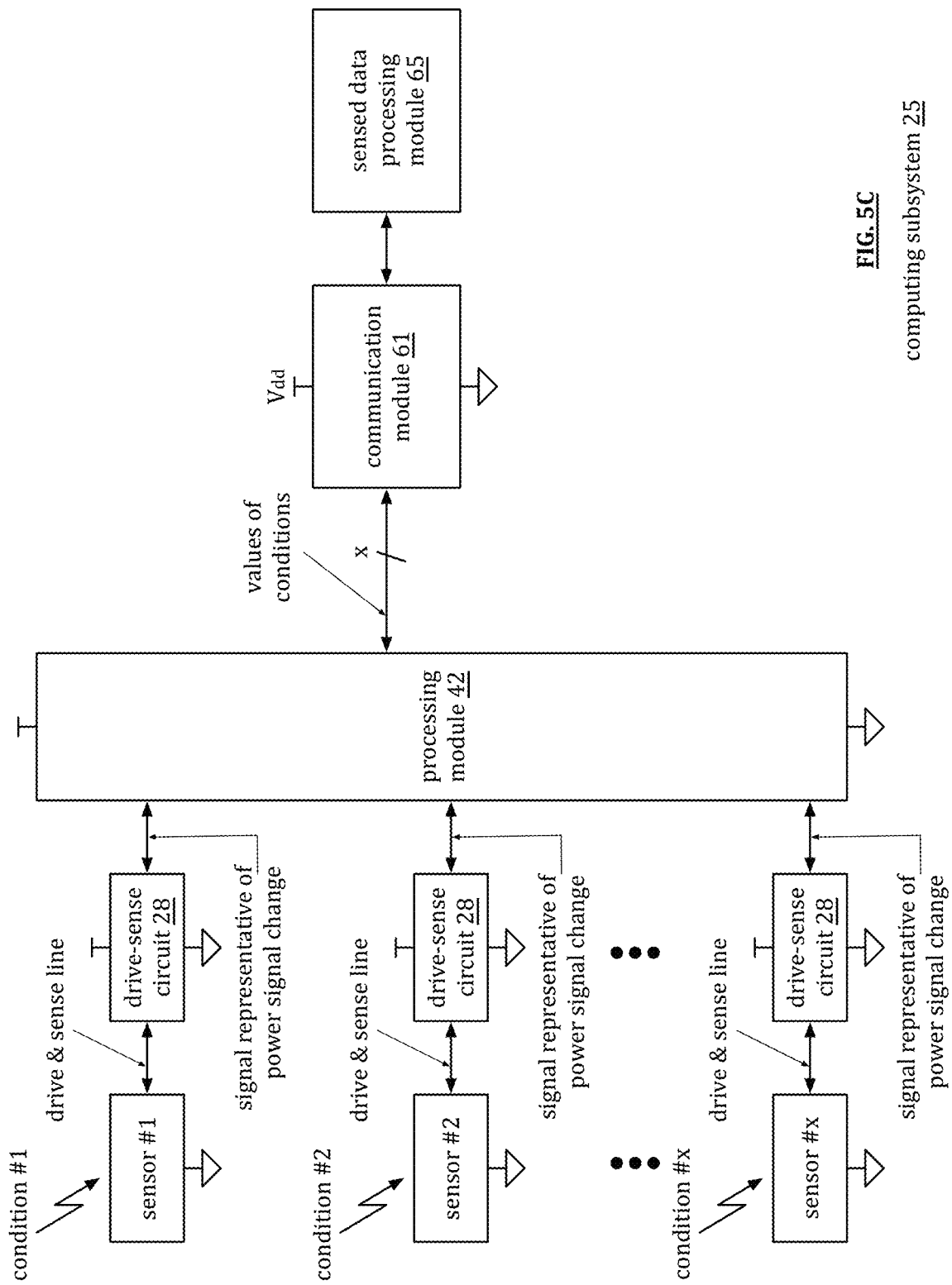
FIG. 5C is a schematic block diagram of another embodiment of a computing subsystem in accordance with the present invention.

FIG. 5C is a schematic block diagram of another embodiment of a computing subsystem 25 that includes a sensed data processing module 65, a communication module 61, a processing module 42, a plurality of drive sense circuits 28, and a plurality of sensors 1-x, which may be sensors 30 of FIG. 1. The sensed data processing module 65 is one or more processing modules within one or more servers 22 and/or one more processing modules in one or more computing devices that are different than the computing device in which the processing module 42 resides.

In an embodiment, the drive-sense circuits 28, the processing module, and the communication module are within a common computing device. The functionality and operation of the sensed data processing module 65, the communication module 61, the processing module 42, the drive sense circuits 28, and the sensors 1-x are as discussed with reference to FIG. 5A.

FIG. 5D is a schematic block diagram of another embodiment of a computing subsystem 25 that includes a processing module 42, a reference signal circuit 100, a plurality of drive sense circuits 28, and a plurality of sensors 30. The processing module 42 includes a drive-sense processing block 104, a drive-sense control block 102, and a reference control block 106. Each block 102-106 of the processing module 42 may be implemented via separate modules of the processing module, may be a combination of software and hardware within the processing module, and/or may be field programmable modules within the processing module 42.

In an example of operation, the drive-sense control block 104 generates one or more control signals to activate one or more of the drive-sense circuits 28. For example, the drive-sense control block 102 generates a control signal that enables of the drive-sense circuits 28 for a given period of time (e.g., 1 second, 1 minute, etc.). As another example, the drive-sense control block 102 generates control signals to sequentially enable the drive-sense circuits 28. As yet another example, the drive-sense control block 102 generates a series of control signals to periodically enable the drive-sense circuits 28 (e.g., enabled once every second, every minute, every hour, etc.).

Continuing with the example of operation, the reference control block 106 generates a reference control signal that it provides to the reference signal circuit 100. The reference signal circuit 100 generates, in accordance with the control signal, one or more reference signals for the drive-sense circuits 28. For example, the control signal is an enable signal, which, in response, the reference signal circuit 100 generates a pre-programmed reference signal that it provides to the drive-sense circuits 28. In another example, the reference signal circuit 100 generates a unique reference signal for each of the drive-sense circuits 28. In yet another example, the reference signal circuit 100 generates a first unique reference signal for each of the drive-sense circuits 28 in a first group and generates a second unique reference signal for each of the drive-sense circuits 28 in a second group.

The reference signal circuit 100 may be implemented in a variety of ways. For example, the reference signal circuit 100 includes a DC (direct current) voltage generator, an AC voltage generator, and a voltage combining circuit. The DC voltage generator generates a DC voltage at a first level and the AC voltage generator generates an AC voltage at a second level, which is less than or equal to the first level. The voltage combining circuit combines the DC and AC voltages to produce the reference signal. As examples, the reference signal circuit 100 generates a reference signal similar to the signals shown in FIG. 7, which will be subsequently discussed.

As another example, the reference signal circuit 100 includes a DC current generator, an AC current generator, and a current combining circuit. The DC current generator generates a DC current a first current level and the AC current generator generates an AC current at a second current level, which is less than or equal to the first current level. The current combining circuit combines the DC and AC currents to produce the reference signal.

Returning to the example of operation, the reference signal circuit 100 provides the reference signal, or signals, to the drive-sense circuits 28. When a drive-sense circuit 28 is enabled via a control signal from the drive sense control block 102, it provides a drive signal to its corresponding sensor 30. As a result of a physical condition, an electrical characteristic of the sensor is changed, which affects the drive signal. Based on the detected effect on the drive signal and the reference signal, the drive-sense circuit 28 generates a signal representative of the effect on the drive signal.

The drive-sense circuit provides the signal representative of the effect on the drive signal to the drive-sense processing block 104. The drive-sense processing block 104 processes the representative signal to produce a sensed value 97 of the physical condition (e.g., a digital value that represents a specific temperature, a specific pressure level, etc.). The processing module 42 provides the sensed value 97 to another application running on the computing device, to another computing device, and/or to a server 22.

Figure 5E:
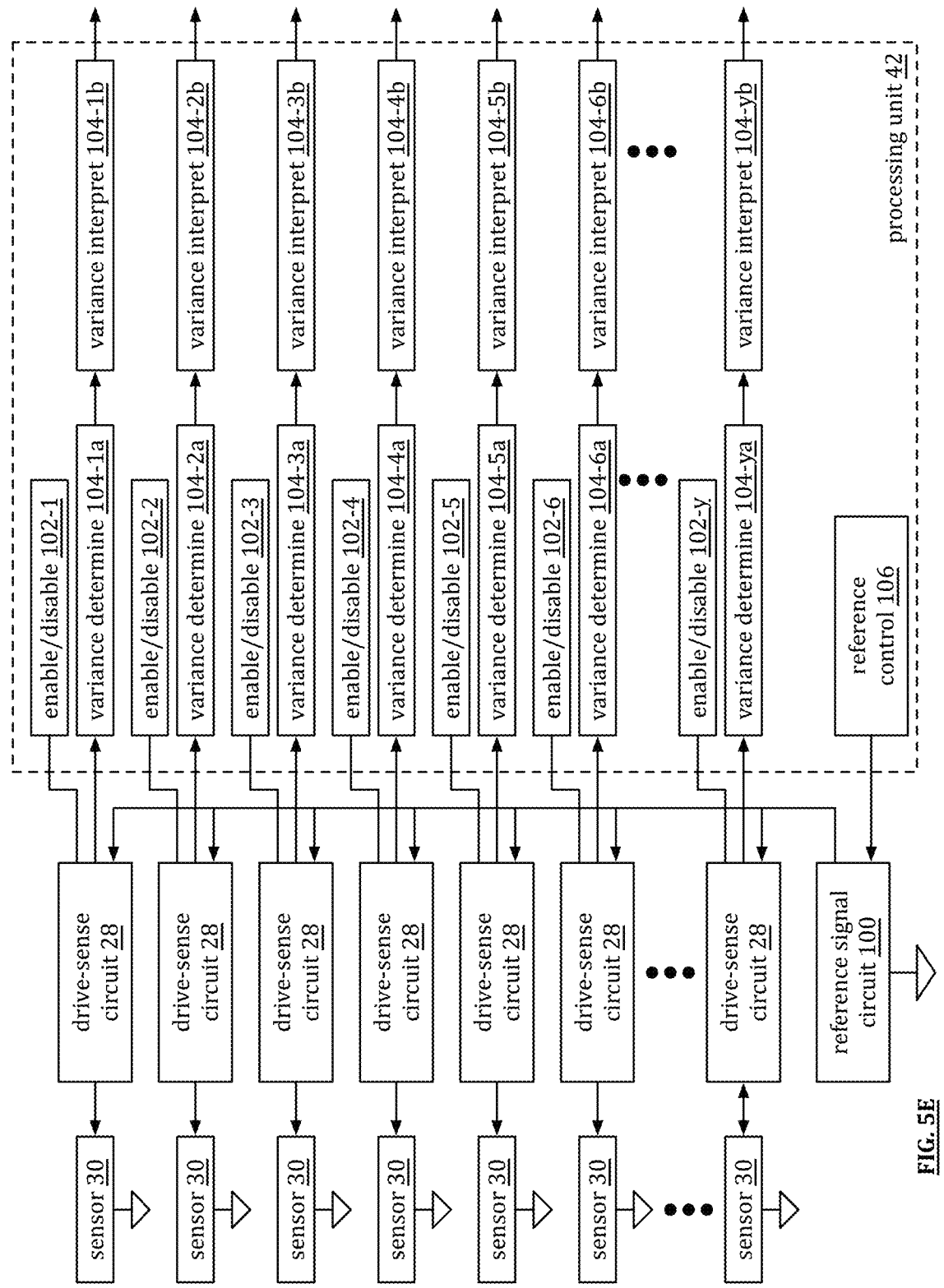
FIG. 5E is a schematic block diagram of another embodiment of a computing subsystem in accordance with the present invention.

FIG. 5E is a schematic block diagram of another embodiment of a computing subsystem 25 that includes a processing module 42, a plurality of drive sense circuits 28, and a plurality of sensors 30. This embodiment is similar to the embodiment of FIG. 5D with the functionality of the drive-sense processing block 104, a drive-sense control block 102, and a reference control block 106 shown in greater detail. For instance, the drive-sense control block 102 includes individual enable/disable blocks 102-1 through 102-y. An enable/disable block functions to enable or disable a corresponding drive-sense circuit in a manner as discussed above with reference to FIG. 5D.

The drive-sense processing block 104 includes variance determining modules 104-1a through y and variance interpreting modules 104-2a through y. For example, variance determining module 104-1a receives, from the corresponding drive-sense circuit 28, a signal representative of a physical condition sensed by a sensor. The variance determining module 104-1a functions to determine a difference from the signal representing the sensed physical condition with a signal representing a known, or reference, physical condition. The variance interpreting module 104-1b interprets the difference to determine a specific value for the sensed physical condition.

As a specific example, the variance determining module 104-1a receives a digital signal of 1001 0110 (150 in decimal) that is representative of a sensed physical condition (e.g., temperature) sensed by a sensor from the corresponding drive-sense circuit 28. With 8-bits, there are $2^8$ (256) possible signals representing the sensed physical condition. Assume that the units for temperature is Celsius and a digital value of 0100 0000 (64 in decimal) represents the known value for 25 degree Celsius. The variance determining module 104-b1 determines the difference between the digital signal representing the sensed value (e.g., 1001 0110, 150 in decimal) and the known signal value of (e.g., 0100 0000, 64 in decimal), which is 0011 0000 (86 in decimal). The variance determining module 104-b1 then determines the sensed value based on the difference and the known value. In this example, the sensed value equals 25+86*(100/256)= 25+33.6=58.6 degrees Celsius.

Figure 6A:
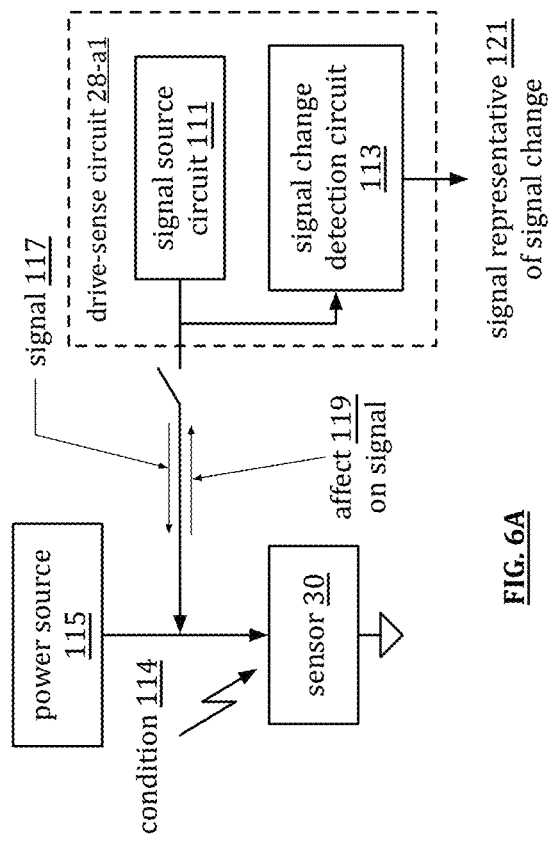
FIG. 6A is a schematic block diagram of another embodiment of a drive sense circuit in accordance with the present invention.
Figure 6:
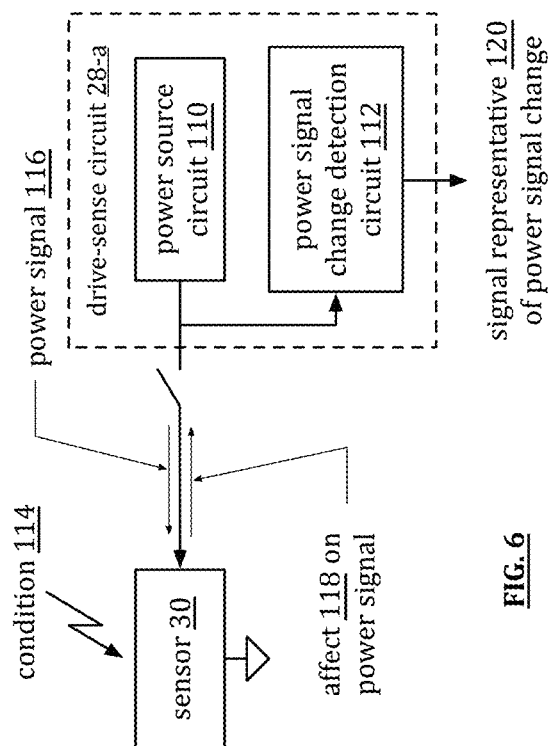
FIG. 6 is a schematic block diagram of a drive center circuit in accordance with the present invention.

FIG. 6 is a schematic block diagram of a drive center circuit 28-a coupled to a sensor 30. The drive sense-sense circuit 28 includes a power source circuit 110 and a power signal change detection circuit 112. The sensor 30 includes one or more transducers that have varying electrical characteristics (e.g., capacitance, inductance, impedance, current, voltage, etc.) based on varying physical conditions 114 (e.g., pressure, temperature, biological, chemical, etc.), or vice versa (e.g., an actuator).

The power source circuit 110 is operably coupled to the sensor 30 and, when enabled (e.g., from a control signal from the processing module 42, power is applied, a switch is closed, a reference signal is received, etc.) provides a power signal 116 to the sensor 30. The power source circuit 110 may be a voltage supply circuit (e.g., a battery, a linear regulator, an unregulated DC-to-DC converter, etc.) to produce a voltage-based power signal, a current supply circuit (e.g., a current source circuit, a current mirror circuit, etc.) to produce a current-based power signal, or a circuit that provide a desired power level to the sensor and substantially matches impedance of the sensor. The power source circuit 110 generates the power signal 116 to include a DC (direct current) component and/or an oscillating component.

When receiving the power signal 116 and when exposed to a condition 114, an electrical characteristic of the sensor affects 118 the power signal. When the power signal change detection circuit 112 is enabled, it detects the affect 118 on the power signal as a result of the electrical characteristic of the sensor. For example, the power signal is a 1.5 voltage signal and, under a first condition, the sensor draws 1 milliamp of current, which corresponds to an impedance of 1.5 K Ohms. Under a second conditions, the power signal remains at 1.5 volts and the current increases to 1.5 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

As another example, the power signal is a 1.5 voltage signal and, under a first condition, the sensor draws 1 milliamp of current, which corresponds to an impedance of 1.5 K Ohms. Under a second conditions, the power signal drops to 1.3 volts and the current increases to 1.3 milliamps. As such, from condition 1 to condition 2, the impedance of the sensor changed from 1.5 K Ohms to 1 K Ohms. The power signal change detection circuit 112 determines this change and generates a representative signal 120 of the change to the power signal.

Figure 7:
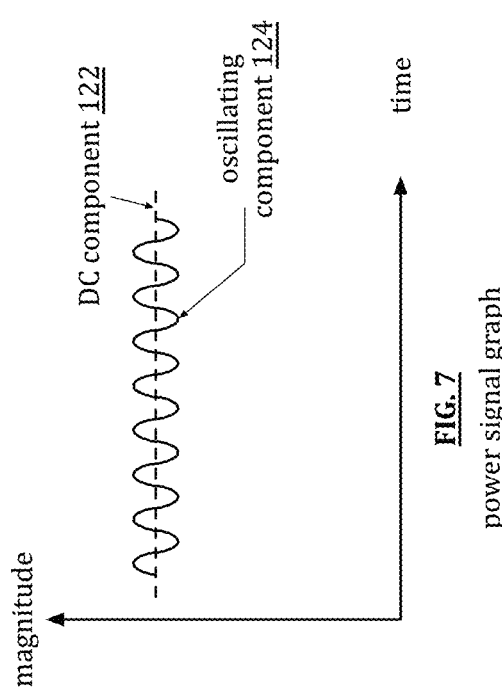
FIG. 7 is an example of a power signal graph in accordance with the present invention.

The power signal 116 includes a DC component 122 and/or an oscillating component 124 as shown in FIG. 7. The oscillating component 124 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component). Note that the power signal is shown without affect from the sensor as the result of a condition or changing condition.

In an embodiment, power generating circuit 110 varies frequency of the oscillating component 124 of the power signal 116 so that it can be tuned to the impedance of the sensor and/or to be off-set in frequency from other power signals in a system. For example, a capacitance sensor's impedance decreases with frequency. As such, if the frequency of the oscillating component is too high with respect to the capacitance, the capacitor looks like a short and variances in capacitances will be missed. Similarly, if the frequency of the oscillating component is too low with respect to the capacitance, the capacitor looks like an open and variances in capacitances will be missed.

In an embodiment, the power generating circuit 110 varies magnitude of the DC component 122 and/or the oscillating component 124 to improve resolution of sensing and/or to adjust power consumption of sensing. In addition, the power generating circuit 110 generates the drive signal 110 such that the magnitude of the oscillating component 124 is less than magnitude of the DC component 122.

FIG. 6A is a schematic block diagram of a drive center circuit 28-al coupled to a sensor 30. The drive sense-sense circuit 28-al includes a signal source circuit 111, a signal change detection circuit 113, and a power source 115. The power source 115 (e.g., a battery, a power supply, a current source, etc.) generates a voltage and/or current that is combined with a signal 117, which is produced by the signal source circuit 111. The combined signal is supplied to the sensor 30.

The signal source circuit 111 may be a voltage supply circuit (e.g., a battery, a linear regulator, an unregulated DC-to-DC converter, etc.) to produce a voltage-based signal 117, a current supply circuit (e.g., a current source circuit, a current mirror circuit, etc.) to produce a current-based signal 117, or a circuit that provide a desired power level to the sensor and substantially matches impedance of the sensor. The signal source circuit 111 generates the signal 117 to include a DC (direct current) component and/or an oscillating component.

When receiving the combined signal (e.g., signal 117 and power from the power source) and when exposed to a condition 114, an electrical characteristic of the sensor affects 119 the signal. When the signal change detection circuit 113 is enabled, it detects the affect 119 on the signal as a result of the electrical characteristic of the sensor.

Figure 8:
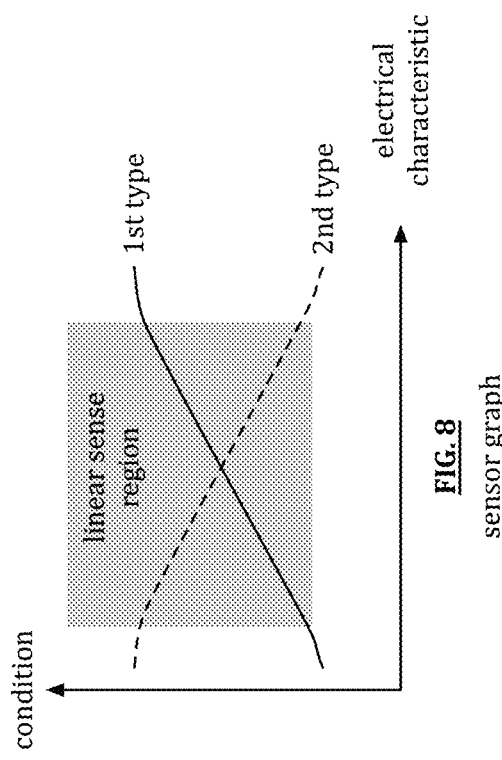
FIG. 8 is an example of a sensor graph in accordance with the present invention.

FIG. 8 is an example of a sensor graph that plots an electrical characteristic versus a condition. The sensor has a substantially linear region in which an incremental change in a condition produces a corresponding incremental change in the electrical characteristic. The graph shows two types of electrical characteristics: one that increases as the condition increases and the other that decreases and the condition increases. As an example of the first type, impedance of a temperature sensor increases and the temperature increases. As an example of a second type, a capacitance touch sensor decreases in capacitance as a touch is sensed.

FIG. 9 is a schematic block diagram of another example of a power signal graph in which the electrical characteristic or change in electrical characteristic of the sensor is affecting the power signal. In this example, the effect of the electrical characteristic or change in electrical characteristic of the sensor reduced the DC component but had little to no effect on the oscillating component. For example, the electrical characteristic is resistance. In this example, the resistance or change in resistance of the sensor decreased the power signal, inferring an increase in resistance for a relatively constant current.

FIG. 10 is a schematic block diagram of another example of a power signal graph in which the electrical characteristic or change in electrical characteristic of the sensor is affecting the power signal. In this example, the effect of the electrical characteristic or change in electrical characteristic of the sensor reduced magnitude of the oscillating component but had little to no effect on the DC component. For example, the electrical characteristic is impedance of a capacitor and/or an inductor. In this example, the impedance or change in impedance of the sensor decreased the magnitude of the oscillating signal component, inferring an increase in impedance for a relatively constant current.

FIG. 11 is a schematic block diagram of another example of a power signal graph in which the electrical characteristic or change in electrical characteristic of the sensor is affecting the power signal. In this example, the effect of the electrical characteristic or change in electrical characteristic of the sensor shifted frequency of the oscillating component but had little to no effect on the DC component. For example, the electrical characteristic is reactance of a capacitor and/or an inductor. In this example, the reactance or change in reactance of the sensor shifted frequency of the oscillating signal component, inferring an increase in reactance (e.g., sensor is functioning as an integrator or phase shift circuit).

FIG. 11A is a schematic block diagram of another example of a power signal graph in which the electrical characteristic or change in electrical characteristic of the sensor is affecting the power signal. In this example, the effect of the electrical characteristic or change in electrical characteristic of the sensor changes the frequency of the oscillating component but had little to no effect on the DC component. For example, the sensor includes two transducers that oscillate at different frequencies. The first transducer receives the power signal at a frequency of $f_1$ and converts it into a first physical condition. The second transducer is stimulated by the first physical condition to create an electrical signal at a different frequency $f_2$. In this example, the first and second transducers of the sensor change the frequency of the oscillating signal component, which allows for more granular sensing and/or a broader range of sensing.

FIG. 12 is a schematic block diagram of an embodiment of a power signal change detection circuit 112 receiving the affected power signal 118 and the power signal 116 as generated to produce, therefrom, the signal representative 120 of the power signal change. The affect 118 on the power signal is the result of an electrical characteristic and/or change in the electrical characteristic of a sensor; a few examples of the affects are shown in FIGS. 8-11A.

In an embodiment, the power signal change detection circuit 112 detect a change in the DC component 122 and/or the oscillating component 124 of the power signal 116. The power signal change detection circuit 112 then generates the signal representative 120 of the change to the power signal based on the change to the power signal. For example, the change to the power signal results from the impedance of the sensor and/or a change in impedance of the sensor. The representative signal 120 is reflective of the change in the power signal and/or in the change in the sensor's impedance.

In an embodiment, the power signal change detection circuit 112 is operable to detect a change to the oscillating component at a frequency, which may be a phase shift, frequency change, and/or change in magnitude of the oscillating component. The power signal change detection circuit 112 is also operable to generate the signal representative of the change to the power signal based on the change to the oscillating component at the frequency. The power signal change detection circuit 112 is further operable to provide feedback to the power source circuit 110 regarding the oscillating component. The feedback allows the power source circuit 110 to regulate the oscillating component at the desired frequency, phase, and/or magnitude.

FIG. 13 is a schematic block diagram of another embodiment of a drive sense circuit 28-b includes a change detection circuit 150, a regulation circuit 152, and a power source circuit 154. The drive-sense circuit 28-b is coupled to the sensor 30, which includes a transducer that has varying electrical characteristics (e.g., capacitance, inductance, impedance, current, voltage, etc.) based on varying physical conditions 114 (e.g., pressure, temperature, biological, chemical, etc.).

The power source circuit 154 is operably coupled to the sensor 30 and, when enabled (e.g., from a control signal from the processing module 42, power is applied, a switch is closed, a reference signal is received, etc.) provides a power signal 158 to the sensor 30. The power source circuit 154 may be a voltage supply circuit (e.g., a battery, a linear regulator, an unregulated DC-to-DC converter, etc.) to produce a voltage-based power signal or a current supply circuit (e.g., a current source circuit, a current mirror circuit, etc.) to produce a current-based power signal. The power source circuit 154 generates the power signal 158 to include a DC (direct current) component and an oscillating component.

When receiving the power signal 158 and when exposed to a condition 114, an electrical characteristic of the sensor affects 160 the power signal. When the change detection circuit 150 is enabled, it detects the affect 160 on the power signal as a result of the electrical characteristic of the sensor 30. The change detection circuit 150 is further operable to generate a signal 120 that is representative of change to the power signal based on the detected effect on the power signal.

The regulation circuit 152, when its enabled, generates regulation signal 156 to regulate the DC component to a desired DC level and/or regulate the oscillating component to a desired oscillating level (e.g., magnitude, phase, and/or frequency) based on the signal 120 that is representative of the change to the power signal. The power source circuit 154 utilizes the regulation signal 156 to keep the power signal at a desired setting 158 regardless of the electrical characteristic of the sensor. In this manner, the amount of regulation is indicative of the affect the electrical characteristic had on the power signal.

In an example, the power source circuit 158 is a DC-DC converter operable to provide a regulated power signal having DC and AC components. The change detection circuit 150 is a comparator and the regulation circuit 152 is a pulse width modulator to produce the regulation signal 156. The comparator compares the power signal 158, which is affected by the sensor, with a reference signal that includes DC and AC components. When the electrical characteristics is at a first level (e.g., a first impedance), the power signal is regulated to provide a voltage and current such that the power signal substantially resembles the reference signal.

When the electrical characteristics changes to a second level (e.g., a second impedance), the change detection circuit 150 detects a change in the DC and/or AC component of the power signal 158 and generates the representative signal 120, which indicates the changes. The regulation circuit 152 detects the change in the representative signal 120 and creates the regulation signal to substantially remove the effect on the power signal. The regulation of the power signal 158 may be done by regulating the magnitude of the DC and/or AC components, by adjusting the frequency of AC component, and/or by adjusting the phase of the AC component.

With respect to the operation of various drive-sense circuits as described herein and/or their equivalents, note that the operation of such a drive-sense circuit is operable simultaneously to drive and sense a signal via a single line. In comparison to switched, time-divided, time-multiplexed, etc. operation in which there is switching between driving and sensing (e.g., driving at first time, sensing at second time, etc.) of different respective signals at separate and distinct times, the drive-sense circuit is operable simultaneously to perform both driving and sensing of a signal. In some examples, such simultaneous driving and sensing is performed via a single line using a drive-sense circuit.

Figure 14A:
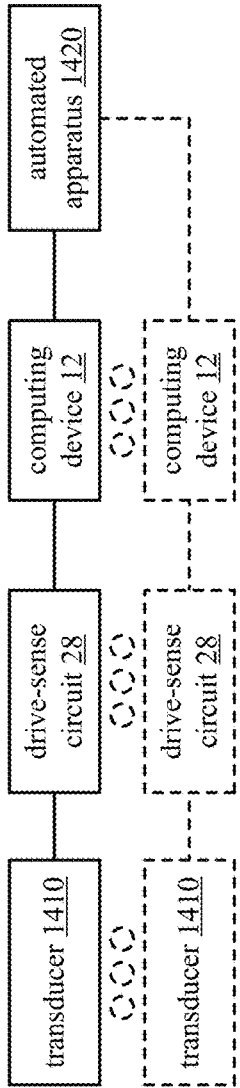
FIG. 14A is a schematic block diagram of an embodiment of a communication system in accordance with the present invention.

FIG. 14A is a schematic block diagram 1401 of an embodiment of a communication system in accordance with the present invention. This diagram shows a transducer 1410 in communication with a drive-sense circuit 28 in communication with a computing device 12. The computing device 12 is in communication with an automated apparatus 1420. Note that the transducer 1410 may be interactive with any number of various devices including a sensor, an actuator, an optical device, and acoustic device, and/or generally, any input and/or output device. In general, any such transducer (including any such transducer 1410) described herein may be operative in such a manner.

Note than any example, embodiment, etc. and/or their equivalents as described herein that describe a particular type of device in communication with a drive-sense circuit (e.g., a sensor, an actuator, an optical device, and acoustic device, and/or generally, any input and/or output device) may alternatively be implemented using another particular type of device in communication with a drive-sense circuit. For example, in an example showing a sensor in communication with a drive-sense circuit, note that any other particular type of device may alternatively in communication with that drive-sense circuit in an alternative example.

In some embodiments, more than one transducer 1410 is implemented. For example, multiple instantiations of a transducer 1410 in communication with a drive-sense circuit 28 in communication with a computing device 12 are implemented. In this diagram, each of the multiple instantiations of such chains of devices is communication with the automated apparatus 1420. In general, with respect to this diagram, a corresponding computing device 12 is deployed to be in communication with a respective drive-sense circuit 28 that is in communication with a respective transducer 1410.

Note that the automated apparatus 1420 may be implemented to perform any of a variety of applications For example, automated apparatus 1420 may be implemented to operate in accordance with a testing system, an assembly line operation, a manufacturing process, a monitoring system, a conveyance system operable to transport items from one location to another, a sorting system such as that which coordinates and manages items for shipping, a warehouse management system, a vehicular automation system, an aircraft automation system, etc. and/or generally any type of automation system. Some specific examples of various automation systems are described herein. Note that while such an automated apparatus 1420 as described herein may be implemented within any of these various automation systems, such implementation is not limited to the various automation systems described herein. In general, any automated apparatus 1420 implemented to perform any one or more automated functions may be operative using one or more drive-sense circuits 28.

Alternative embodiments of communication systems are described below that include one or more transducers. In general, a drive-sense circuit 28 as described herein is operable to provide an interface between the analog domain of the physical world (e.g., such as via transducer 1410) and the digital domain. The drive-sense circuit 28 is operable to perform this interfacing via a single line via which both driving of a signal and simultaneous sensing of that signal is performed.

Figure 14B:
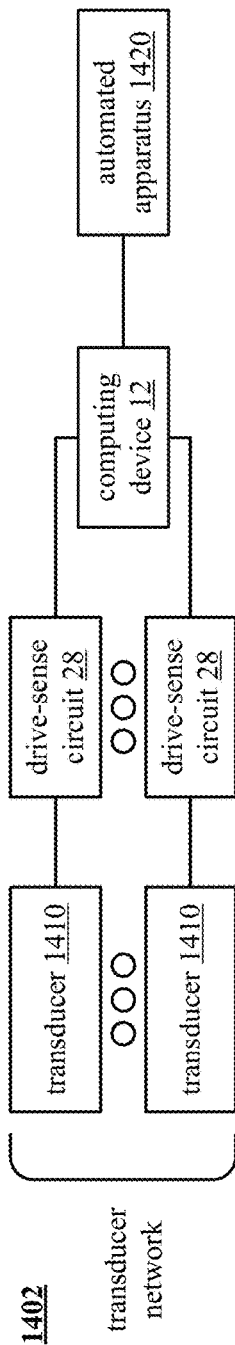
FIG. 14B is a schematic block diagram of an embodiment of a communication system in accordance with the present invention.

FIG. 14B is a schematic block diagram 1402 of an embodiment of a communication system in accordance with the present invention. In this diagram, a transducer network is implemented using two or more transducers 1410. Each of the respective transducers 1410 is in communication with a respective drive-sense circuit 28. A singular computing device 12 is in communication with the multiple respective drive-sense circuits 28. For example, computing device 12 is in communication with a first drive-sense circuit 28, a second drive-sense circuit 28, and optionally additional drive-sense circuits 28. The computing device 12 is in communication with an automated apparatus 1420.

Figure 14C:
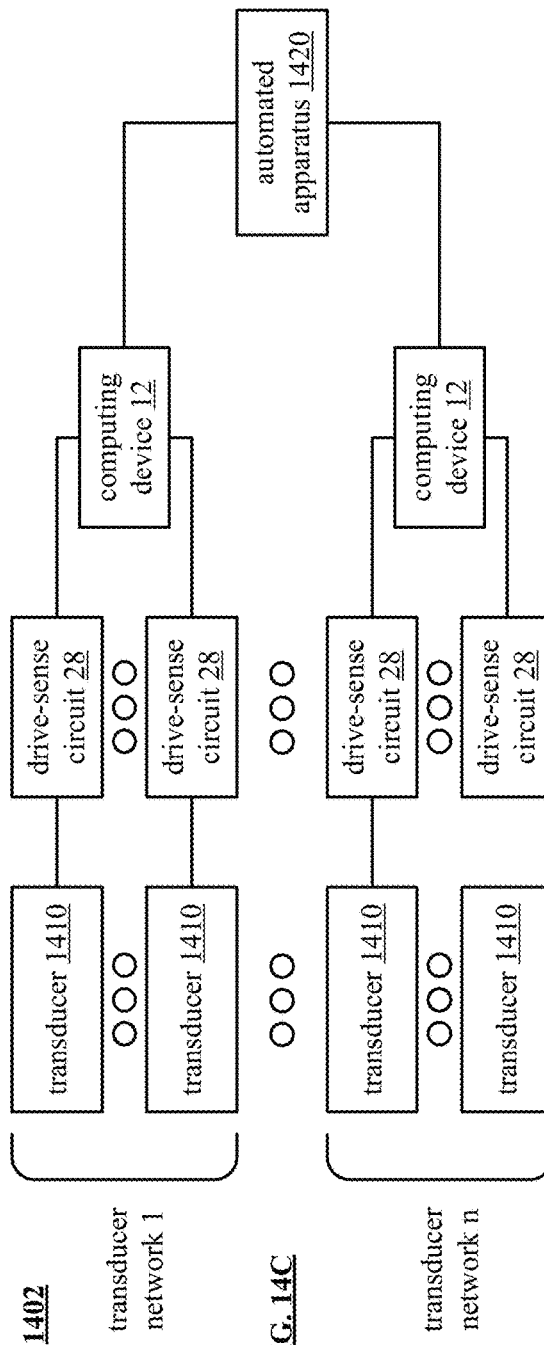
FIG. 14C is a schematic block diagram of an embodiment of a communication system in accordance with the present invention.

FIG. 14C is a schematic block diagram 1403 of an embodiment of a communication system in accordance with the present invention. In this diagram, a number of transducer networks are implemented such that each respectively includes two or more transducers 1410.

Considering transducer network 1, each of the respective transducers 1410 therein is in communication with a respective drive-sense circuit 28. A singular computing device 12 is in communication with the multiple respective drive-sense circuits 28. Computing device 12 is in communication with a first drive-sense circuit 28, a second drive-sense circuit 28, and optionally additional drive-sense circuits 28. The computing device 12 of transducer network 1 is in communication with an automated apparatus 1420.

Considering transducer network n (n being appositive integer greater than or equal to 2), each of the respective transducers 1410 therein is in communication with a respective drive-sense circuit 28. A singular computing device 12 is in communication with the multiple respective drive-sense circuits 28. Computing device 12 is in communication with a first drive-sense circuit 28, a second drive-sense circuit 28, and optionally additional drive-sense circuits 28. Note that different numbers of chains including a respective transducer 14 and drive-sense circuit 28 may be in communication with a respective computing device 12 within a respective transducer network. The computing device 12 of transducer network n is also in communication with an automated apparatus 1420.

FIG. 15A is a schematic block diagram 1501 of an embodiment of a communication system in accordance with the present invention. This diagram shows a transducer 1410 in communication with a drive-sense circuit 28 in communication with a computing device 12. The computing device 12 is in communication with an automated apparatus 1420 via one or more networks 26.

In some embodiments, more than one transducer 1410 is implemented. For example, multiple instantiations of a transducer 1410 in communication with a drive-sense circuit 28 in communication with a computing device 12 are implemented. In this diagram, each of the multiple instantiations of such chains of devices is in communication with the automated apparatus 1420 via the one or more networks 26. In general, with respect to this diagram, a corresponding computing device 12 is deployed to be in communication with a respective drive-sense circuit 28 that is in communication with a respective transducer 1410.

This diagram provides flexibility by which different respective chains of computing device 12 in communication with drive-sense circuit 28 in communication with transducer 1410 may be implemented such that each of the respective computing devices 12 is in communication with the one or more networks 26 and is operable to support communication with the automated apparatus 1420.

Such an embodiment of a communication system as within this diagram and in several other diagrams allows for distributed implementation of the respective chains of a corresponding computing device 12 is deployed to be in communication with a respective drive-sense circuit 28 that is in communication with a respective transducer 1410. Such distributed implementation may be within different locations of a singular building, installation, housing, etc. Alternatively, such distributed implementation may be within different respective and remotely located buildings, installations, housings, etc. and/or portions thereof.

FIG. 15B is a schematic block diagram 1502 of an embodiment of a communication system in accordance with the present invention. In this diagram, a transducer network is implemented using two or more transducers 1410. Each of the respective transducers 1410 thereof is in communication with a respective drive-sense circuit 28. A singular computing device 12 is in communication with the multiple respective drive-sense circuits 28. For example, computing device 12 is in communication with a first drive-sense circuit 28, a second drive-sense circuit 28, and optionally additional drive-sense circuits 28. The computing device 12 is in communication with an automated apparatus 1420 via one or more networks 26.

FIG. 15C is a schematic block diagram 1503 of an embodiment of a communication system in accordance with the present invention. In this diagram, a number of transducer networks are implemented such that each respectively includes two or more transducers 1410.

Considering transducer network 1, each of the respective transducers 1410 thereof is in communication with a respective drive-sense circuit 28. A singular computing device 12 is in communication with the multiple respective drive-sense circuits 28. Computing device 12 is in communication with a first drive-sense circuit 28, a second drive-sense circuit 28, and optionally additional drive-sense circuits 28. The computing device 12 of transducer network 1 is in communication with an automated apparatus 1420 via one or more networks 26.

Considering transducer network n (n being appositive integer greater than or equal to 2), each of the respective transducers 1410 thereof is in communication with a respective drive-sense circuit 28. A singular computing device 12 is in communication with the multiple respective drive-sense circuits 28. Computing device 12 is in communication with a first drive-sense circuit 28, a second drive-sense circuit 28, and optionally additional drive-sense circuits 28. Note that different numbers of chains including a respective transducer 14 and drive-sense circuit 28 may be in communication with a respective computing device 12 within a respective transducer network. The computing device 12 of transducer network n is also in communication with an automated apparatus 1420 via the one or more networks 26.

FIG. 16A is a schematic block diagram 1601 of an embodiment of a communication system in accordance with the present invention. This diagram shows a transducer 1410 in communication with a drive-sense circuit 28 that is in communication with a computing device 12 via one or more networks 26. The computing device 12 is also in communication with an automated apparatus 1420 via the one or more networks 26.

In some embodiments, more than one transducer 1410 is implemented. For example, multiple instantiations of a transducer 1410 in communication with a drive-sense circuit 28 are implemented. In this diagram, each of the multiple instantiations of such chains of devices is communication via the one or more networks 26 to a respective one or more computing devices 12. The one or more computing devices 12 are in communication with the automated apparatus 1420 via the one or more networks 26. In general, with respect to this diagram, a corresponding computing device 12 is deployed to be in communication with a respective drive-sense circuit 28 that is in communication with a respective transducer 1410 via the one or more networks 26.

This diagram provides different flexibility by which different respective chains of a drive-sense circuit 28 in communication with transducer 1410 may be implemented such that each of the respective computing devices 12 is in communication with a respective chain of devices via the one or more networks 26 and is also operable to support communication with the automated apparatus 1420 via the one or more networks 26.

FIG. 16B is a schematic block diagram 1602 of an embodiment of a communication system in accordance with the present invention. In this diagram, a transducer network is implemented using two or more transducers 1410. Each of the respective transducers 1410 thereof is in communication with a respective drive-sense circuit 28. A singular computing device 12 is in communication with the multiple respective drive-sense circuits 28 via the one or more networks 26. For example, computing device 12 is in communication with a first drive-sense circuit 28, a second drive-sense circuit 28, and optionally additional drive-sense circuits 28 via the one or more networks 26. The computing device 12 is also in communication with an automated apparatus 1420 via the one or more networks 26.

FIG. 16C is a schematic block diagram 1603 of an embodiment of a communication system in accordance with the present invention. In this diagram, a number of transducer networks are implemented such that each respectively includes two or more transducers 1410.

Considering transducer network 1, each of the respective transducers 1410 thereof is in communication with a respective drive-sense circuit 28. A singular computing device 12 is in communication with the multiple respective drive-sense circuits 28. Computing device 12 is in communication via one or more networks 26 with a first drive-sense circuit 28, a second drive-sense circuit 28, and optionally additional drive-sense circuits 28. The computing device 12 of transducer network 1 is also in communication with an automated apparatus 1420 via the one or more networks 26.

Considering transducer network n (n being appositive integer greater than or equal to 2), each of the respective transducers 1410 thereof is in communication with a respective drive-sense circuit 28. A singular computing device 12 is in communication with the multiple respective drive-sense circuits 28 via the one or more networks 26. Computing device 12 is in communication with a first drive-sense circuit 28, a second drive-sense circuit 28, and optionally additional drive-sense circuits 28 via the one or more networks 26. Note that different numbers of chains including a respective transducer 14 and drive-sense circuit 28 may be in communication with a respective computing device 12 within a respective transducer network. The computing device 12 of transducer network n is also in communication with an automated apparatus 1420 via the one or more networks 26.

Note that any of a variety of different configurations of one or more computing devices 12 in communication with an automated apparatus 1420 may be implemented including via one or more networks 26.

Various examples, embodiments, etc. of automated apparatus 1420 are described below with reference to certain of the diagrams. Examples of such an automated apparatus 1420 include an assembly system, rotating equipment, a conveyor belt system, a person monitoring system, a communication system (e.g., within any number of applications such as automobile, aircraft, etc.), etc.

FIG. 17A is a schematic block diagram 1701 of an embodiment of an assembly system in accordance with the present invention. This diagram shows an assembly system that operates to assemble vehicles (e.g., cars, trucks, etc.). Assembly machinery is used to place various components on to the vehicle during the assembly process on the assembly line. Appropriate components within the assembly machinery include integrated drive-sense circuits. For example, robotic devices such as may include mechanical arms interact with various components during the assembly process. This may include installing various portions of the vehicle to a frame during his family process, such as placing a door, a wheel including a tire, a motor, a windshield, components of the vehicle, etc. Note also that such robotic devices may be operative and interactive with a user such as a user employing a mechanical arm to assist in the installation of such a various portions of the vehicle during the assembly process.

A drive-sense circuit that is integrated within the assembly machinery may be configured to perform various operations. For example, a drive-sense circuit operating cooperatively with assembly machinery may be configured to sense distance between various components during the assembly process, the relative position of such components during the assembly process, the contact pressure of a component during installation on the vehicle, etc.

Note also that an automated process may include different respective sub-processes. For example, with respect to the assembly of a vehicle, a first sub-process includes installation of the motor and drive train (e.g., such as transmission, etc.), etc. A second sub-process includes installation of the exterior of the vehicle including the hood, side panels, windows, etc.

In certain examples, one or more processing modules 42 (and/or one or more computing devices 12) is in communication with an automated apparatus 1420 that is operable to execute one or more portions of an automated process associated with the assembly system. For example, the one or more processing modules 42 (and/or the one or more computing devices 12) is configured to receive digital signals from at least some of the drive-sense circuits 28, to process those digital signals, and to generate one or more automated process commands to be provided to and used by the automated apparatus 1420 in accordance with the automated process.

FIG. 17B is a schematic block diagram 1702 of an embodiment of components including rotating equipment in accordance with the present invention. Rotating equipment may be implemented within any of a variety of applications and in accordance with a variety of automated processes. A drive-sense circuit 28 is in communication with rotating equipment 1710. Rotating equipment 1710 may operate independently (e.g., such as with respect to any one or more of an assembly machinery, a drill, a pump, a compressor, a turbine, a fan, etc.) or it may couple via one or more components to a load 1720.

In an example, consider that the rotating equipment 1710 is a steam turbine such as may be implemented within an electrical generation system, the load 1720 is the generator that is operable to generate electricity based on its rotation via coupling to the steam turbine. Drive-sense circuit 28 is operable to be in communication with one or more sensors that may be implemented to monitor operation of the steam turbine.

In an example, consider that the rotating equipment 1710 is a motor such as may be implemented within an electrical generation system, the load 1720 is the generator that is operable to generate electricity based on its rotation via coupling to the motor. Drive-sense circuit 28 is operable to be in communication with one or more sensors that may be implemented to monitor operation of the motor and/or the generator. In addition, note that an instantiation of drive-sense circuit 28 is operable to be in communication with the motor itself to deliver a motor drive signal provided to the motor and simultaneously to sense the motor drive signal.

In another example, consider that the rotating equipment 1710 is a fan such as may be implemented within a building to facilitate airflow, in an industrial building such as in accordance with a processing operation, etc. In such an instance, the load 1720 may not be physically implemented. For example, the load 1720 may alternatively be viewed as the resistance against which the fan is implemented to push (or pull) air. Drive-sense circuit 28 is operable to be in communication with one or more sensors that may be implemented to monitor operation of the fan. In addition, note that an instantiation of drive-sense circuit 28 is operable to be in communication with the fan itself to deliver a fan drive signal provided to the fan and simultaneously to sense the fan drive signal.

Note that drive-sense circuit 28, when implemented to drive and simultaneously to sense a signal operable to drive the rotating equipment 1710, is configured to perform a variety of sensing functions with respect to the rotating equipment 7010. For example, the drive-sense circuit 28 is configured to sense one or more of speed of the rotating equipment, torque of the rotating equipment, back electromagnetic force (EMF), back pressure of the rotating equipment, mechanical engagement of the rotating equipment with the load 1720, mechanical engagement of the rotating equipment with one or more coupling components between the rotating equipment and the load 1720, and/or any other characteristic associated with the rotating equipment 1710.

In certain examples, one or more processing modules 42 (and/or one or more computing devices 12) is in communication with an automated apparatus 1420 that is operable to execute one or more portions of an automated process associated with the rotating equipment. For example, the one or more processing modules 42 (and/or the one or more computing devices 12) is configured to receive digital signals from at least some of the drive-sense circuits 28, to process those digital signals, and to generate one or more automated process commands to be provided to and used by the automated apparatus 1420 in accordance with the automated process. Note that the automated apparatus 1420 may alternatively be implemented by the one or more processing modules 42 (and/or the one or more computing devices 12) itself or themselves.

FIG. 18 is a schematic block diagram 1800 of an embodiment of a conveyor belt system in accordance with the present invention. A conveyor belt system may be employed for any of a number of purposes in any of a number of applications. For example, a conveyor belt system may be employed for moving various products from one point to another. Such movement may be associated with manufacturing of one or more articles of manufacture (AoMs), one or more articles or components, production of one or more articles or components (including food products), etc. In general, a conveyor belt system may be implemented in use of manufacturing of any of various components including vehicles (e.g., bicycles, motorcycles, cars, trucks, sports utility vehicles (SUVs), etc.), watercraft (e.g., leisure boats, water skiing boats, fishing boats, etc.), aircraft (e.g., airplanes, helicopters, etc.), computing components (e.g., printed circuit boards, modules, etc.), computing devices (e.g., laptop computers, desktop computers, servers, etc.), personal computing devices (e.g., tablets, cellular phones, smart phones, etc.), displays (e.g., televisions, computer monitors, etc.), appliances (e.g., washing machines, laundry machines, dishwashing machines, refrigerators, freezers, etc.), food processing (e.g., food packing, food preparation, food cooking, food cooling, food freezing, etc.), component moving and sorting (e.g., mail sorting and organizing, shipping and handling sorting and organizing, warehouse item management and organization, AoM management and organization, etc.) and/or any other item(s) that may be moved from one location to another in one or more manufacturing processes including any sub-components thereof.

This diagram shows generally how a conveyor belt system may be viewed as including an endless conveyor belt, such that the respective ends of the conveyor belt are connected thereby forming a continuous and endless loop. The conveyor belt may pass by and around a number of rollers, including end rollers, before repeating its respective path. As may be understood, depending upon the direction of movement of the conveyor belt, a forward pass of the belt and a return path of the belt will be oppositely situated with respect to each other. It is also noted that such conveyor belt systems may be implemented in any of a variety of configurations, including spiral implemented configurations such that certain portions of the conveyor belt pass extend helically around a drum assembly such that products may be conveyed up or down around that drum assembly.

Also, while certain embodiments envision moving product along the path of the conveyor belt in only one direction, alternative embodiments may include capability to drive the conveyor belt in more than one direction (e.g., in a first direction and also in a second direction, such as forward and backward). For example, considering a conveyor belt as an accumulating conveyor, such a conveyor belt may be operative to convey a product in one direction during a first time or time period, and operated to convey that same product, or other product, in another direction during a second time or time period. Certain embodiments may include a forward and reverse direction for conveying product along the path of the conveyor belt. In addition, it is noted that multiple respective conveyor systems may interact cooperatively such that more than a singular pathway exists, and certain portions of conveyors may be operative in forward and backward directions, while other portions of conveyors may be operative in only one of the forward or backward directions, etc. generally speaking, any desired combination of various conveyors, in any desired configuration, including not directly into and pathways, may be implemented in accordance with any one or more of the various aspects, embodiments, and/or their equivalents, of the invention. In some examples, the product(s) are transported via a first conveyor at or during a first time, then are transported via a second conveyor at or during a second time.

With respect to such a conveyor belt system, a drive-sense circuit 28 may be implemented to drive and sense various signals to the various components associated therewith. For example, a drive-sense circuit 28 is configured to drive and simultaneously to sense a signal provided to a motor 1820. Such a motor 1820 is configured to drive a roller, a driver, etc. of the conveyor belt system. Considering another example, a drive-sense circuit 28 is configured to drive and simultaneously to sense a signal provided to a transducer 1410.

Such a transducer 1410 is implemented to provide information associated with any one or more of the components, processes, environmental conditions, etc. associated with the conveyor system. For example, a transducer 1410 may be implemented in accordance with a sensor application to provide environmental information such as temperature, pressure, humidity, etc. associated with the conveyor belt system. Considering another example, a transducer 1410 may be implemented in accordance with a sensor application to provide information relating to the various components of the conveyor belt system including speed of the conveyor belt, torque of a roller or driver of the conveyor belt, etc. In addition, a transducer 1410 may be implemented to provide information related to the proximity of various products, articles of manufacture (AoMs), etc. that are being transported via the conveyor belt system.

Considering yet another example, a transducer 1410 may be implemented in accordance with an actuator application to drive one or more of the components of the conveyor belt system (e.g., the motor 1820, a temperature and/or pressure related component that performs certain operations on the various products, articles of manufacture (AoMs), etc. that are being transported via the conveyor belt system, etc.).

FIG. 19 is a schematic block diagram 1900 of an embodiment of a conveyor belt system in accordance with the present invention. This diagram shows a conveyor belt system implemented with separate processing regions among the pathway of the conveyor belt system. This diagram shows how different respective portions of the conveyor belt may undergo different respective processing. For example, as may be understood in accordance with certain manufacturing processes, different operational steps may be performed on a given AoM at different times during the entire manufacturing process. With respect to food processing and production, different operational steps may be performed in accordance with generating an end food product. It is of course noted that a given product may undergo modification during one or more of the respective operational processes applied thereto, in that, a product may be firstly modified in accordance with the first processing region, secondly modified in accordance with the second processing region, etc. As may be understood, during such operations, the product being conveyed via the conveyor belt system may undergo modification and/or transformation during its respective passage through the conveyor belt system.

In accordance with performing different respective processing operations on respective products (e.g., whether they be articles of manufacture, food components, etc.), different environmental considerations and constraints may be particularly associated with each respective processing region. For example, any two respective processing regions may have as few as one or as many as all different respective characteristics, such as, temperature, humidity, moisture, airflow, pressure (e.g., such as environmental/air pressure within a given region), heating, cooling, drying, freezing, addition of one or more components, modification of size (e.g., such as cutting or reducing to a specified or desired size), packaging, etc. That is to say, each respective processing region may be particularly tailored to performing any one or more of the total operational steps employed in creating an end product. For example, within a food processing and production implementation, a first processing region may be associated with mixing a number of components together, while a second processing region may be associated with cooking the resultant of mixed components, while a third processing region may be associated with cooling the cooked resultant, while a fourth processing region may be associated with packaging the final resultant, etc. Generally, it may be understood that different respective processing regions may be specifically suited and tailored for performing different operations and the respective environmental considerations and constraints within those different respective regions may be varied.

Again, as also described with respect other embodiments, different respective directional movement of product along any one or more conveyors may be made, including both forward and backward movement of product at different respective times or time periods, such as in accordance with an accumulating conveyor.

Within any such conveyance type system such as a conveyor belt system described with reference to FIG. 18 and FIG. 19, note that various transducer networks may be implemented to provide information to an automated apparatus with respect to any one or more of the various processes, sub-processes, processing regions, etc. Note that as few as one single transducer may be included within a transducer network.

In certain examples of a conveyor belt system described with reference to FIG. 18 or FIG. 19, one or more processing modules 42 (and/or the one or more computing devices 12) is in communication with an automated apparatus 1420 that is operable to execute one or more portions of an automated process associated with the conveyor belt system. For example, the one or more processing modules 42 (and/or the one or more computing devices 12) is configured to receive digital signals from at least some of the drive-sense circuits 28, to process those digital signals, and to generate one or more automated process commands to be provided to and used by the automated apparatus 1420 in accordance with the automated process.

Figures 20A, 20B:
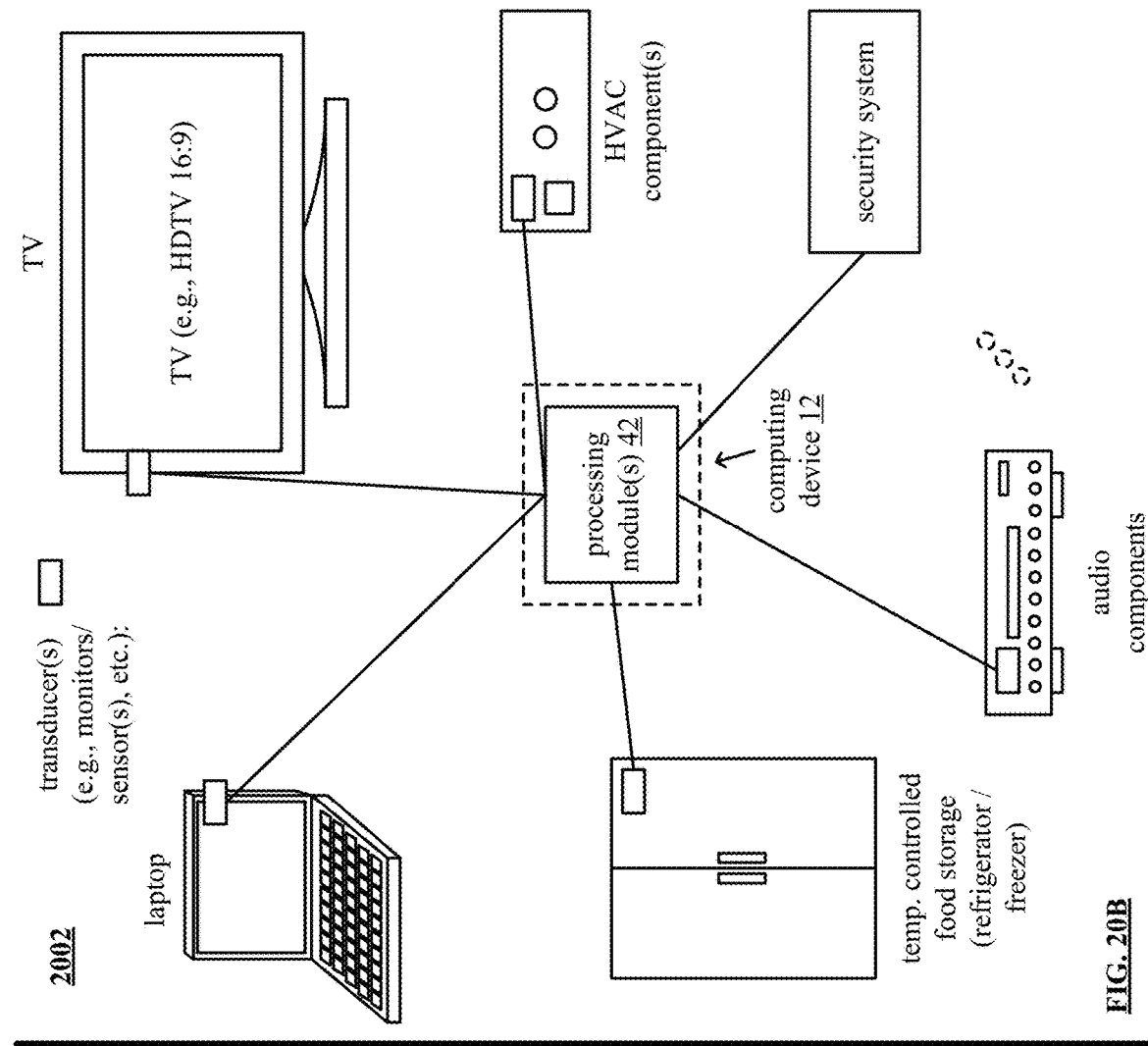
FIG. 20A is a schematic block diagram of an embodiment of a person monitoring system in accordance with the present invention.
FIG. 20B is a schematic block diagram of an embodiment of a communication system in accordance with the present invention.

FIG. 20A is a schematic block diagram 2001 of an embodiment of a person monitoring system in accordance with the present invention. One or more transducers are implemented to drive and/or monitor various components, characteristics, features, a person. Note that some applications operate using components associated with a person that deliver products to the person or maintain operation of one or more organs of the person. Considering some possible examples, such components include as a pacemaker operative in accordance with the cardiovascular system, an insulin pump operative in accordance with a diabetic treatment system, a blood treatment component operative in accordance with a hemophilia treatment system, an intravenous system operative in accordance with delivering a one or more medicines, liquids, etc. to a person via that person's bloodstream, a nutrient delivery operative in accordance with delivering foo, liquid, nutrients, etc. to a person, etc. A drive-sense circuit 28 is implemented in accordance with a transducer and/or actuator application to provide a signal to drive such a component and simultaneously to sense the signal that is used to drive the component.

Note that other applications operate primarily by providing feedback information relating to vital statistics of the person. Considering some examples, such components may include any one or more of a heart rate monitor, a breathing or respiration monitor, a blood pressure monitor, etc. A drive-sense circuit 28 is implemented in accordance with a sensor application to provide a signal to drive such a component and simultaneously to sense the signal that is used to drive the component.

One or more processing modules 42 is in communication with and/or implemented with the one or more drive-sense circuits 28 in accordance with one or more applications associated with a person.

The one or more processing modules 42 (and/or the one or more computing devices 12) is in communication with an automated apparatus 1420 that is operable to execute one or more portions of an automated process associated with the person monitoring system. For example, the one or more processing modules 42 is configured to receive digital signals from at least some of the drive-sense circuits 28, to process those digital signals, and to generate an automated process command to be provided to and used by the automated apparatus 1420 in accordance with the automated process. Note that the automated apparatus 1420 may alternatively be implemented by the one or more processing modules 42 (and/or the one or more computing devices 12) itself or themselves.

FIG. 20B is a schematic block diagram 2002 of an embodiment of a communication system in accordance with the present invention. This embodiment of a communication system includes one or more processing modules 42, which may be implemented within one or more computing devices 12, that is in communication with one or more of other devices that may include one or more of a laptop computer, television, heating, ventilation, air conditioning (HVAC) components, security system, audio components, and/or temperature controlled food storage such as a refrigerator or freezer, etc.

One or more of these other devices includes a transducer 1410 that is in communication with drive-sense circuit 28. The drive-sense circuit 28 is implemented in accordance with a transducer and/or actuator application to provide a signal to drive such a component and simultaneously to sense the signal that is used to drive the component.

In an example of operation and implementation, one or more processing modules 42 (and/or one or more computing devices 12) provides a signal to a component of a HVAC system and simultaneously senses that signal. For example, the one or more processing modules 42 (and/or the one or more computing devices 12) is in communication with a drive-sense circuit 28 that is configured to provide a drive signal to a condensing unit of the HVAC system and simultaneously to sense that signal. The one or more processing modules 42 (and/or the one or more computing devices 12) is configured to receive a digital signal from that drive-sense circuit, to process that drive digital signal, and to generate an automated process command to be provided to and used by and automated apparatus 1420 that is implemented to execute an automated process this is associated with the HVAC system.

In general, any of the respective devices within the communication system is configured to be in communication with one or more drive-sense circuits 28. A respective drive-sense circuit 28 is configured to drive that component and simultaneously to sense the signal that is used to drive that component.

The one or more processing modules 42 (and/or one or more computing devices 12) is in communication with an automated apparatus 1420 that is operable to execute one or more portions of an automated process associated with the communication system. For example, the one or more processing modules 42 is configured to receive digital signals from at least some of the drive-sense circuits 28, to process those digital signals, and to generate an automated process command to be provided to and used by the automated apparatus 1420 in accordance with the automated process. Note that the automated apparatus 1420 may alternatively be implemented by the one or more processing modules 42 (and/or the one or more computing devices 12) itself or themselves.

An example of operation of the automated apparatus 1420 may include operating an HVAC system to maintain a desired temperature, humidity, etc. Another example of operation of the automated apparatus 1420 may include operating one or more audio and/or video components of a home, building, facility, etc. Another example of operation of the automated apparatus 1420 may include operating a security system of a home, building, facility, etc.

Figure 21:
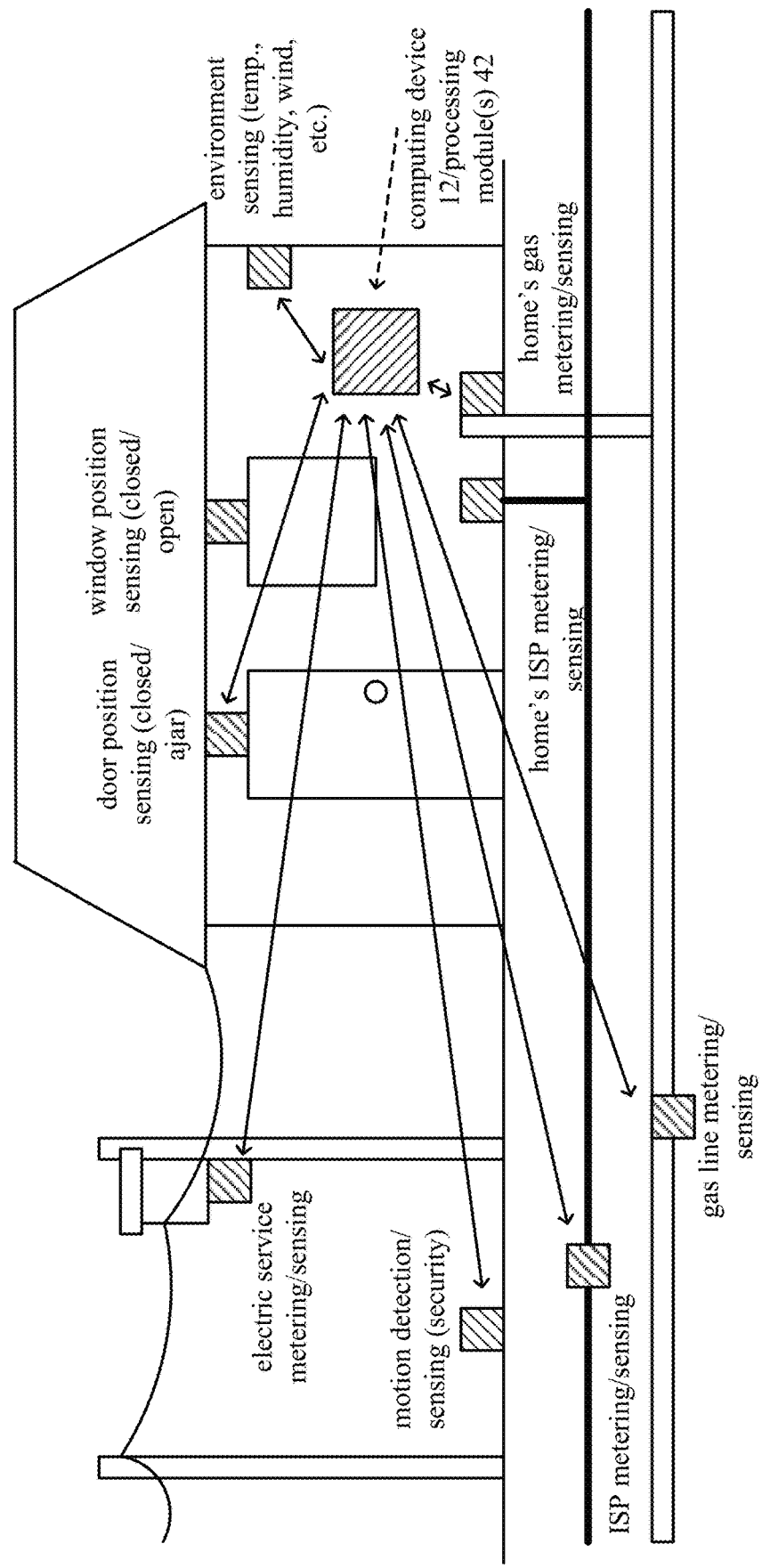
FIG. 21 is a schematic block diagram of an embodiment of a communication system in accordance with the present invention.

FIG. 21 is a schematic block diagram 2100 of an embodiment of a communication system in accordance with the present invention. This diagram includes a number of transducer, sensor, actuator, etc. devices implemented in various locations in an environment including a building or structure. For example, some devices are implemented to support communications associated with monitoring and/or sensing of any of a variety of different conditions, parameters, etc.

In this diagram, multiple respective devices are implemented to forward information related to monitoring and/or sensing to a computing device 12 and/or processing module(s) 42 that may be operating as a manager, coordinator, etc. Generally speaking, such devices may be implemented to perform any of a number of data forwarding, monitoring, and/or sensing operations. For example, in the context of a building or structure, there may be a number of services that are provided to that building or structure, including natural gas line service, electrical service (e.g., such as may include heating, ventilation, air conditioning (HVAC) service), television service, Internet service, security system service, etc. Alternatively, different respective monitors and/or sensors may be implemented throughout the environment to perform monitoring and/or sensing related to parameters not specifically related to services. As some examples, motion detection, door ajar detection, temperature measurement (and/or other atmospheric and/or environmental measurements), etc. may be performed by different respective monitors and/or sensors implemented in various locations and for various purposes and optionally not ties into a security system service.

Different respective monitors and/or sensors may be implemented to provide information related to such monitoring and/or sensing functions to a manager/coordinator wireless communication device (e.g., computing device 12 and/or processing module(s) 42). Such information may be provided continuously, sporadically, intermittently, etc. as may be desired in certain applications.

In addition, it is noted that such communications between such a manager/coordinator wireless communication device of the different respective monitors and/or sensors may be cooperative in accordance with such bidirectional communications, in that, the manager/coordinator wireless communication device may direct the respective monitors and/or sensors to perform certain related functions at subsequent times.

Any of the respective devices within the communication system is configured to be in communication with one or more drive-sense circuits 28. A respective drive-sense circuit 28 is configured to drive that component and simultaneously to sense the signal that is used to drive that component.

The one or more processing modules 42 (and/or the one or more computing devices 12) is in communication with an automated apparatus 1420 that is operable to execute one or more portions of an automated process associated with the communication system. For example, the one or more processing modules 42 is configured to receive digital signals from at least some of the drive-sense circuits 28, to process those digital signals, and to generate an automated process command to be provided to and used by the automated apparatus 1420 in accordance with the automated process. Note that the automated apparatus 1420 may alternatively be implemented by the one or more processing modules 42 (and/or the one or more computing devices 12) itself or themselves. An example of operation of the automated apparatus 1420 may include operating any one or more of the respective system described herein and with respect to the diagram (e.g., one or more components of any one or more of an electric power system, a security system, an Internet Service Provider (ISP) system, a natural gas system, etc.).

Figure 22B:
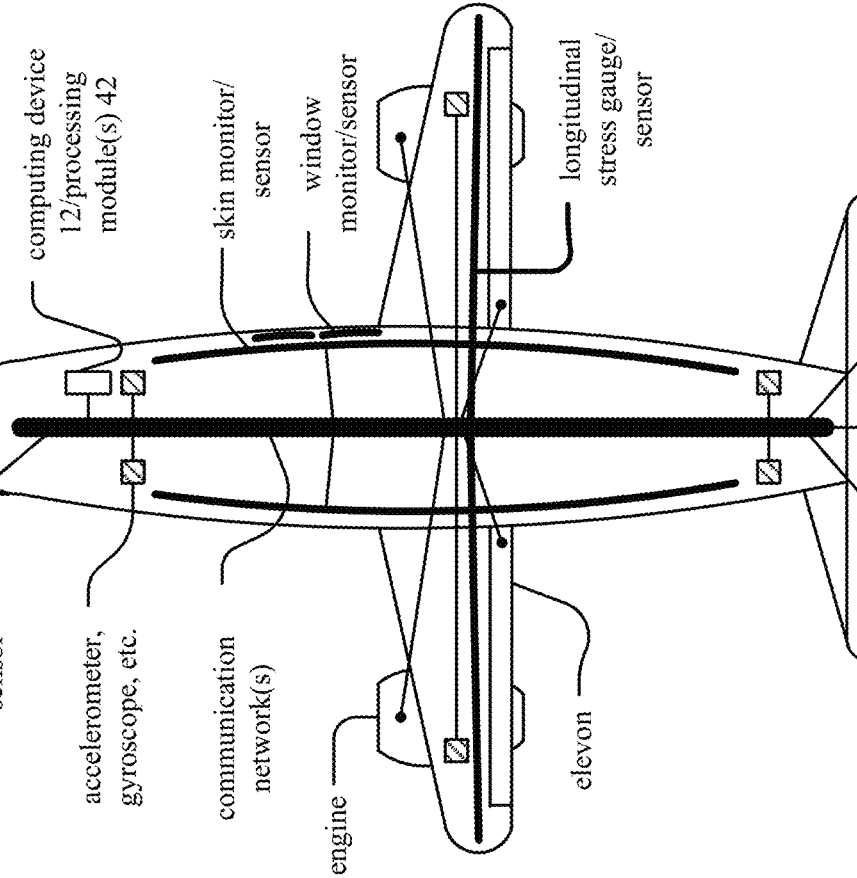
FIG. 22B is a schematic block diagram of an embodiment of one or more communication systems within an aircraft in accordance with the present invention.
Figure 22A:
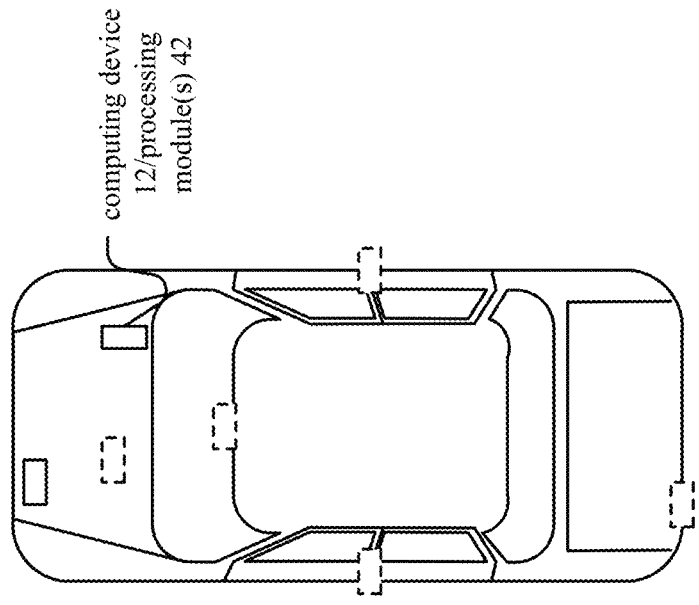
FIG. 22A is a schematic block diagram of an embodiment of one or more communication systems within an automobile in accordance with the present invention.

FIG. 22A is a schematic block diagram 2201 of an embodiment of one or more communication systems within an automobile. Note that while an automobile is used in this diagram, other examples could include any type of transportation vehicle (e.g., a truck, a bus, a taxi, a manually operated vehicle, an autonomous vehicle, a watercraft, etc.). Considering this example of an automobile, one or more input and/or output devices are implemented around the automobile. The input and/or output devices may include cameras with capability to take still photos, capture video, display information to a user, etc.

In another example, the input devices include Laser Illuminated Detection And Ranging (LIDAR) sensors that have capability to measure distance via limiting a target with a light source such as a laser and analyzing the reflected light. Generally, any of a number of different types of sensors that are configured to acquire information regarding the environment in which the automobile is may be implemented to provide an input signal for use by a computing device 12 and/or processing module(s) 42 within the automobile to determine one or more characteristics of a physical environment around the automobile. In some examples, the automobile includes an integrated local area network (LAN) backbone, a wireless local area network (WLAN) communication network, a Bluetooth communication network, a computing device 12 and/or processing module(s) 42, etc.

In one example, the automobile includes an automotive control system and a number of cameras implemented within the vehicle to capture at least one of photographic and video information of a physical environment around the automobile. These camera(s) generate input signal(s) based on the at least one of photographic or video information and provides the input signal(s) to a computing device 12 and/or processing module(s) 42 implemented within the automobile. The input signals from the cameras may pass through respective transducers to generate signals that are compliant for transmission to the computing device 12 and/or processing module(s) 42. The automobile also includes a user interface (e.g., a video screen, a monitor, a navigation screen, a navigation system, a global positioning system (GPS) system, and/or audio speakers, etc.) configured to receive input and/or provide output to a user of the automobile. For example, the user interface receives the control signal from the second transducer and generates and also outputs information corresponding to the physical environment around the automobile based on the control signal. This information may inform a user of the automobile regarding the physical environment around the automobile.

In another example, the automobile includes an automotive control system and one or more laser illuminated detection and ranging (LIDAR) sensors that determines a characteristic that corresponds to a physical environment around the automobile. The LIDAR sensor(s) generate signal(s) based on the characteristic and provides the input signal(s) (e.g., directly or via transducers) to the computing device 12 and/or processing module(s) 42 by way of the integrated LAN backbone. The automotive control system that includes LIDAR sensor(s) may also include a user interface as described just above for use to receive input and/or provide output to a user of the automobile.

In yet another example, the control system is implemented within an autonomous vehicle. The inputs to such a control system within an autonomous vehicle may include camera(s), LIDAR sensor(s), proximity sensor(s), etc. An autonomous vehicle includes one or more actuators configured to receive control signal(s) (e.g., directly or from transducers) and to adapt operation of the autonomous vehicle based on the control signal(s). For example, the actuator(s) may be implemented to control any one of the accelerator pedal, the brake pedal, the steering wheel, the climate control within the vehicle such as air-conditioning or heating, tinting of windows, and/or any other adjustable, configurable, or adaptive element within the autonomous vehicle. Note that such an autonomous vehicle may include capability for manual override of any element by a user of the automobile.

In another example, the automobile includes one or more display components (e.g., including such displays as may also be implemented to operate as a user interface, a touchscreen (TS), etc.). Note that any of the display, user interface, a touchscreen (TS), etc. may be implemented using any of a variety of optical technologies including light emitting diode (LED), organic light emitting diode (OLED), mini-LED, micro-LED, etc. and/or any combination of such optical devices or other optical devices.

Any of the respective devices within the one or more communication systems within an automobile is configured to be in communication with one or more drive-sense circuits 28. A respective drive-sense circuit 28 is configured to drive that component and simultaneously to sense the signal that is used to drive that component.

The one or more processing modules 42 (and/or the one or more computing devices 12) is in communication with an automated apparatus 1420 that is operable to execute one or more portions of an automated process associated with the communication system. For example, the one or more processing modules 42 is configured to receive digital signals from at least some of the drive-sense circuits 28, to process those digital signals, and to generate an automated process command to be provided to and used by the automated apparatus 1420 in accordance with the automated process. Note that the automated apparatus 1420 may alternatively be implemented by the one or more processing modules 42 (and/or the one or more computing devices 12) itself or themselves.

FIG. 22B is a schematic block diagram 2202 of an embodiment of one or more communication systems within an aircraft. A computing device 12 and/or processing module(s) is/are implemented to receive communication from various elements and to provide other communications to actuators that effectuate the position, status, condition, etc. of one or more control elements within an aircraft flight control system implemented within the aircraft. Examples of elements that provide input signals may include any one or more of an accelerometer, a gyroscope, a wind speed sensor, altimeter, a barometric pressure sensor, an optical sensor that detects light and/or darkness, and/or any other instrumentation the may be implemented within an aircraft.

In one example, the control system includes one or both of an accelerometer and a gyroscope that generates input signal(s) based on one or both of acceleration and/or rotation of the aircraft and provides the input signal(s) to the first transducer provides the input signal(s) (e.g., directly or via transducers) to the processor(s) by way of the LAN backbone 116. After the processor(s) 110 have appropriately processed the input signal(s) and generated control signal(s), the processor(s) 110 transmit the control signal(s) (e.g., directly or via transducers) to actuator(s) that adapt position, status, condition, etc. of one or more flight control surfaces of the aircraft flight control system based on the control signal. For example, the actuator(s) may be implemented to control any one of the various flight control surfaces of the aircraft including an elevon (e.g., such as on a main or centrally located wing), a tail elevon, a tail rudder, an aileron, a trim tab, and/or any other flight control surface. The actuator(s) may be implemented to control any one of the various flight control mechanism such as engine speed, any braking mechanism, and/or any other flight control mechanism. In general, the actuator(s) may be implemented to control any element of the aircraft that is part of the aircraft flight control system including any of those that may be governed by autopilot based operation.

Note also that one or more gauges, monitors, sensors may be operative and in communication with one or more drive-sense circuits. For example, along one or more of the wings of the aircraft, a longitudinal stress gauge/sensor may be implemented that is operative and in communication with one or more drive-sense circuits. Such a sensor may be implemented based on a sensing electrode, film, or other one or more elements that is operative and in communication with one or more drive-sense circuits. In some examples, such a sensor is implemented to detect stress, movement, flex, etc. along the length of a wing of the aircraft.

In addition, one or more skin monitors/sensors may be operative and in communication with one or more drive-sense circuits. In some examples, such one or more skin monitors/sensors may be implemented along one or more portions of the aircraft (e.g., along the fuselage, internal to the aircraft and/or external to the aircraft, etc.) is/are implemented to detect stress, movement, flex, etc. along any desired portion of the aircraft.

In addition, one or more window monitors/sensors may be operative and in communication with one or more drive-sense circuits. In some examples, such one or more window monitors/sensors may be implemented along one or more window portions of the aircraft (e.g., along the one or more widows in a passenger portion of the aircraft, along the one or more widows in a cockpit portion of the aircraft, internal to the aircraft and/or external to the aircraft, etc.) is/are implemented to detect stress, movement, flex, etc. along any window portion of the aircraft.

Note also that other systems may be implemented within either the automobile FIG. 22A or the aircraft of FIG. 22B. For example, a first subsystem includes communications for a control system, a second subsystem includes communications for a media-based system for passengers, a third subsystem includes communications for pilot(s) and flight attendant(s), etc. Generally speaking, any one or more subsystems may be implemented within either the automobile FIG. 22A or the aircraft of FIG. 22B.

Any of the respective devices either the automobile FIG. 22A or the aircraft of FIG. 22B is configured to be in communication with one or more drive-sense circuits 28. A respective drive-sense circuit 28 is configured to drive that component and simultaneously to sense the signal that is used to drive that component.

The one or more processing modules 42 (and/or the one or more computing devices 12) is in communication with an automated apparatus 1420 that is operable to execute one or more portions of an automated process associated with the communication system. For example, the one or more processing modules 42 is configured to receive digital signals from at least some of the drive-sense circuits 28, to process those digital signals, and to generate an automated process command to be provided to and used by the automated apparatus 1420 in accordance with the automated process. Note that the automated apparatus 1420 may alternatively be implemented by the one or more processing modules 42 (and/or the one or more computing devices 12) itself or themselves.

Also, note that while many examples have been provided herein detailing various systems that include a drive-sense circuit 28 configured to drive a component of the system and simultaneously to sense the signal that is used to drive that component of the system, note that such applications are not limited specifically to the examples of embodiments described herein. In general, any interface with an analog feature may be serviced by a drive-sense circuit 28. Examples of an analog feature may include any one or more of temperature, humidity, any electrical characteristic such as impedance, voltage, current, etc., proximity to another component, distance between two components, rotational speed of a component, etc. Various examples and embodiments described herein also describe other various types of analog features. Note that any analog feature of any type that is capable of being transformed into an electrical signal of any kind may be serviced via the drive-sense circuit 28.

From certain perspectives, the drive-sense circuit 28 is configured to perform an analog to digital interface between the analog feature of the physical world and one or more processing modules 42 (and/or one or more computing devices 12) that are configured to use digital information that is representative of the analog feature. In certain examples, the drive-sense circuit 28 is configured to the interfacing to any of a number of components including transducers, sensors, actuators, etc. that interactive interface with an analog feature of the physical world to be used in a variety of applications. Certain applications operate in accordance with the Internet, the Internet of Things (IOT), etc. For example, the communication and interactivity between the various components within the system, at least some of which are serviced using a drive-sense circuit 28, may be supported using the Internet and in accordance with an IOT implementation.

In an example of operation and implementation, an automation system includes a plurality of transducers configured to monitor a plurality of analog features associated with the automation system, a plurality of drive-sense circuits, a computing device, and an automated apparatus.

The plurality of transducers is configured to monitor a plurality of analog features associated with the automation system. The plurality of drive-sense circuits is operably coupled to the plurality of transducers (e.g., a first drive-sense circuits operably coupled to a first transducer, a second drive-sense circuits operably coupled to a second transducer, etc.). When enabled, a drive-sense circuit of the plurality of drive-sense circuits is configured to drive and sense a transducer of the plurality of transducers via a single line, generate a digital signal representative of a sensed analog feature to which the transducer of the plurality of transducers is exposed, and transmit the digital signal to a computing device.

The computing device, when enabled, is configured to receive digital signals from at least some of the plurality of drive-sense circuits, and to process the digital signals in accordance with an automation process to produce an automated process command. The automated apparatus, when enabled, is configured to execute a portion of an automated process based on the automated process command.

In some examples, the automation process includes a plurality of sub-processes. Also, a first transducer network includes a first subset of the plurality of transducers configured to monitor a first plurality of sensed analog features including the sensed analog feature associated with a first sub-process, and a second transducer network includes a second subset of the plurality of transducers configured to monitor a second plurality of sensed analog features associated with a second sub-process.

Also, in other examples, another plurality of transducers configured to monitor another plurality of analog features associated with the automation system. Also, another plurality of drive-sense circuits is operably coupled to the plurality of transducers. When enabled, another drive-sense circuit of the other plurality of drive-sense circuits is configured to drive and sense another transducer of the other plurality of transducers via another single line, generate another digital signal representative of another sensed analog feature to which the other transducer of the plurality of another transducers is exposed, and transmit the other digital signal to another computing device.

The other computing device, when enabled, is further configured to receive other digital signals from at least some of the other plurality of drive-sense circuits operably coupled to the other plurality of transducers, and to process the other digital signals in accordance with the automation process to produce another automated process command.

The automated apparatus, when enabled, is further configured to execute another portion of the automated process based on another automated process command that is received from another computing device.

Note that the computing device and the automated apparatus are in communication via a network that includes at least one of a wireless communication system, a cellular communication system, a wire lined communication system, a non-public intranet system, a public internet system, a local area network (LAN), and/or a wide area network (WAN) in some examples.

In addition, certain examples of the drive-sense circuit of the plurality of drive-sense circuits include a power source circuit and a power source change detection circuit. The power source circuit is operably coupled to the transducer of the plurality of transducers via the single line. When enabled, the power source circuit is configured to provide an analog signal via the single line coupling to the transducer of the plurality of transducers, and wherein the analog signal includes at least one of a DC (direct current) component and an oscillating component. The power source change detection circuit operably coupled to the power source circuit. when enabled, the power source change detection circuit is configured to detect an effect on the analog signal that is based on an electrical characteristic of the transducer of the plurality of transducers and to generate the digital signal representative of the sensed analog feature to which the transducer is exposed based on the effect on the analog signal.

In some examples, note that the power source circuit includes a power source to source at least one of a voltage or a current to the transducer of the plurality of transducers via the single line. Also, the power source change detection circuit includes a power source reference circuit configured to provide at least one of a voltage reference or a current reference and also a comparator configured to compare the at least one of the voltage and the current provided to the transducer of the plurality of transducers to the at least one of the voltage reference and the current reference to produce the analog signal.

Note that the plurality of analog features may be of any of a variety of types including environmental pressure, environmental temperature, environmental humidity, component temperature, distance between two components, position of a first component in relation a second component, contact pressure between the first component and the second component, rotational speed of a rotating equipment, and/or torque of the rotating equipment.

Note also that the automation process may be of any of a variety of types including those corresponding to one or more of an assembling process, a manufacturing process, a heating, ventilation, air conditioning (HVAC) process, a security system process, and/or a metering process.

FIG. 23A is a schematic block diagram 2301 of an embodiment of a drive-sense circuit in communication with a transducer and a computing device in accordance with the present invention. In an example of operation and implementation, a transducer 1410 is configured to transform an analog feature into an analog electrical signal. The transducer 1410 is driven via a single line by a drive-sense circuit 28 that is configured to drive a signal to the transducer 1410 and simultaneously to sense that signal via the single line. In alternative examples, note that a transducer 1410 is configured to transform an analog feature into a digital electrical signal (e.g., such that the transducer 1410 is implemented to perform an analog to digital converter (ADC) process). Note that drive-sense circuit 28 is also operative to drive a signal to such an example of the transducer 1410 and simultaneously to sense that signal via the single line.

The drive-sense circuit 28 is configured to perform the analog to digital and/or digital to analog conversion between an analog domain and the digital domain. The drive-sense circuit 28 is configured to generate a digital signal that is representative of the analog feature to which the transducer is exposed (e.g., a condition to which the transducer is exposed). One or more processing modules 42 (and/or one or more computing devices 12) is configured to receive that digital signal and t process that digital signal. Such processing may include generation of digital information corresponding to the analog feature.

In certain examples, this digital information is provided to an automated apparatus 1420. In certain specific examples, the one or more processing modules 42 (and/or the one or more computing devices 12) is configured to process the digital signal in accordance with an automation process to produce an automated process command. The automated apparatus 1420 is configured to execute a portion of the automated process based on that automated process command.

In other examples, the one or more processing modules 42 (and/or the one or more computing devices 12) is configured to provide the digital information corresponding to the analog feature to the automated apparatus 1420. Then, the automation is configured to process the digital signal in accordance with an automation process to produce an automated process command. The automated apparatus 1420 is configured to execute a portion of the automated process based on that automated process command.

Note that while the coupling and/or connectivity between the drive-sense circuit 28 and the transducer 1410 may be implemented using a single line, the communication between the drive-sense circuit 28 and the one or more processing modules 42 (and/or the one or more computing devices 12) may be implemented using any of a number of different means including multi-line and/or multi-pathway communications including n such lines and/or pathways (e.g., where n is a positive integer greater than or equal to 1).

Note that while examples and embodiments included herein describe transducer 1410, note that any number of devices, components, etc. that interface with an analog feature in the physical world may be implemented in place of transducer 1410 as pictorially shown. For example, a sensor, an actuator, and/or any other device, component, etc. may be implemented in place of transducer 1410 as pictorially shown.

FIG. 23B is a schematic block diagram 2302 of an embodiment of a drive-sense circuit in communication with a transducer in accordance with the present invention. In an example of operation and implementation, a transducer 1410 is exposed to a sensed analog feature. Many types of transducers have an impedance separating them from a ground potential (e.g., a ground voltage level). A drive-sense circuit 28 is configured to drive a signal via a single line to a transducer 1410 that is separated from the ground voltage potential and simultaneously to sense that signal via the single line. Note that the drive-sense circuit 28 may be connected to a different ground potential and/or a different ground potential contact point than the transducer 1410. The drive-sense circuit 28 is configured to communicate with the transducer 1410 via the single line. Regardless of the transducer type of the transducer 1410 and regardless of the manner in which it is electrically configured as it is exposed to an analog feature, the drive-sense circuit 28 is configured to interface with the transducer 1410 via the single line.

Figure 24A:
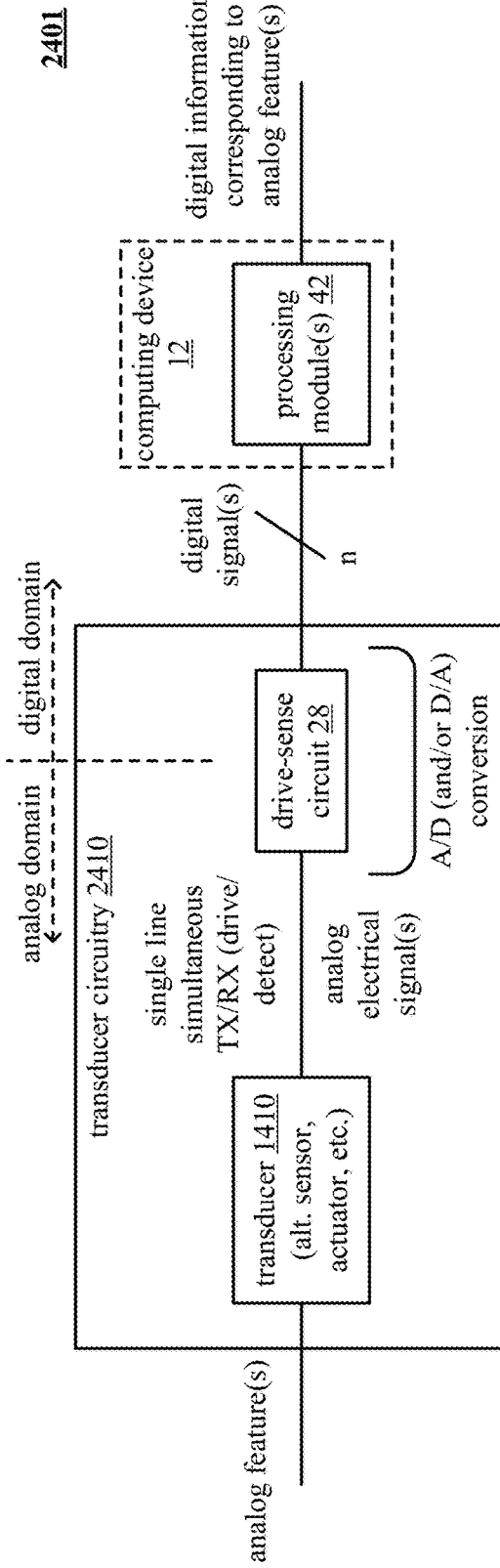
FIG. 24A is a schematic block diagram of an embodiment of a transducer circuitry in communication with one or more processing modules (and/or computing devices) in accordance with the present invention.

FIG. 24A is a schematic block diagram 2401 of an embodiment of a transducer circuitry in communication with one or more processing modules (and/or computing devices) in accordance with the present invention. Similar to the previous diagram, this diagram shows a transducer 1410, a drive-sense circuit 28, and one or more processing modules 42 (and/or one or more computing devices 12). In this diagram, the transducer 1410 and the drive-sense circuit 28 are implemented within a transducer circuitry 2410. The transducer circuitry 2410 includes the capability and functionality of both the transducer 1410 and the drive-sense circuit. A transducer 1410 is integrated into a single device with a corresponding drive-sense circuit 28 thereby forming the transducer circuitry 2410. Note that any such transducer 1410 may be integrated with and implemented with a corresponding drive-sense circuit 28.

Figure 24B:
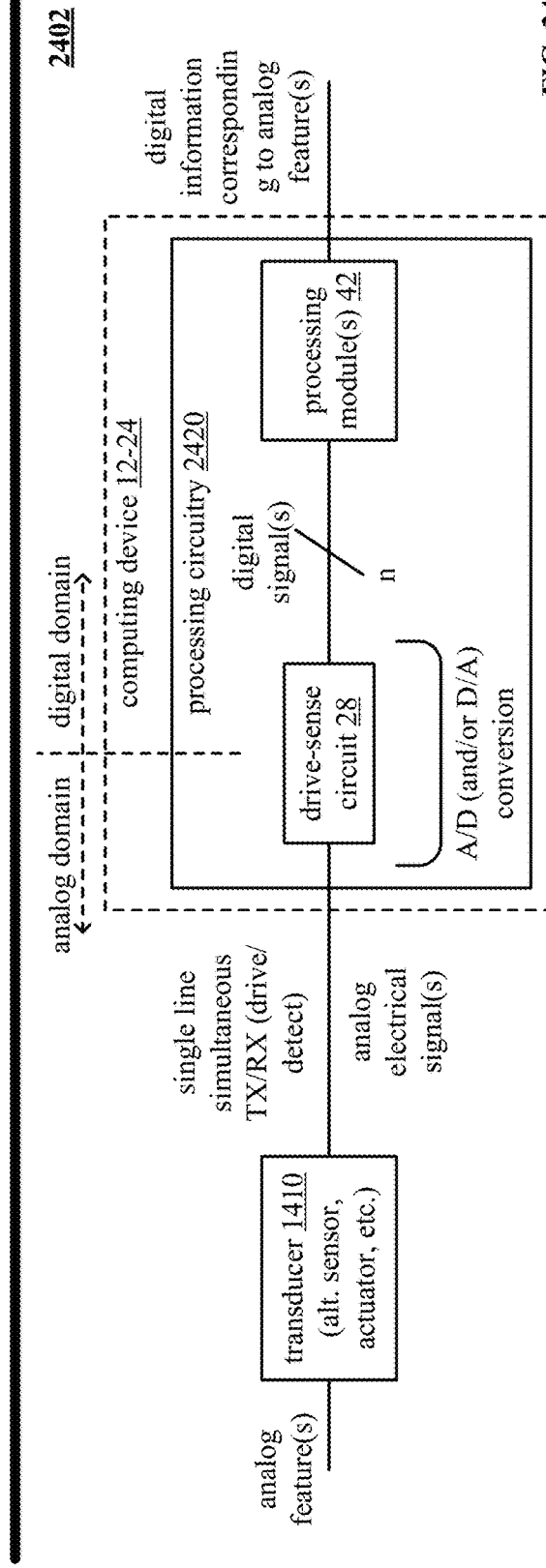
FIG. 24B is a schematic block diagram of an embodiment of implementation of a transducer circuitry in communication with processing circuitry in accordance with the present invention.

FIG. 24B is a schematic block diagram 2402 of an embodiment of implementation of a transducer circuitry in communication with processing circuitry in accordance with the present invention. Similar to certain previous diagrams, this diagram shows a transducer 1410, a drive-sense circuit 28, and one or more processing modules 42. In this diagram, the drive-sense circuit 28 and the one or more processing modules 42 are implemented within a computing device 12-24 that is a variant of computing device 12. A corresponding drive-sense circuit 28 is integrated into a single device with the one or more processing modules 42 thereby forming the circuit 28 and the one or more processing modules 42 are implemented within a computing device 12-24. Note that any such one or more processing modules 42 may be integrated with and implemented with a corresponding drive-sense circuit 28.

In general, note that the respective components of the transducer 1410, the drive-sense circuit 28, and the one or more processing modules 42 (and/or the one or more computing devices 12) may be implemented in a variety of ways including various forms of integration between the respective components. In general, any device that is operative to be driven by a signal provided from a drive-sense circuit 28 may alternatively be modified to include such a drive-sense circuit 28 integrated therein. Similarly, any such one or more processing modules 42 (and/or one or more computing devices 12) that is operative to be in communication with the drive-sense circuit may alternatively be modified to include such a drive-sense circuit 28 integrated therein.

Note that such drive-sense circuit may be separately implemented from transducer 1410 and the one or more processing modules 42 (and/or the one or more computing devices 12), may be integrated with the transducer 1410, may be integrated with the one or more processing modules 42 (and/or the one or more computing devices 12), or may alternatively be distributed among both the transducer 1410 and the one or more processing modules 42 (and/or the one or more computing devices 12) such that a portion of the drive-sense circuit 28 is included within the transducer 1410 and at least one other portion of the drive-sense circuit 28 is included within the one or more processing modules 42 (and/or the one or more computing devices 12).

FIG. 25A is a schematic block diagram 2501 of an embodiment of a transducer circuitry in communication with one or more processing modules (and/or computing devices) in accordance with the present invention. Similar to certain previous diagrams, this diagram shows a transducer 1410 and a drive-sense circuit 28. In this diagram, the drive-sense circuit 28 is in communication with the one or more processing modules 42 (and/or the one or more computing devices 12) via a communication link that includes n lines or pathways (n being a positive integer greater than or equal to 1). Note that the communication link may be implemented in any of a variety of ways including a wired communication link, and optical fiber communication link, a hybrid fiber-coaxial (HFC) communication links (e.g., that may include various wired and/or optical fiber communication segments, light sources, light or photo detection components, etc.), etc.

Also, the drive-sense circuit 28 is implemented to provide connectivity to another component that is being driven by the drive-sense circuit 28 via hardwiring (e.g., via a wired connection) that may be implemented via a single line. However, note that alternative forms of connectivity between the drive-sense circuit 28 and another component may be implemented. For example, connectivity between the drive-sense circuit 28 and another component may be implemented based on near-field communication (NFC). Also, connectivity between the drive-sense circuit 28 and another component may be implemented based on inductive coupling (e.g., such as via a transformer, inductive windings, NFC, etc.). In yet another alternative example, connectivity between the drive-sense circuit 28 and another component may be implemented based on an infrared (IR) coupler that is capable to transmit a signal and simultaneously to provide feedback of that signal in accordance with operation of the drive-sense circuit 28. In yet another alternative example, connectivity between the drive-sense circuit 28 and another component may be implemented based on an optical coupling device that is capable to transmit an optical signal and simultaneously to provide feedback of that optical signal in accordance with operation of the drive-sense circuit 28 (e.g., to perform simultaneous transmission and sensing of the optical signal).

In general, connectivity between the drive-sense circuit 28 and another component may be implemented based on any form of communication that is capable to transmit a signal and simultaneously to provide feedback of that signal in accordance with operation of the drive-sense circuit 28.

FIG. 25B is a schematic block diagram 2502 of an embodiment of a transducer circuitry in communication with one or more processing modules (and/or computing devices) in accordance with the present invention. Similar to certain previous diagrams, this diagram shows a transducer 1410 and a drive-sense circuit 28. In this diagram, the drive-sense circuit 28 is in communication with the one or more processing modules 42 (and/or the one or more computing devices 12) via at least one wireless communication link. Note that the wireless communication link may be implemented to include n lines or pathways (n being a positive integer greater than or equal to 1). The drive-sense circuit 28 is implemented to provide connectivity to another component that is being driven by the drive-sense circuit 28 via hardwiring (e.g., via a wired connection) that may be implemented via a single line. As with the previous diagram, connectivity between the drive-sense circuit 28 and another component may be implemented based on any form of communication that is capable to transmit a signal and simultaneously to provide feedback of that signal in accordance with operation of the drive-sense circuit 28 including those particularly described above.

FIG. 25C is a schematic block diagram 2503 of an embodiment of a communication system in accordance with the present invention. This diagram shows communication between computing device 12 and/or processing module(s) and computing device 12-25*a*. A computing device 12-25*s* is in communication with computing device 12 (and/or any number of other computing devices) via one or more transmission media. The computing device 12-25*a* includes a communication interface 2560 to perform transmitting and receiving of at least one signal, symbol, packet, frame, etc. (e.g., using a transmitter 2562 and a receiver 2564).

Generally speaking, the communication interface 2560 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the computing device 12-25*a* also includes one or more processing module(s) 42 and an associated memory 2540, to execute various operations including interpreting at least one signal, symbol, packet, and/or frame transmitted to computing device 12 and/or received from the computing device 12. The computing device 12-25*a* and computing device 12 may be implemented using at least one integrated circuit in accordance with any desired configuration or combination of components, modules, etc. within at least one integrated circuit.

Also, in some examples, note that one or more of the processing module(s) 42, the communication interface 2560 (including the TX 2562 and/or RX 2564 thereof), and/or the memory 2540 may be implemented in one or more "processing modules," "processing circuits," "processors," and/or "processing units" or their equivalents. Considering one example, a system-on-a-chip (SOC) 2530*a* may be implemented to include the processing module(s) 42, the communication interface 2560 (including the TX 2562 and/or RX 2564 thereof), and the memory 2540 (e.g., SOC 2530*a* being a multi-functional, multi-module integrated circuit that includes multiple components therein). Considering another example, processing-memory circuitry 2530*b* may be implemented to include functionality similar to both the processing module(s) 42 and the memory 2540 yet the communication interface 2560 is a separate circuitry (e.g., processing-memory circuitry 2530*b* is a single integrated circuit that performs functionality of processing circuitry and a memory and is coupled to and also interacts with the communication interface 2560).

Considering even another example, two or more processing circuitries may be implemented to include the processing module(s) 42, the communication interface 2560 (including the TX 2562 and/or RX 2564 thereof), and/or the memory 2540. In such examples, such a "processing circuitry" or "processing circuitries" (or "processor" or "processors") is/are configured to perform various operations, functions, communications, etc. as described herein. In general, the various elements, components, etc. shown within the computing device 12-25a may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the computing device 12-25a includes both processing module(s) 42, the communication interface 2560 configured to perform various operations. In other examples, the computing device 12-25a includes SOC 2530a configured to perform various operations. In even other examples, the computing device 12-25a includes processing-memory circuitry 2530b configured to perform various operations. Generally, such operations include generating, transmitting, etc. signals intended for one or more other devices (e.g., computing device 12 and/or other processing module(s) 42) and receiving, processing, etc. other signals received for one or more other devices (e.g., computing device 12 and/or other processing module(s) 42).

In some examples, note that the communication interface 2560, which is coupled to the processing module(s) 42, that is configured to support communications within a satellite communication system, a wireless communication system, a wired communication system, a fiber-optic communication system, and/or a mobile communication system (and/or any other type of communication system implemented using any type of communication medium or media). Any of the signals generated and transmitted and/or received and processed by the computing device 12-25a may be communicated via any of these types of communication systems.

In addition, the processing module(s) 42 is coupled to a drive-sense circuit 28 as described herein. The drive-sense circuit 28 is implemented to interact with a transducer, a sensor, an actuator, and/or other component(s). Note that the drive-sense circuit 28 is configured to perform simultaneous driving and sensing of signals provided to such a transducer, a sensor, an actuator, and/or other component(s).

FIG. 25D is a schematic block diagram 2504 of an embodiment of a communication system in accordance with the present invention. This diagram is similar to the prior diagram with the exception that a computing device 12-25b (that includes similar components as the computing device 12-25a of the prior diagram) is implemented to support wireless communications with computing device 12 and/or other processing module(s) 42. For example, this diagram shows communication between computing device 12 and/or other processing module(s) and computing device 12-25b that are implemented as wireless communication devices. Also, the computing device 12-25b and computing device 12 may each include one or more antennas for transmitting and/or receiving of at least one signal, symbol, packet, frame, etc. (e.g., computing device 12-25b and may include m antennas, and computing device 12 may include n antennas, such that m and n are positive integers and may be different valued positive integers).

FIG. 26 is a schematic block diagram illustrating an embodiment of a method 2600 for execution by one or more devices in accordance with the present invention. The method 2600 begins by transmitting one or more signals to a transducer in step 2610. The method 2600 continues by detecting signals from the transducer in step 2620. This detection may include any one or more of change of the one or more signals transmitted to the transducer, one or more signals produced by the transducer in response to one or more analog features, one or more other signals included with the one or more signals produced by the transducer, etc. In general, the detection of the one or more signals from the transducer includes not only the one or more signals transmitted to the transducer, but any other signal that has been coupled into and is included with in the one or more signals from the transducer. Note that other signals that may be coupled into and included within the one or more signals from the transducer may correspond to interference, noise, and/or any other source of signal.

Also, note that operations of the step 2610 and the step 2620 may be performed simultaneously. For example, the transmitting of the one or more signals to the transducer and the detection of one or more signals from the transducer may be performed simultaneously. As an example, a signal to be transmitted to the transducer and step 2610 while that signal is simultaneously sensed in step 2620.

The method 2600 and then operates by processing the one or more signals from the transducer to generate digital information corresponding to one or more analog features to which the transducer is exposed in step 2630.

FIG. 27 is a schematic block diagram illustrating an embodiment of a method 2700 for execution by one or more devices in accordance with the present invention. The method 2700 operates in step 2710 by monitoring a plurality of analog features associated with the automation system via a plurality of transducers operably coupled to a plurality of drive-sense circuits. The method 2700 also operates a drive-sense circuit of the plurality of drive-sense circuits in accordance with performing various operations. This involves, in step 2720, to drive and sense a transducer of the plurality of transducers via a single line. In step 2730, this operates to generate a digital signal representative of a sensed analog feature to which the transducer of the plurality of transducers is exposed. In step 2740, this operates to transmit the digital signal to a computing device.

The method 2700 also operates the computing device in accordance with performing various operations. In step 2750, this operates to receive digital signals from at least some of the plurality of drive-sense circuits. In step 2760, thus operates to process the digital signals in accordance with an automation process to produce an automated process command. The method 2700 also operates in step 2770 by executing, by an automated apparatus, a portion of an automated process based on the automated process command.

In variants of the method 2700, the automation process including a plurality of sub-processes. Such variants of the method 2700 also operate by monitoring a first plurality of sensed analog features including the sensed analog feature associated with a first sub-process based on a first transducer network that includes a first subset of the plurality of transducers. Such variants of the method 2700 also operate by monitoring a second plurality of sensed analog features associated with a second sub-process based on a second transducer network includes a second subset of the plurality of transducers.

In addition, other variants of the method 2700 operate by monitoring another plurality of analog features associated with the automation system via another plurality of transducers operably coupled to another plurality of drive-sense circuits. Such other variants of the method 2700 also operate by operating another drive-sense circuit of the other plurality of drive-sense circuits to perform various operations. This involves capability and functionality to drive and to sense another transducer of the other plurality of transducers via another single line, to generate another digital signal representative of another sensed analog feature to which the other transducer of the other plurality of transducers is exposed, and to transmit the other digital signal to another computing device. Such other variants of the method 2700 also operate by operating the other computing device to perform various operations. This includes to receive other digital signals from at least some of the other plurality of drive-sense circuits and to process the other digital signals in accordance with the automation process to produce another automated process command. Such other variants of the method 2700 also operate by executing, by the automated apparatus, another portion of the automated process based on the other automated process command.

In addition, within some variants of the method 2700, the computing device and the automated apparatus in communication via a network that includes at least one of a wireless communication system, a wire lined communication system, a non-public intranet system, a public internet system, a local area network (LAN), and/or a wide area network (WAN).

In addition, certain examples of the drive-sense circuit of the plurality of drive-sense circuits include a power source circuit and a power source change detection circuit. The power source circuit is operably coupled to the transducer of the plurality of transducers via the single line. When enabled, the power source circuit is configured to provide an analog signal via the single line coupling to the transducer of the plurality of transducers, and wherein the analog signal includes at least one of a DC (direct current) component and an oscillating component. The power source change detection circuit operably coupled to the power source circuit. when enabled, the power source change detection circuit is configured to detect an effect on the analog signal that is based on an electrical characteristic of the transducer of the plurality of transducers and to generate the digital signal representative of the sensed analog feature to which the transducer is exposed based on the effect on the analog signal.

In some examples, note that the power source circuit includes a power source to source at least one of a voltage or a current to the transducer of the plurality of transducers via the single line. Also, the power source change detection circuit includes a power source reference circuit configured to provide at least one of a voltage reference or a current reference and also a comparator configured to compare the at least one of the voltage and the current provided to the transducer of the plurality of transducers to the at least one of the voltage reference and the current reference to produce the analog signal.

Note that the plurality of analog features may be of any of a variety of types including environmental pressure, environmental temperature, environmental humidity, component temperature, distance between two components, position of a first component in relation a second component, contact pressure between the first component and the second component, rotational speed of a rotating equipment, and/or torque of the rotating equipment.

Note also that the automation process may be of any of a variety of types including those corresponding to one or more of an assembling process, a manufacturing process, a heating, ventilation, air conditioning (HVAC) process, a security system process, and/or a metering process.

Figure 28:
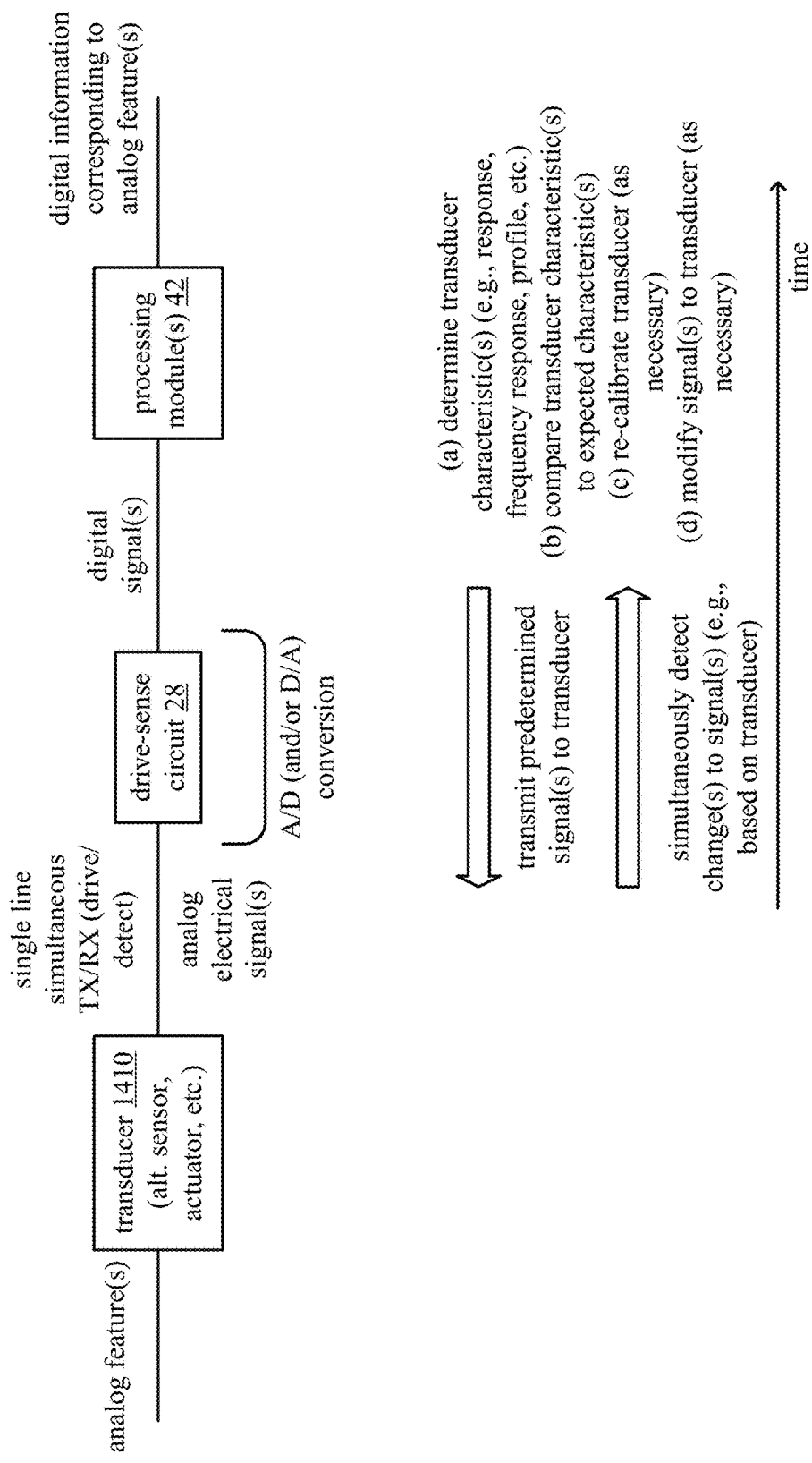
FIG. 28 is a schematic block diagram of an embodiment of a transducer testing system in accordance with the present invention.

FIG. 28 is a schematic block diagram 2800 of an embodiment of a transducer testing system in accordance with the present invention. Similar to certain previous diagrams, this diagram shows a transducer 1410, a drive-sense circuit 28, and one or more processing modules 42. Note that the one or more processing modules 42 may be implemented within one or more computing devices. Note also that the transducer 1410 may be interactive with any number of various devices including a sensor, an actuator, an optical device, and acoustic device, and/or generally, any input and/or output device. In general, any such transducer (including any such transducer 1410) described herein may be operative in such a manner.

In an example of operation and implementation, the drive-sense circuit 28 is configured to transmit one or more predetermined signals to the transducer 1410. As the drive-sense circuit 28 is operable to drive the transducer 1410 with the signal and simultaneously to sense the signal being driven to the transducer 1410, the drive-sense circuit 28 is configured to determine one or more transducer characteristics. Examples of such transducer characteristics include any one or more of a response, frequency response, a profile, etc. The one or more processing modules 42 is configured to process one or more digital signals provided from the drive-sense circuit 28 to determine the one or more transducer characteristics. The one or more processing modules 42 is also configured to compare the one or more transducer characteristics to one or more expected transducer characteristics. For example, based on one or more expected, predetermined, known, etc. characteristics of the transducer 1410, the one or more processing modules 42 is configured to determine a difference between the one or more characteristics of the transducer 1410 and the one or more expected characteristics.

Based on such a comparison, and specifically based on an unfavorable comparison between the one or more transducer characteristics and the one or more expected transducer characteristics, one or more processing modules 42 is configured to perform one or more operations. In one example, the one or more processing modules 42 is configured to recalibrate the transducer 1410 based on an unfavorable comparison. In another example, the one or more processing modules 42 is configured to modify the one or more signals that are transmitted to the transducer based on an unfavorable comparison. And yet another example, based on a favorable comparison between the one or more transducer characteristics and the one or more expected transducer characteristics, the one or more processing modules 42 is configured to continue operation in cooperation with the drive-sense circuit 28 and the transducer 1410 without recalibration, adaptation, modification, etc.

In an example of operation and implementation, the operation of the one or more processing modules 42 in cooperation with the drive-sense circuit 28 and the transducer 1410 is different at different times. Considering a first time, the transducer 1410 is not exposed to any analog feature. The drive-sense circuit 28 is configured to drive a signal to the transducer 1410 simultaneously to sense the signal that is driven to the transducer 1410 to establish a baseline of operation with respect to the transducer 1410. Such operation may be performed during calibration such as within an assembly plant, factory, etc.

Considering a second time, a known input is provided to the transducer 1410. The drive-sense circuit 28 is configured to drive a signal to the transducer 1410 simultaneously to sense the signal that is driven to the transducer 1410 to determine response of the transducer 1410 based on the known input (e.g., based on one or more of a known input, a known environment, an alternative process of calibration such as within an assembly plant, factory, etc.).

Considering a third time, consider that the transducer 1410 is implemented in an application in which it is exposed to an analog feature. The drive-sense circuit 28 is configured to drive a signal to the transducer 1410 simultaneously to sense the signal that is driven to the transducer 1410 to determine response of the transducer 1410 during its operation within the particular application in which it is exposed to the analog feature (e.g., when sensing an analog feature in the field, based on verification of the in-field characteristic).

Generally speaking, the drive-sense circuit 28 has capability and functionality not only to drive a signal to the transducer 1410 but also simultaneously to sense the signal that is driven to the transducer 1410. The drive-sense circuit 28, in accordance with such sensing capability, includes capability and functionality to provide a degree of resolution to allow an accurate characterization of one or more characteristics of the transducer.

Figure 29:
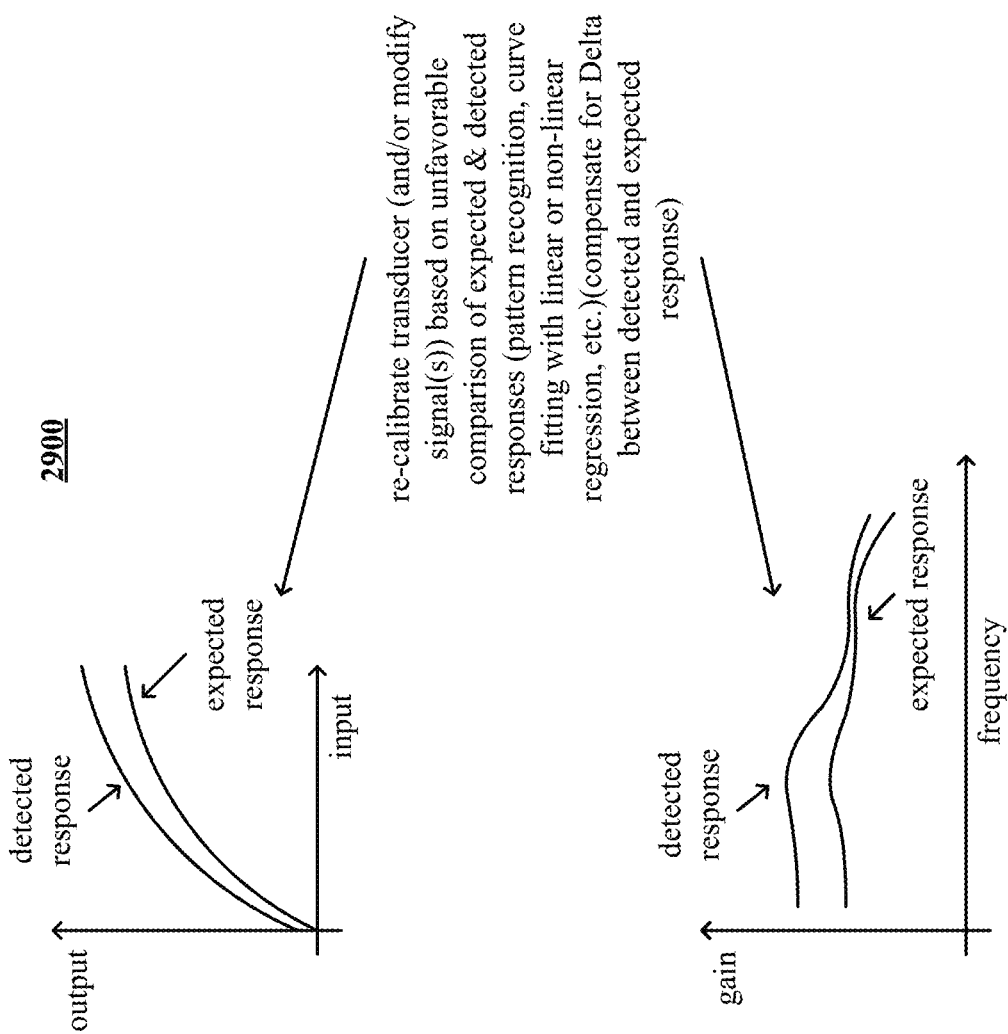
FIG. 29 is a schematic block diagram of an embodiment of transducer operation in accordance with the present invention.

FIG. 29 is a schematic block diagram 2900 of an embodiment of transducer operation in accordance with the present invention. At the top of this diagram, a response of a transducer is shown based on a horizontal axis being input and based on a vertical axis being output. Comparison between an expected response of the transducer and a detected response of the transducer allows to determine how closely the transducer is operating to an expected manner. Based on an unfavorable comparison between the expected response and the detected response, the transducer may be recalibrated. In addition to or alternatively to recalibration, the one or more signals that are driven by a drive-sense circuit to the transducer may be modified based on an unfavorable comparison between the expected response and the detected response. Such modification of the one or more signals provided to the transducer is performed so that the transducer operates in known, expected, etc. manner.

At the bottom of this diagram, a response of the transducer is shown based on a horizontal axis being gain and based on a vertical axis being frequency. Generally speaking, such a response may be viewed as being a frequency response. As described above, comparison between an expected response of the transducer and a detected response of the transducer allows for a determination on how closely the transducer is operating to an expected manner. The use of a frequency response characterization of the transducer allows for selectivity and granularity of the response of the transducer as a function of frequency.

In addition, note that other means of characterizing one or more characteristics of transducer may be used. Any characterization that allows for comparison of an expected response of the transducer and a detected response to the transducer may be used to provide the expected response of the transducer and/or the detected response of the transducer to be used in the determination of how closely the transducer is operating to an expected manner. For example, there may be instances when a limited number of data points are available to characterize response of the transducer. Any of a number of desired means may be used to generate the expected response of the transducer and/or the detected response of the transducer. Examples of various means may include pattern recognition, curve fitting with linear or nonlinear regression, etc. Regardless of the means by which the expected response of the transducer and/or the detected response of the transducer are generated, comparison may be made between the expected response of the transducer and the detected response of the transducer, and determination of unfavorable comparison may be made when they do not acceptably match one another (e.g., non-compliant with one another within 0.1%, 0.2%, 0.5%, 1%, 2%, 5%, 10%, and/or any other desired number or degree that is used to specify non-compliance with one another).

Figure 30:
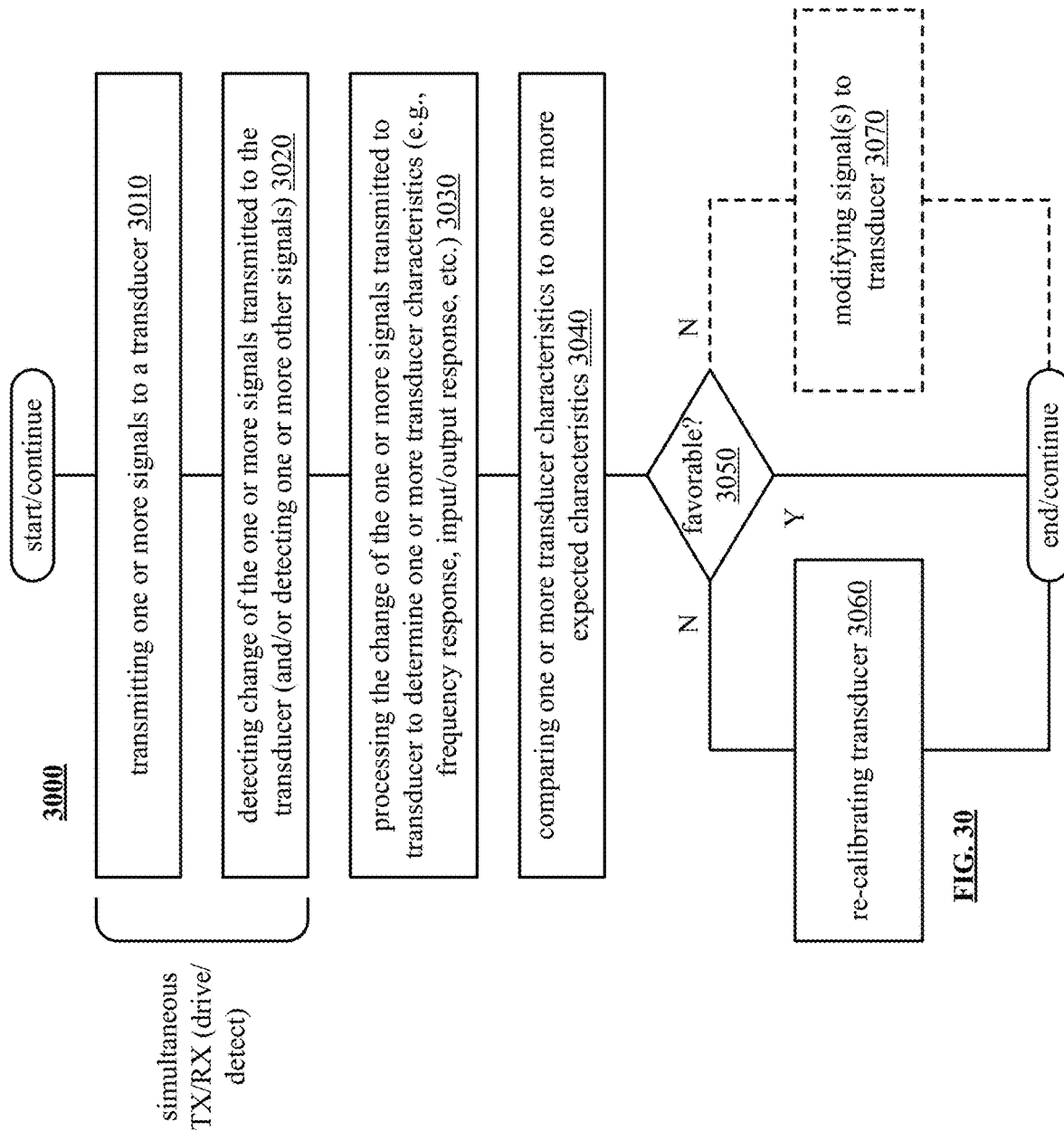
FIG. 30 is a schematic block diagram illustrating an embodiment of a method for execution by one or more devices in accordance with the present invention.

FIG. 30 is a schematic block diagram illustrating an embodiment of a method 3000 for execution by one or more devices in accordance with the present invention. The method 3000 operates in step 3010 by transmitting one or more signals to transducer. The method 3000 also operates in step 3020 by detecting change of the one or more signals transmitted to the transducer (and/or detecting one or more other signals). Note that such transmission and detection performed simultaneously, such as may be performed in accordance with operation of the drive-sense circuit in communication with the transducer. For example, operation of the steps 3010 and 3020 may be performed simultaneously in accordance with a simultaneous transmit receive operation, such as may be performed in accordance with operation of the drive-sense circuit in communication with the transducer. Note also that any additional signal that is coupled into or included with the one or more signals transmitted to the transducer will be detected based on detection of the one or more signals transmitted to the transducer.

The method 3000 also operates in step 3030 by processing the change of the one or more signals transmitted to the transducer to determine one or more transducer characteristics. Examples of such transducer characteristics may include a response, frequent response, and input/output response, etc.

The method 3000 also operates in step 3040 by comparing the one or more transducer characteristics to one or more expected characteristics of the transducer. Based on a favorable comparison of the one or more transducer characteristics to the one or more expected characteristics of the transducer, the method 3000 ends or continues (e.g., such as continue with one or more other methods, the end the method 3000 again, etc.).

Based on an unfavorable comparison of the one or more transducer characteristics to the one or more expected characteristics of the transducer, the method 3000 operates in step 3060 by recalibrating the transducer. In another example, comparison of the one or more transducer characteristics to the one or more expected characteristics of the transducer on an unfavorable comparison of the one or more transducer characteristics to the one or more expected characteristics of the transducer, the method 3000 operates in step 3070 by modifying the one or more signals provided to the transducer. Such modification of the one or more signals provided to the transducer is performed so that the transducer operates in known, expected, etc. manner.

Figure 31:
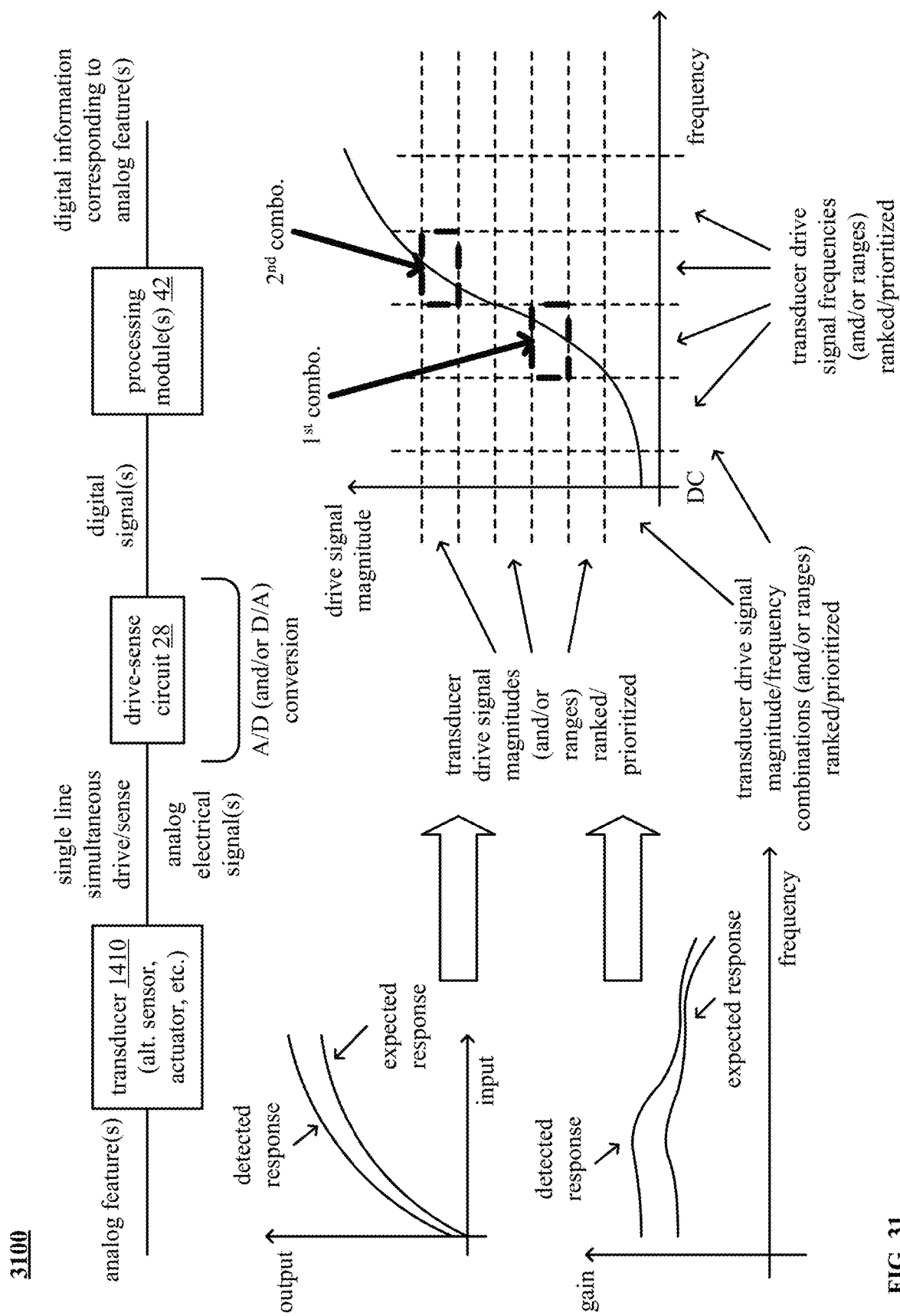
FIG. 31 is a schematic block diagram of an embodiment of a transducer zone drive characterization system in accordance with the present invention.

FIG. 31 is a schematic block diagram of an embodiment 3100 of a transducer zone drive characterization system in accordance with the present invention. Similar to certain previous diagrams, this diagram shows a transducer 1410, a drive-sense circuit 28, and one or more processing modules 42. Note that the one or more processing modules 42 may be implemented within one or more computing devices. Note also that the transducer 1410 may be interactive with any number of various devices including a sensor, an actuator, an optical device, and acoustic device, and/or generally, any input and/or output device. In general, any such transducer (including any such transducer 1410) described herein may be operative in such a manner.

As described herein with respect to other samples, embodiments, diagrams, etc., a detected response of the transducer and an expected response of the transducer may not acceptably match or compare favorably to one another.

In an example of operation and implementation, the drive-sense circuit 28 is configured to drive different signals having different characteristics to the transducer 1410 and simultaneously to sense those different signals being driven to the transducer 1410. The drive-sense circuit 28 is configured to vary any of the number of different parameters associated with the various signals being driven to the transducer 1410. For example, the drive-sense circuit 28 is configured to vary the drive signal magnitude, frequency, ranges thereof, signal type, signal shape, periodicity, DC offset, etc. and/or any other characteristic associated with a signal being driven to the transducer 1410.

Considering the right hand side of the diagram is one example, based on identification of certain frequency ranges and/or drive signal magnitude ranges within which the transducer 1410 operates in an expected manner (e.g., behaves linearly), identification may be made of particular combinations of drive signal magnitude ranges and frequency ranges. In some examples, different respective combinations of drive signal magnitude ranges and frequency ranges are identified and ranked in terms of performance. Then, the drive-sense circuit 28 is configured to operate using drive signals that are included within one or more identified combinations of drive signal magnitude ranges and frequency ranges to effectuate extended linear operation of the transducer 1410. Note also that the expected manner of operation of the transducer 1410 need not necessarily be linear. So long as the expected manner of operation of the transducer 1410 is known and predictable, appropriate signal processing can be performed by the one or more processing modules 42 when processing one or more digital signals received from the drive-sense circuit 28 to interpret operation of the transducer 1410, which may include determining one or more characteristics one or more analog features to which the transducer 1410 is exposed.

Note that such a transducer 1410 may be driven with any of a number of different types of signals (e.g., of with different frequencies, signal strengths, signal shapes, etc.), to extend precision of the transducer 1410 (e.g., including sensing in a senor based application). Spectral analysis of the transducer 1410 and it operation is performed to optimize the frequency of drive signal(s), the magnitude of the drive signal(s), etc. Note also that any such drive signal(s) may have a DC component. In addition, note that some drive signal(s) are DC drive signal(s).

Figure 32:
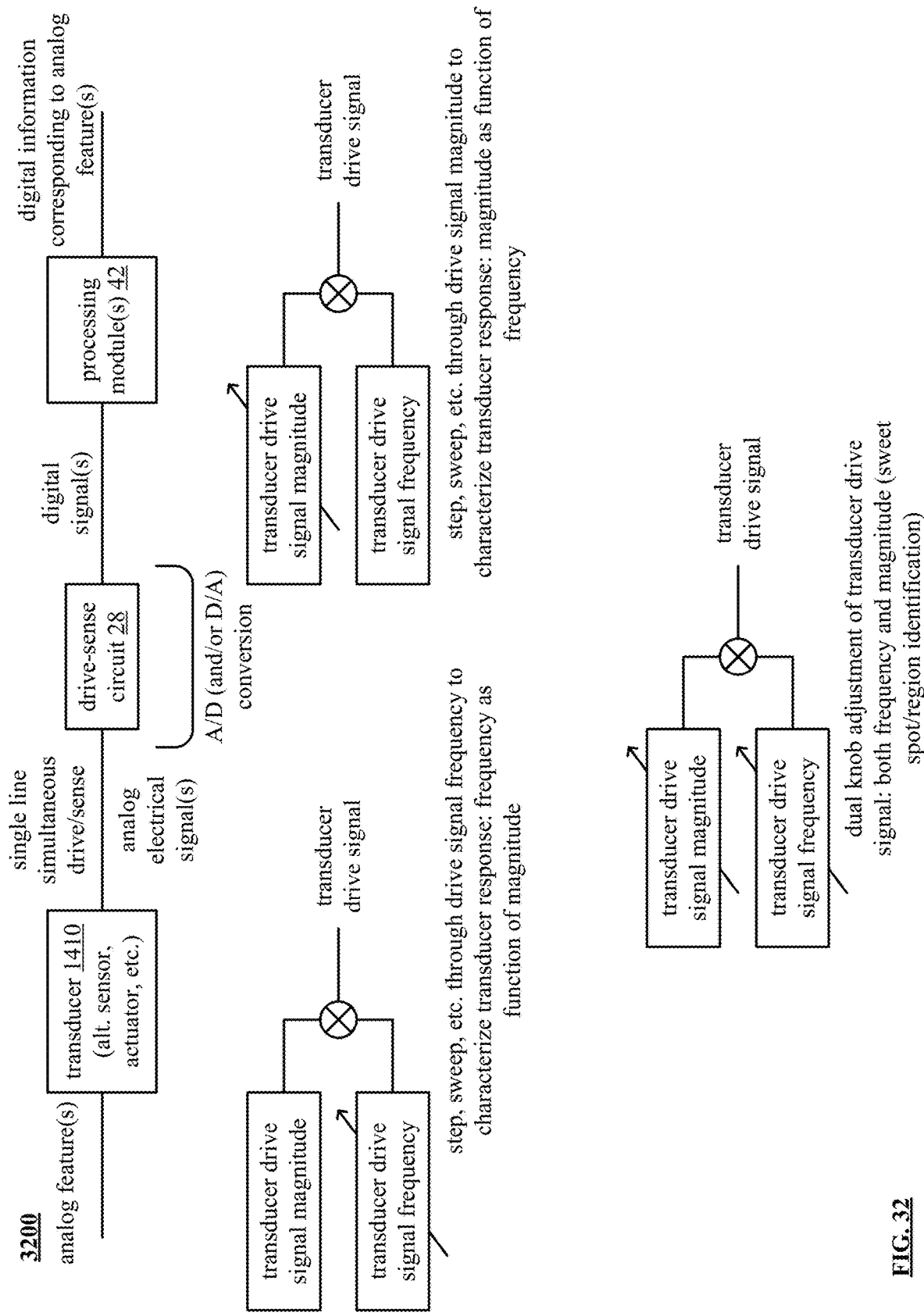
FIG. 32 is a schematic block diagram of an embodiment of a drive signal identification system in accordance with the present invention.

FIG. 32 is a schematic block diagram of an embodiment 3200 of a drive signal identification system in accordance with the present invention. Similar to certain previous diagrams, this diagram shows a transducer 1410, a drive-sense circuit 28, and one or more processing modules 42. Note that the one or more processing modules 42 may be implemented within one or more computing devices. Note also that the transducer 1410 may be interactive with any number of various devices including a sensor, an actuator, an optical device, and acoustic device, and/or generally, any input and/or output device. In general, any such transducer (including any such transducer 1410) described herein may be operative in such a manner.

This diagram shows the various means by which transducer drive signal may be generated. In one example, the transducer drive signal magnitude is held constant or fixed, while the transducer drive signal frequency is variable. Different types of transducer drive signals may be generated and provided via a drive-sense circuit 28 to transducer 1410. For example, different signals may be provided by stepping across a range in certain steps/increments, varying, etc. the drive signal frequency to characterize the transducer response such that the frequency varies based on a transducer drive signal having a constant or fixed magnitude.

In another example, the transducer drive signal frequency is held constant or fixed, while the transducer drive signal magnitude is variable. Different types of transducer drive signals may be generated and provided via a drive-sense circuit 28 to transducer 1410. For example, different signals may be provided by stepping across a range in certain steps/increments, varying, etc. the drive signal magnitude to characterize the transducer response such that magnitude varies based on a transducer drive signal having a constant or fixed frequency.

In yet another example, both the transducer drive signal frequency and the transducer drive signal magnitude are variable. Different types of transducer drive signals may be generated and provided via a drive-sense circuit 28 to transducer 1410. For example, different signals may be provided by stepping across a range in certain steps/increments, varying, etc. the drive signal magnitude and/or the drive signal frequency to characterize the transducer response. In some examples, such dual knob adjustment of the transducer drive signal in terms of both frequency and magnitude allows for identification of one or more sweet spots of operation and one or more regions (e.g., combinations and/or ranges of drive signal magnitudes and/or frequencies) that provide acceptable transducer response.

Figure 33:
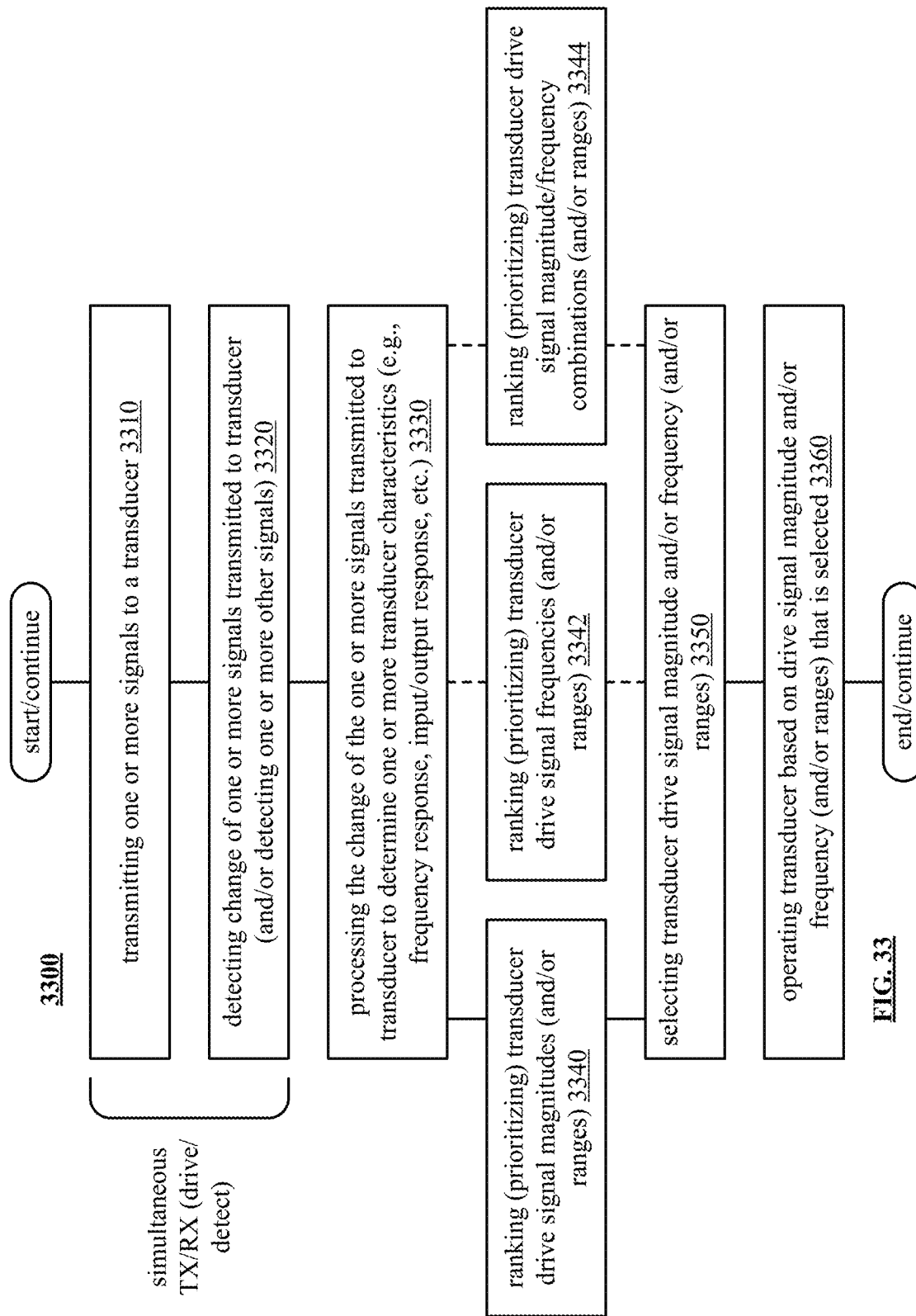
FIG. 33 is a schematic block diagram illustrating an embodiment of a method for execution by one or more devices in accordance with the present invention.

FIG. 33 is a schematic block diagram illustrating an embodiment of a method 3300 for execution by one or more devices in accordance with the present invention. The method 3300 operates in step 3310 by transmitting one or more signals to transducer. The method 3300 also operates in step 3320 by detecting change of the one or more signals transmitted to the transducer (and/or detecting one or more other signals). Note that such transmission and detection performed simultaneously, such as may be performed in accordance with operation of the drive-sense circuit in communication with the transducer. For example, operation of the steps 3310 and 3320 may be performed simultaneously in accordance with a simultaneous transmit receive operation, such as may be performed in accordance with operation of the drive-sense circuit in communication with the transducer. Note also that any additional signal that is coupled into or included with the one or more signals transmitted to the transducer will be detected based on detection of the one or more signals transmitted to the transducer.

The method 3300 also operates in step 3330 by processing the change of the one or more signals transmitted to the transducer to determine one or more transducer characteristics. Examples of such transducer characteristics may include a response, frequent response, and input/output response, etc.

The method 3300 then operates based on one or more of steps 3340, 3342, and 3344. Based on operation of step 3340, the method 3300 operates by ranking (prioritizing) transducer drive signal magnitudes (and/or ranges). Based on operation of step 3342, the method 3300 operates by ranking (prioritizing) transducer drive signal frequencies (and/or ranges). Based on operation of step 3344, the method 3300 operates by ranking (prioritizing) transducer drive signal magnitude/frequency combinations (and/or ranges).

The method 3300 also operates in step 3350 by selecting one or more drive signal magnitudes and/or frequencies (and/or ranges) that provide for acceptable transducer operation. In addition, the method 3300 also operates in step 3360 by operating the transducer based on the one or more drive signal magnitudes and/or frequencies (and/or ranges) that is selected. Such operation of the transducer may be performed in accordance with a drive-sense circuit as described herein.

With respect to various calibration, testing, characterization, identification of one or more drive signal magnitudes and/or frequencies (and/or ranges), etc. with respect to one or more transducers. Note that such operations may be performed at different times. For example, such operations may be performed based on a particular schedule or periodicity. Alternatively, such operations may be performed based on one or more triggering events. For example, based on a detected change of an environmental parameter (e.g., temperature, humidity, operational conditions, etc.), such operations may be performed to help ensure that operation in accordance with the one or more transducers is being performed effectively.

Figure 34:
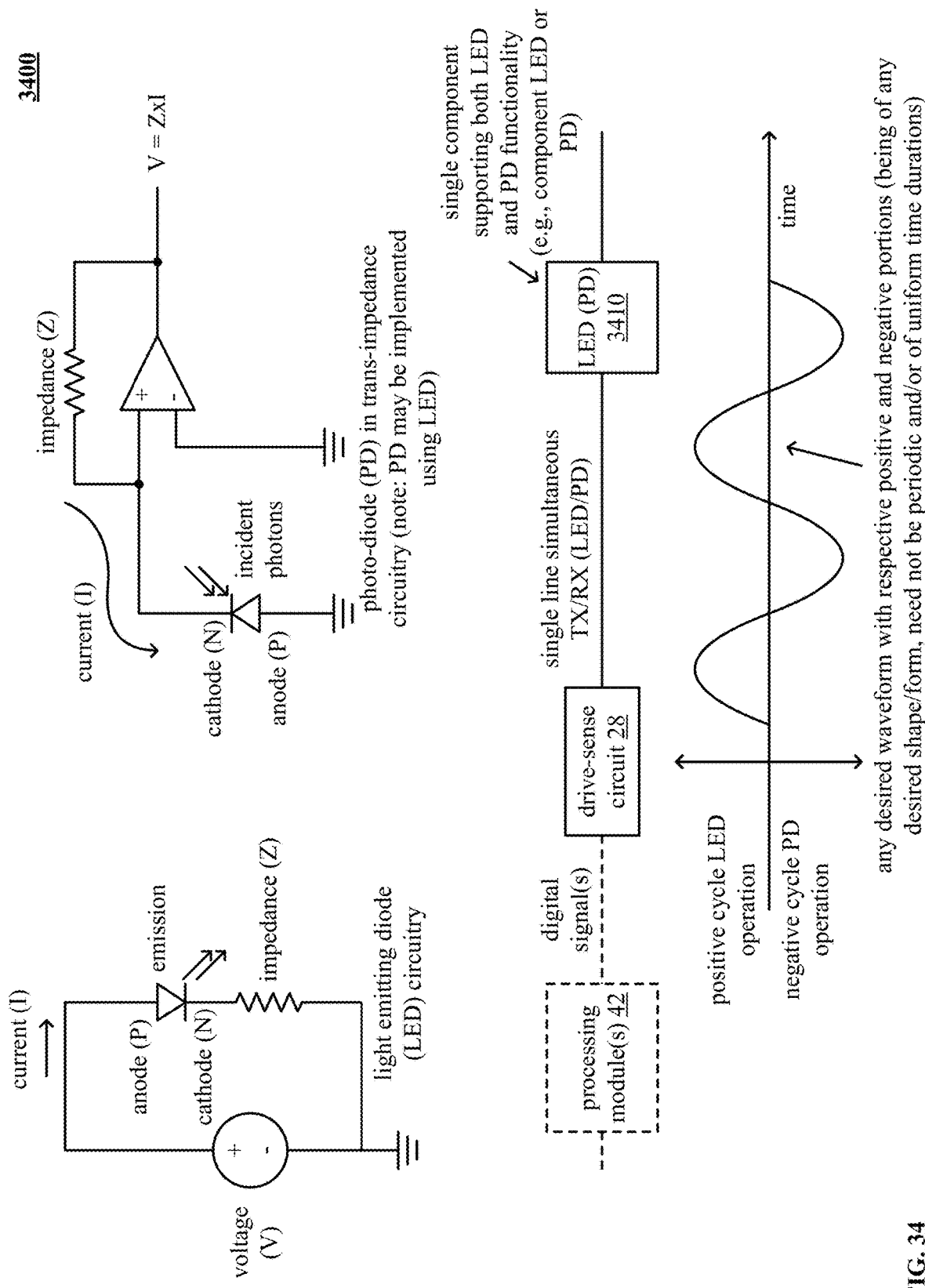
FIG. 34 is a schematic block diagram of an embodiment of an optical device operating as both a source and a detector in accordance with the present invention.

FIG. 34 is a schematic block diagram of an embodiment 3400 of an optical device operating as both a source and a detector in accordance with the present invention. A light emitting diode (LED) emits photons when an appropriate current is passed from the anode to the cathode thereof. At the top left of the diagram, a light emitting diode (LED) circuitry includes a voltage source that is applied to an LED that is coupled to an impedance (shown as a Z, which may include resistive (e.g., such as from a resistor, R) and/or reactive (e.g., such as from an inductor, L and/or capacitor, C) components, which may be employed to limit the amount of current passing through the LED to prevent damage to the LED). As current is passed through the LED, photons are emitted.

At the top right of the diagram, a photo-diode (PD) is implemented within a trans-impedance circuitry. The trans-impedance circuitry includes a buffer, operational amplifier, etc. having a first input coupled to the ground potential, and a second input coupled to the cathode of the PD. Note that the PD may be implemented using an LED. An impedance (shown as a Z) is also coupled from the second input to the output of the buffer, operational amplifier, etc. As light, photons, our incident on the PD or the LED, a current, I, flows that generates an output voltage, V, that is based on the impedance times the current, I (e.g., V=Z×I).

Similar to certain previous diagrams, this diagram shows a drive-sense circuit 28 and one or more processing modules 42. In this diagram, the drive-sense circuit 28 is configured to drive an LED drive signal via a single line to an LED 3410 and simultaneously to sense that LED drive signal via the single line. During positive portions of the LED drive signal, the LED 3410 operates as a source emitting photons. During negative portions of the LED drive signal, the LED 3410 operates as a sensor detecting photons incident on the LED 3410. Note that the LED drive signal may have any desired form. For example, any desired waveform with respective positive and negative portions having any desired shape/form may be driven and sensed by the drive-sense circuit 28. Note also that the LED drive signal need not be periodic, and the positive and/or negative portions thereof need not be of uniform time durations.

Among other features and aspects of the drive-sense circuit 28, the sensitivity of the drive-sense circuit 28 and its ability to detect extremely small signals even in situations of very low signal to noise ratio (SNR) allows the single component, the LED 3410, to be operated supporting both LED and PD functionality. In general, note that the component may be the LED 3410 or alternatively a PD.

Figure 35:
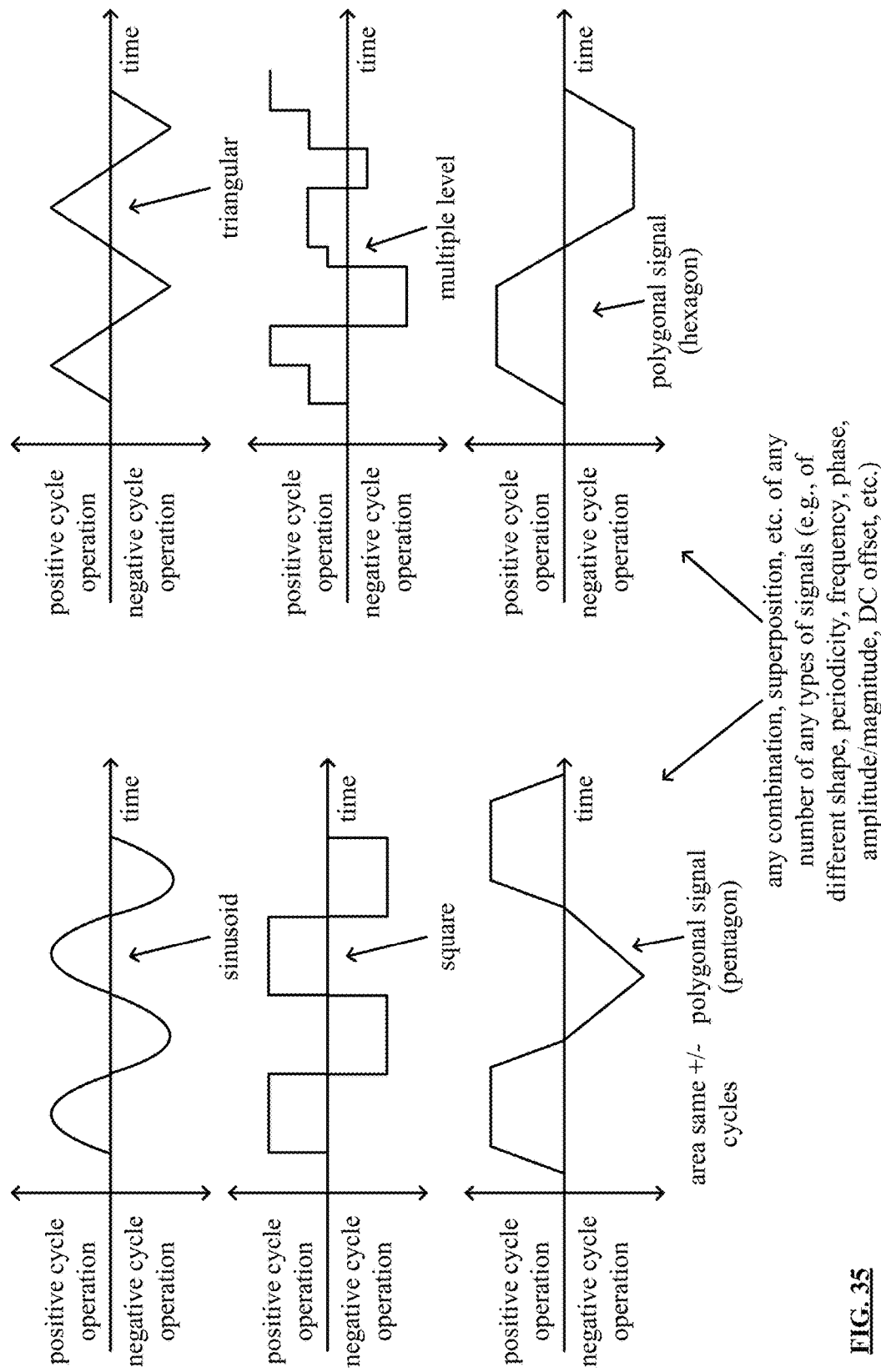
FIG. 35 is a schematic block diagram of an embodiment of drive signals in accordance with the present invention.

FIG. 35 is a schematic block diagram of an embodiment 3500 of drive signals in accordance with the present invention. This diagram shows multiple examples of various drive signals that may be used as LED drive signals or generally any drive signal provided from a drive-sense circuit 28. Examples of such signals include a sinusoidal signal, a square wave signal, a triangular wave signal, a multiple level signal, a polygonal signal, etc.

An example of a multiple level signal is a signal that transitions between different respective levels as a function of time. As can be seen on the right-hand side of the diagram in the middle, a multiple level signal transitions between different levels have respective times, and the durations of time when the multiple level signal is at such different values may be nonuniform. An example of a polygonal signal is a signal having a positive portion in a negative portion, that when combined, form a polygonal shape. For example, on the bottom left of the diagram, a polygonal signal based on a pentagon is shown. On the bottom right of the diagram a polygonal signal based on a hexagon is shown. In general, within a given period of time or periodicity, the area under the curve of the respective positive portions and negative portions of a polygonal signal will be equal (e.g., with respect to any DC offset, which may be 0 in some instances).

Note that any combination, superposition, etc. of any number of any types of signals may be used to form a drive signal to be provided from a drive-sense circuit 28. For example, any desired number of different signals of different shape, periodicity, frequency, phase, amplitude/magnitude, DC offset, etc. may be used to form a drive signal to be provided to a drive-sense circuit 28.

Figure 36:
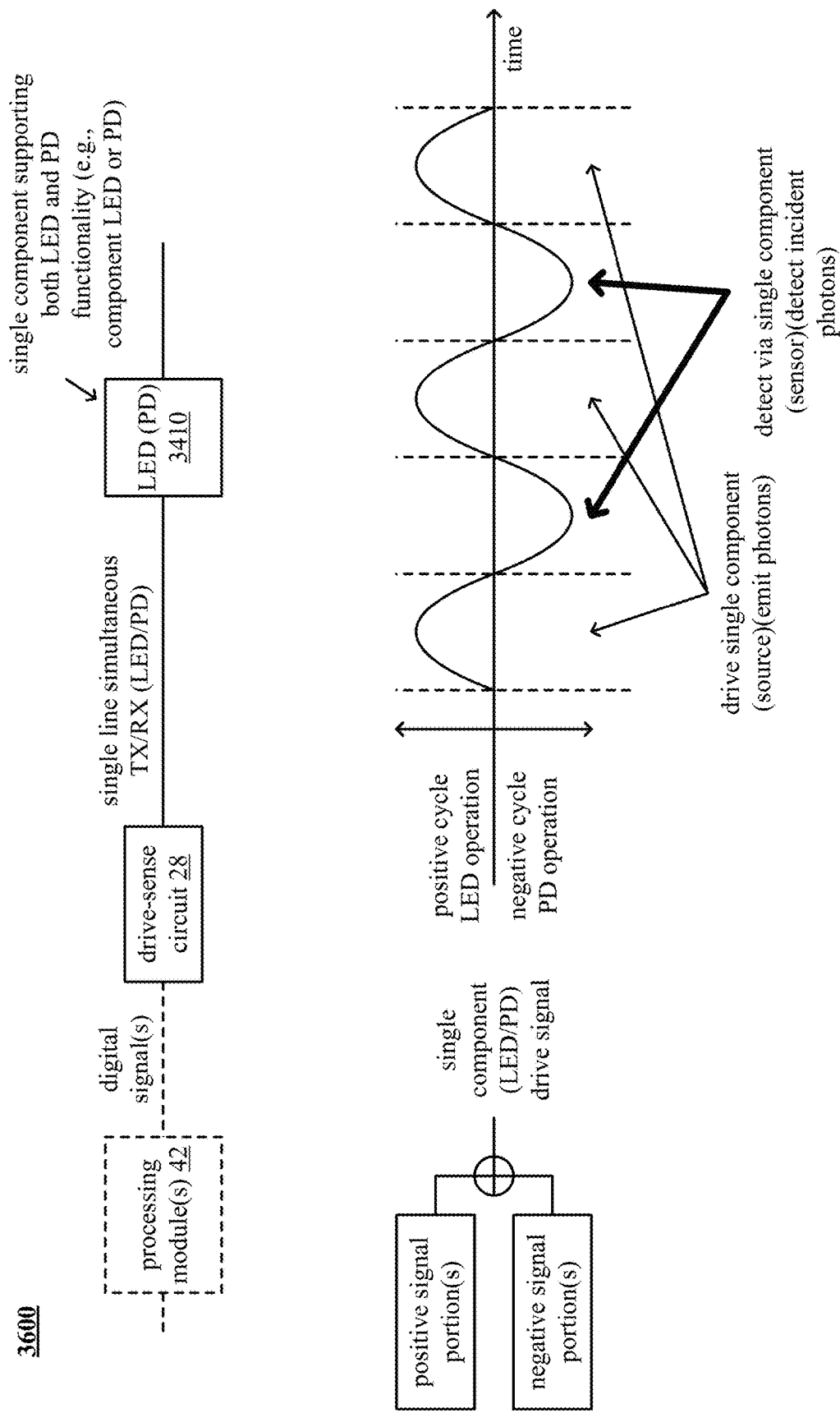
FIG. 36 is a schematic block diagram of an embodiment of an optical device operating as both a source and a detector in accordance with the present invention.

FIG. 36 is a schematic block diagram of an embodiment 3600 of an optical device operating as both a source and a detector in accordance with the present invention. Similar to certain previous diagrams, this diagram shows the LED 3410, a drive-sense circuit 28, and one or more processing modules 42. The drive-sense circuit 28 is configured to drive an LED drive signal via a single line to the LED 3410 and simultaneously to sense that LED drive signal via the single line. Again, note that a PD may be implemented in place of the LED 3410.

A single component drive signal (e.g., an LED/PD drive signal) includes one or more positive signal portions and one or more negative signal portions. Again, note that any one or more types of signals having any one or more characteristics may be used to form a drive signal to be provided from a drive-sense circuit 28. Note also that the one or more positive signal portions need not be similar in form, type, etc. as the one or more negative signal portions.

As can be seen with respect to the waveform on the bottom right of the diagram, a drive-sense circuit 28 is configured to drive a single component during the one or more positive signal portions of the single component drive signal and to detect with that single component during one or more negative signal portions of this single component drive signal.

FIG. 37A is a schematic block diagram of an embodiment 3701 of an optical device operating as both a source and a detector in accordance with the present invention. This diagram shows a single LED that is configured to operate as a source and/or sensor. For example, the single LED is configured to operate as a source emitting light and also to operate as a touch sensor. A single LED may be configured to operate as a button with respect to a touch sensor device.

FIG. 37B is a schematic block diagram of an embodiment 3702 of optical devices operating as sources and detectors in accordance with the present invention. This diagram shows at least two different optical components adjacently- and/or closely-located to one another. Both of the optical components are LEDs. One of the LEDs operates as a source, and the other of the LEDs operates as a sensor. The LED that operates as the source provides at least some light that is used by the LED that operates as the sensor. Note that the LED that operates as the source and the LED that operates as the sensor may operate alternatively with respect to one another (e.g., the LED that operates as the source during a respective positive cycle of a first drive signal driving it, and the LED that operates as the sensor during a respective negative cycle of a second drive signal driving it, such that the respective positive cycle of the first drive signal and the respective negative cycle of the second drive signal aligned, at least in part, with respect to one another temporally).

In an example of operation and implementation, light that is emitted from the LED that operates as the source and the LED operates as the sensor (e.g., based on light that is incident upon the LED) and is affected such as based on a proximal touch (e.g., an actual physical contact or a near physical contact from a person interacting with the adjacently- and/or closely-located LEDs).

FIG. 37C is a schematic block diagram of an embodiment 3703 of optical devices operating as sources and detectors in accordance with the present invention. This diagram shows a number of LEDs that are adjacently- and/or closely-located. Note that any combination of sources and or sensors may be implemented. Consider this combination of 3 or 5 LEDs. For example, a first number (e.g., 1 or 2) of the LEDs is implemented to operate as sources, and a second number (e.g., 4 or 3) of the LEDs is implemented to operate as sensors. Note also that any individual LED may be implemented to operate as both a source and a sensor (e.g., as an LED and also as a PD).

FIG. 37D is a schematic block diagram of an embodiment 3704 of optical devices operating as sources and detectors in accordance with the present invention. In general, any desired pattern of LEDs may be implemented such that some of the LEDs operate only as LEDs, some operate as both LEDs and PDs, and/or some operate only as PDs. In this diagram, the top row and the top rope of LEDs operate as LEDs, and the middle row of LEDs operates as PDs.

FIG. 37E is a schematic block diagram of an embodiment 3705 of optical devices operating as sources and detectors in accordance with the present invention. In this diagram, the top, middle, and bottom rows operate as LEDs, and the other rows include LEDs that alternatingly operate as LED and PD. Considering the 5 rows numbered 1-5 from top to bottom, rows 1, 3, and 5 operate as LEDs. Rows 2 and 4 include LEDs that alternatingly operate as LED and PD.

In general, note that any desired pattern and placement of LEDs and/or PDs may be implemented within a device. Any one of those components may be implemented to operate as an LED, a PD, or both as an LED and a PD.

The following diagrams generally show the relative size, spacing, pixel pitch, etc. and characteristics of when comparing some different types of light sources (e.g., light emitting diode (LED), organic light emitting diode (OLED), mini-LED, and micro-LED).

FIG. 38A is a schematic block diagram of an embodiment 3801 of a type of optical device in accordance with the present invention. This diagram shows adjacently located LEDs and the respective pixel pitch between them. In general, the pixel pitch of an LED implemented device is greater than 1 mm. Depending on the application, whether indoor or outdoor, and depending on the size of the device, the pixel pitch may vary.

Considering some examples, in an indoor implemented device, the pixel pitch may range from 4 to 20 mm. In an outdoor implemented device, the pixel pitch may range from 6 to 25 mm. In a large billboard implemented device, the pixel pitch may range from 25 to 32 mm.

FIG. 38B is a schematic block diagram of an embodiment 3802 of a type of optical device in accordance with the present invention. This diagram shows adjacently located mini-LEDs and the respective pixel pitch between them. In general, the pixel pitch of a mini-LED implemented device is less than 1 mm. Some examples of pixel pitch of a mini-LED implemented device may range from 0.75 to 0.9 mm.

FIG. 38C is a schematic block diagram of an embodiment 3803 of a type of optical device in accordance with the present invention. This diagram shows adjacently located micro-LEDs and the respective pixel pitch between them. In general, a micro-LED structure is implemented as an LED matrix/array on a wafer surface. For example, considering a 2×3 micro-LED matrix/array including six optical components, they may be implemented based on a R (red), G (green), B (blue) pattern. In general, the pixel pitch of a micro-LED implemented device is less than 1 mm as well. Some examples of a micro-LED implemented device may include approximately 600 dots per inch (dpi). Also, the size of the individual optical devices within such a micro-LED structure is very small. Some examples include individual optical devices that are under 100 micrometers. Other examples may include 12 micron elements with 15 micron spacing between.

In general, any type of optical device having the capability and functionality to operate both as a source of the sensor may be driven by a drive-sense circuit 28 and operated as both a source and a sensor thereby. The drive-sense circuit 28 is configured to drive a signal to that optical device and simultaneously to sense that signal.

Figure 39A:
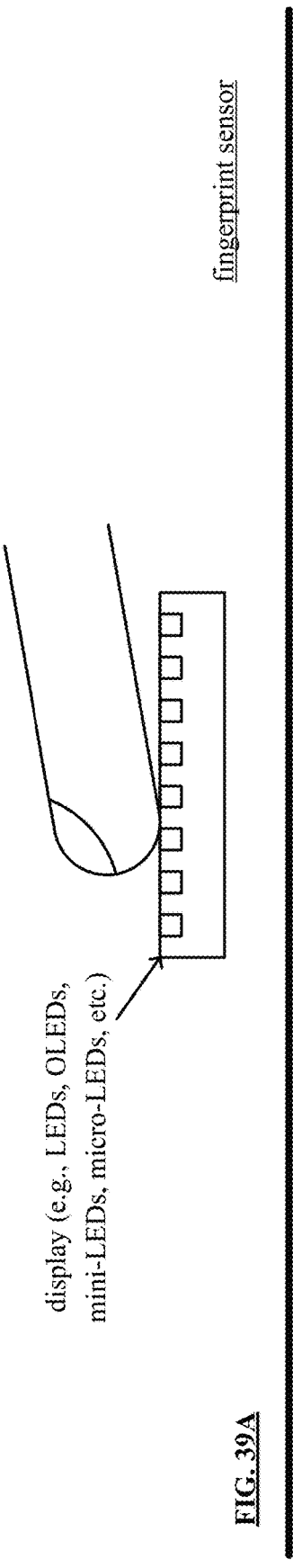
FIG. 39A is a schematic block diagram of an embodiment of a fingerprint sensor in accordance with the present invention.

FIG. 39A is a schematic block diagram of an embodiment 3901 of a fingerprint sensor in accordance with the present invention. As described herein, an optical device (e.g., LED, OLED, mini-LED, micro-LED, etc.) may be implemented to operate as both a source and a sensor based on its operation with a drive-sense circuit 28. A number of optical devices may be implemented to operate as a fingerprint sensor. Such optical devices of the display may be implemented using any of a number of different types of means (e.g., LED, OLED, mini-LED, micro-LED, etc.). Any one or more of the optical devices may be implemented to operate as both a source and a sensor. In an example of operation and implementation, a number of optical devices is implemented to operate as a display (e.g., Such that the optical devices operate as sources). In addition, some or all of the optical devices of the display are also implemented to operate as sensors. Multiple optical devices, when operating cooperatively as sensors, are configured to generate an image of that which is exposed to the display.

In one example, at least a portion of the optical devices of the display operate as a sensor. In a specific example, they operate as a fingerprint sensor. In a particular example, given the extremely close proximity by which the optical devices of a micro-LED can be implemented, a micro-LED implemented device that is implemented on top of wafer may be implemented as a fingerprint sensor.

Figure 39B:
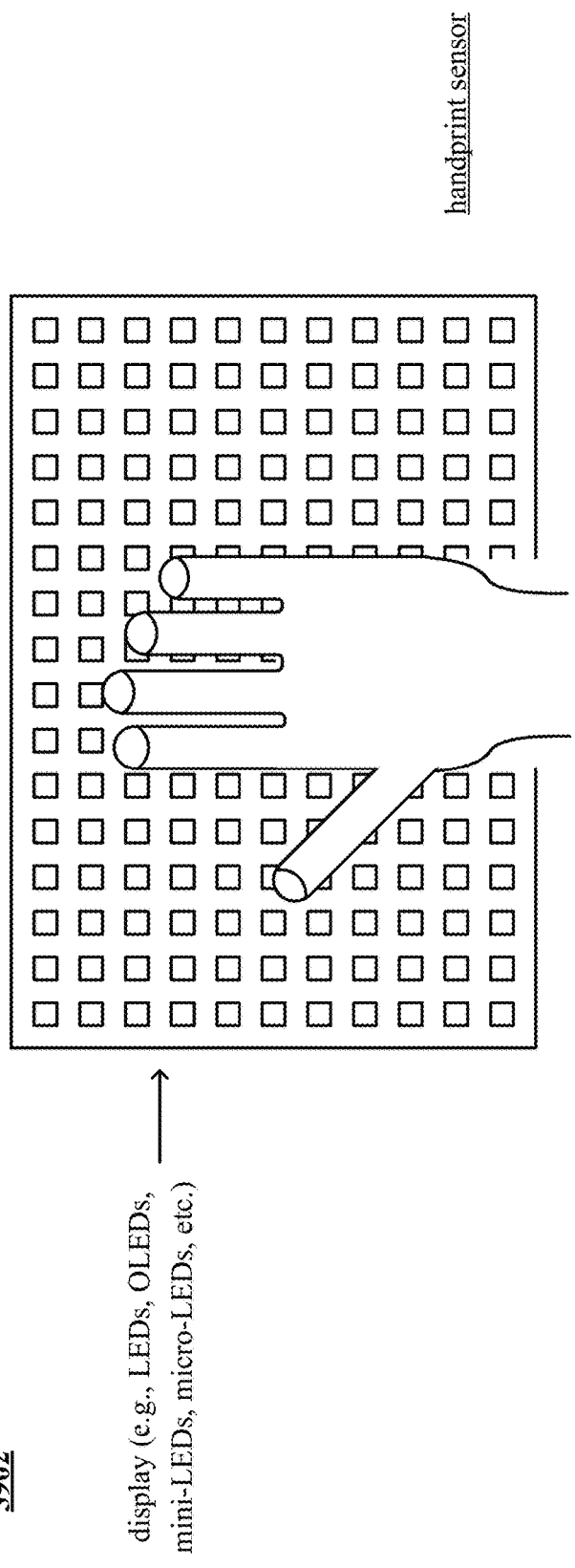
FIG. 39B is a schematic block diagram of an embodiment of a handprint sensor in accordance with the present invention.

FIG. 39B is a schematic block diagram of an embodiment 3902 of a handprint sensor in accordance with the present invention. Similar to the previous diagram, at least a portion of the optical devices of the display operate as a sensor. For a sufficiently large display, it may operate as a handprint sensor (e.g., provided it is sufficiently large for a hand to be placed there off). In general, a display of any type of size having any number of optical devices may be configured operate both as a display and as a sensor.

FIG. 40A is a schematic block diagram illustrating an embodiment of a method 4001 for execution by one or more devices in accordance with the present invention. The method 4001 operates in step 4010 by transmitting a signal to a component that supports both LED and PD functionality. Such a component may itself be an LED or a PD. In one specific example, the single component is an LED, an OLED, a mini-LED, a micro-LED, or another optical device that has the capability and functionality to operate both as a light source and a sensor.

The method 4001, when performing this step 4010, also operates by operating the component as an LED during one or more positive signal portions in step 4012 and by operating the component as a PD during one or more negative signal portions in step 4014.

FIG. 40B is a schematic block diagram illustrating an embodiment of a method 4002 for execution by one or more devices in accordance with the present invention. The method 4002 operates in step 4011 by generating one or more positive signal portions. The method 4002 operates in step 4021 by generating one or more negative signal portions.

The method 4002 operates in step 4031 by generating a single component signal (e.g., an LED/PD drive signal). The method 4002 operates in step 4041 by transmitting the single component signal to a component that supports both LED and PD functionality. Such a component may itself be an LED or a PD. In one specific example, the single component is an LED, an OLED, a mini-LED, a micro-LED, or another optical device that has the capability and functionality to operate both as a light source and a sensor.

The method 4002, when performing this step 4041, also operates by operating the component as an LED during one or more positive signal portions in step 4043 and by operating the component as a PD during one or more negative signal portions in step 4045.

Figure 41:
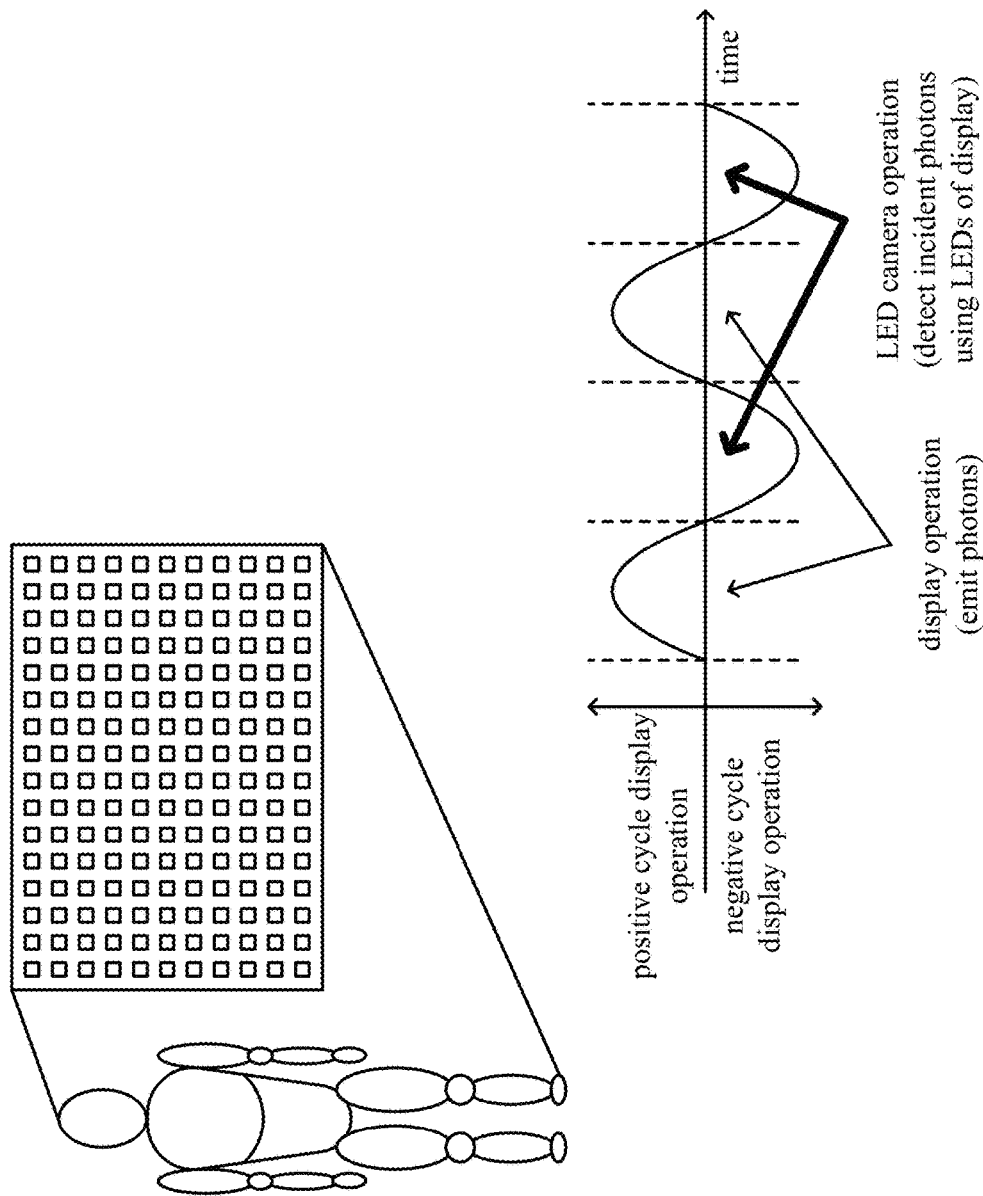
FIG. 41 is a schematic block diagram illustrating an embodiment of a display simultaneously operating as a camera in accordance with the present invention.

FIG. 41 is a schematic block diagram 4100 illustrating an embodiment of a display simultaneously operating as a camera in accordance with the present invention. In this diagram, a display that includes a number of optical devices is configured to operate as a camera. Note that the display may also be configured to perform simultaneous display and camera operations. The display may be implemented using any of a number of different types of means (e.g., LED, OLED, mini-LED, micro-LED, etc.). The respective optical devices are driven using one or more drive-sense circuits 28.

Considering a single optical device of the display, as can be seen with respect to the waveform on the bottom right of the diagram, a drive-sense circuit 28 is configured to drive a single component during the one or more positive signal portions of the single component drive signal and to detect with that single component during one or more negative signal portions of this single component drive signal.

Considering multiple optical devices of the display, during the one or more negative signal portions of the respective single component drive signals provided to those multiple optical devices of the display, an image of that which is exposed to the display is generated (e.g., including a person, a portion of a person, the environment/background in view/range of the display, etc.). As with respect to a fingerprint sensor or a handprint sensor, when a display is implemented to operate as a camera, multiple optical devices, when operating cooperatively as sensors, are configured to generate an image of that which is exposed to the display. Again, note that the display is configured to operate as a display during the one or more positive signal portions of the respective component drive signals provided to the optical devices of the display and to operate as a camera during the one or more negative signal portions of the respective component drive signals provided to the optical devices of the display. The one or more drive-sense circuits 28 allow the respective optical devices of the display to be operated as both sources and sensors (e.g., LEDs and PDs).

Figure 42:
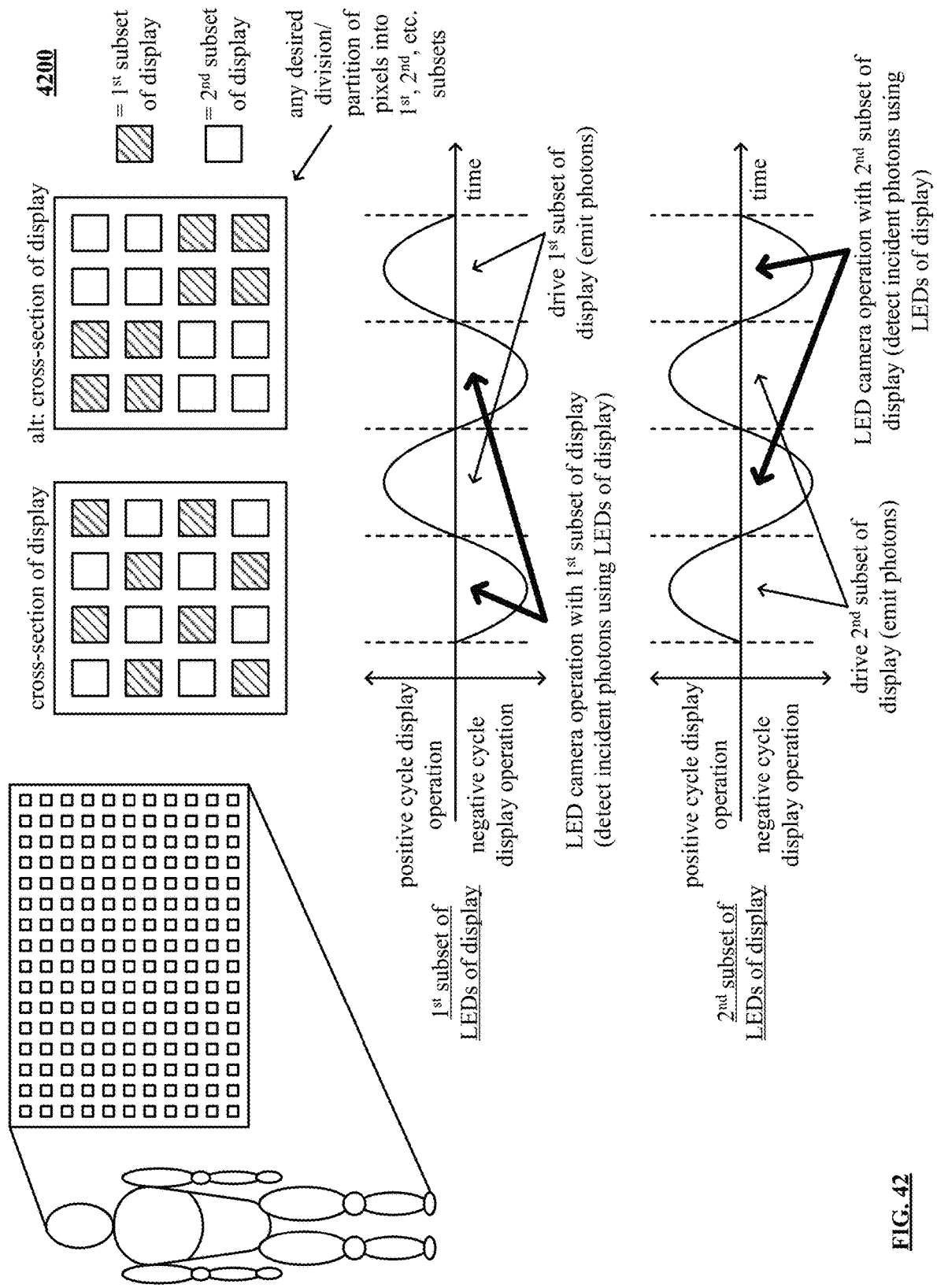
FIG. 42 is a schematic block diagram illustrating an embodiment of a display simultaneously operating as a camera in accordance with the present invention.

FIG. 42 is a schematic block diagram 4200 illustrating an embodiment of a display simultaneously operating as a camera in accordance with the present invention. In this diagram, different respective subsets of optical devices of the display are respectively operated such that when optical components of a first subset of the display operate as sources, optical components of a second subset of the display operate as sensors, and vice versa.

For example, consider a cross-section portion of the display as including a first subset of the display that includes first optical components and a second subset of the display that includes second optical components. Note that any desired pattern may be used to partition the respective optical components of the display into the first subset of the display in the second subset of the display. One possible pattern includes a checkered pattern that is based on an optical component by optical component basis (e.g., as shown on the top middle portion of the diagram). Another possible pattern includes an alternative checkered pattern that is based on a 2×2 optical component by 2×2 optical component basis (e.g., as shown on the top right portion of the diagram). In general, other possible patterns include other checkered patterns that are based on a n×n optical component by n×n optical component basis, where n is a positive integer greater than equal to 3. Note also that none symmetric checkered patterns may alternatively be used (e.g., checkered patterns that are based on a n×m optical component by n×m optical component basis, where n and m are positive integers greater than or equal to 1).

Considering a single optical device of the first subset of the display that includes first optical components, as can be seen with respect to the waveform on the middle right of the diagram, a drive-sense circuit 28 is configured to drive a single component during the one or more positive signal portions of the single component drive signal and to detect with that single component during one or more negative signal portions of this single component drive signal.

Considering a single optical device of the second subset of the display that includes second optical components, as can be seen with respect to the waveform on the middle right of the diagram, a drive-sense circuit 28 is configured to drive a single component during the one or more positive signal portions of the single component drive signal and to detect with that single component during one or more negative signal portions of this single component drive signal. Note that the one or more positive signal portions of this single component drive signal (e.g., that drives a single optical device of the first subset of the display that includes second optical components) coincide temporarily with the one or more negative signal portions of the single component drive signal that drives a single optical device of the first subset of the display that includes first optical components.

As can be seen, when the first subset of the display that includes first optical components are being driven to operate as sources, the second subset of the display that includes second optical components are being driven to operate as sensors. At any given instant in time, at least a portion of the display is operating as a source while at least another portion of the display is operating as a sensor. The display is operating at all times as both a source and a sensor. In general, note that any desired number of subsets of the display that include respective optical components thereof may operate in such a manner such that at least one of the subsets of the display is operating in a source while at least one other of the subsets of the display is operating as a sensor.

FIG. 43A is a schematic block diagram illustrating an embodiment of a method 4301 for execution by one or more devices in accordance with the present invention. The method 4301 operates in step 4310 by operating LEDs of the display as an output device by driving LEDs of the display using one or more positive signal portions. The method 4301 operates in step 4320 by operating LEDs of the display as a camera by driving the LEDs of the display using one or more negative signal portions.

FIG. 43B is a schematic block diagram illustrating an embodiment of a method 4302 for execution by one or more devices in accordance with the present invention. The method 4302 operates in step 4311 by operating a first subset of LEDs of the display as an output device by driving the first subset of LEDs of the display using one or more positive signal portions. The method 4302 operates in step 4321 by operating a second subset of LEDs of the display as a camera by driving the second subset of LEDs of the display using one or more negative signal portions. Note that the steps 4311 and 4321 performed simultaneously.

The method 4302 operates in step 4331 by operating a first subset of LEDs of the display as a camera by driving the first subset of LEDs of the display using one or more negative signal portions. The method 4302 operates in step 4341 by operating the second subset of LEDs of the display as an output device by driving the second subset of LEDs of the display using one or more positive signal portions. Note that the steps 4331 and 4341 are performed simultaneously.

Figure 44:
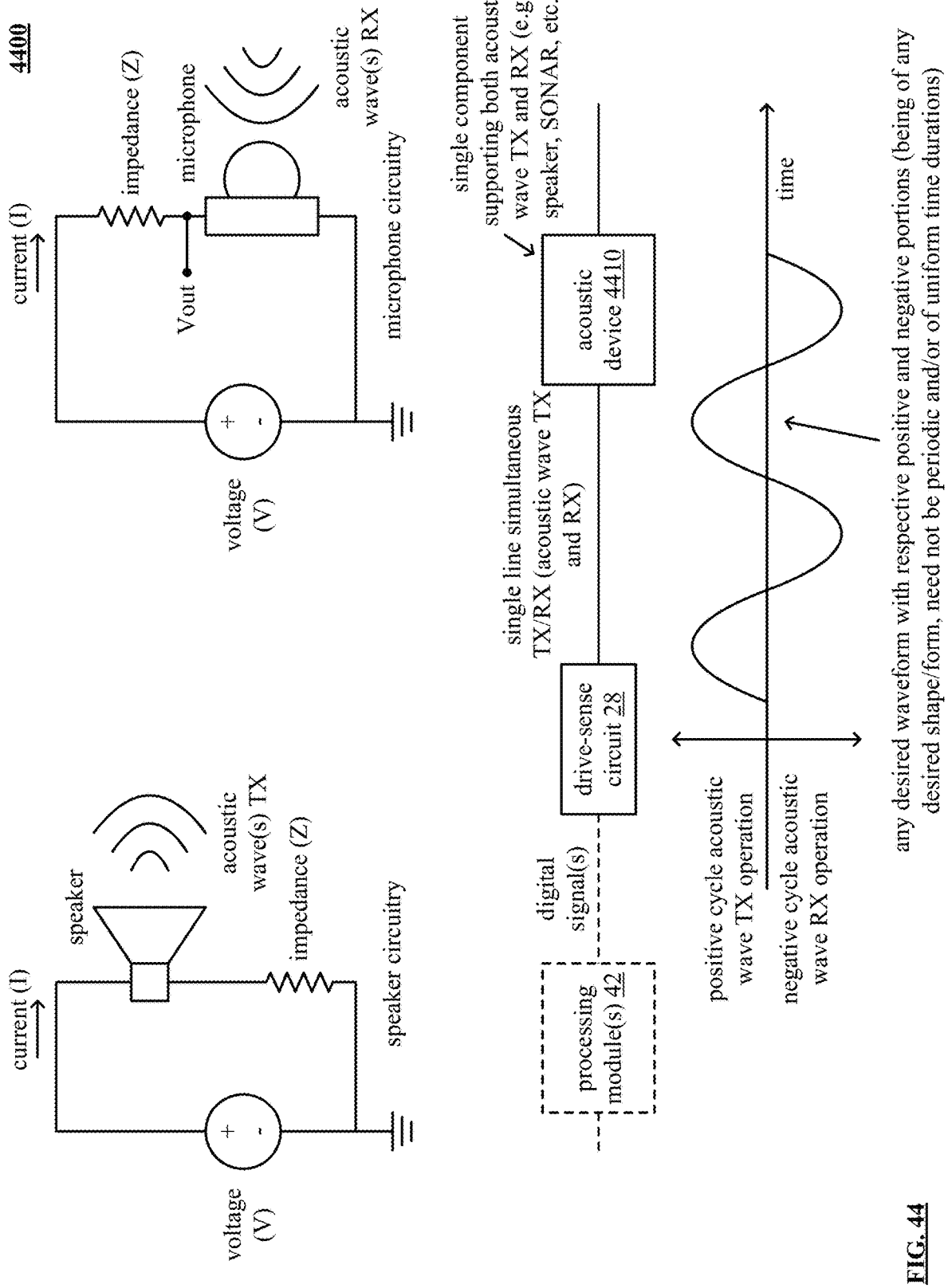
FIG. 44 is a schematic block diagram of an embodiment of an acoustic device operating as both a source and a detector in accordance with the present invention.

FIG. 44 is a schematic block diagram 4400 of an embodiment of an acoustic device operating as both a source and a detector in accordance with the present invention. An acoustic source device (e.g., such as a speaker) emits acoustic waves when an appropriate current is passed through it. At the top left of the diagram, a speaker circuitry includes a voltage source that is applied to a speaker. If desired, an impedance (Z, which may include resistive (e.g., such as from a resistor, R) and/or reactive (e.g., such as from an inductor, L and/or capacitor, C) may be employed to limit the amount of current passing through the speaker.

An acoustic sensor device (e.g., such as a microphone) detects acoustic waves incident on it when an appropriate current is passed through it. At the top right of the diagram, a microphone circuitry includes a voltage source that is applied to it. If desired, an impedance (shown as a Z) may be employed to limit the amount of current passing through the microphone.

Similar to certain previous diagrams, this diagram shows a drive-sense circuit 28 and one or more processing modules 42. In this diagram, the drive-sense circuit 28 is configured to drive an acoustic drive signal via a single line to an acoustic device 4410 and simultaneously to sense that acoustic drive signal via the single line. During positive portions of the acoustic drive signal, the acoustic device 4410 (e.g., a speaker, a microphone, etc.) operates as a source emitting acoustic waves. During negative portions of the acoustic drive signal, the acoustic device 4410 operates as a sensor detecting acoustic waves incident on the acoustic device 4410. Note that the acoustic drive signal may have any desired form. For example, any desired waveform with respective positive and negative portions having any desired shape/form may be driven and sensed by the drive-sense circuit 28. Note also that the acoustic drive signal need not be periodic, and the positive and/or negative portions thereof need not be of uniform time durations.

Among other features and aspects of the drive-sense circuit 28, the sensitivity of the drive-sense circuit 28 and its ability to detect extremely small signals even in situations of very low signal to noise ratio (SNR) allows the single component, the acoustic device 4410, to be operated supporting both source and detector functionality (e.g., speaker and microphone functionality). In general, note that the acoustic device 4410 may be any acoustic device that includes the functionality and capability to operate as both an acoustic source and an acoustic detector.

Figure 45:
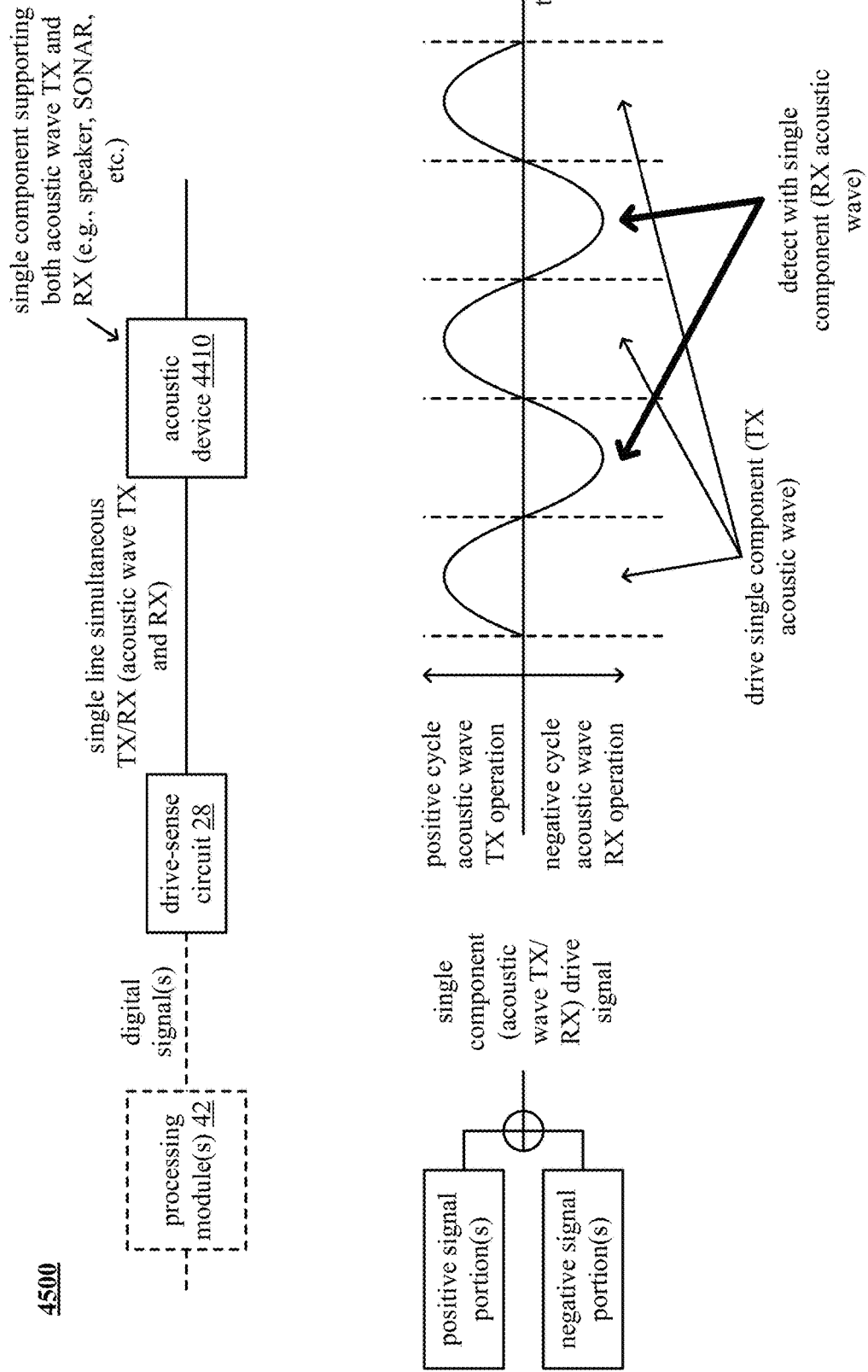
FIG. 45 is a schematic block diagram of an embodiment of an acoustic device operating as both a source and a detector in accordance with the present invention.

FIG. 45 is a schematic block diagram of an embodiment 4500 of an acoustic device operating as both a source and a detector in accordance with the present invention. Similar to certain previous diagrams, this diagram shows the acoustic device 4410, a drive-sense circuit 28, and one or more processing modules 42. The drive-sense circuit 28 is configured to drive an acoustic drive signal via a single line to the acoustic device 4410 and simultaneously to sense that acoustic drive signal via the single line. Note that the acoustic device 4410 may be implemented as a speaker, as a microphone, etc. and/or generally as any acoustic device that includes the functionality and capability to operate as both an acoustic source and an acoustic detector.

A single component drive signal (e.g., an acoustic wave TX/RX drive signal) includes one or more positive signal portions and one or more negative signal portions. Again, note that any one or more types of signals having any one or more characteristics may be used to form a drive signal to be provided from a drive-sense circuit 28. Note also that the one or more positive signal portions need not be similar in form, type, etc. as the one or more negative signal portions.

As can be seen with respect to the waveform on the bottom right of the diagram, a drive-sense circuit 28 is configured to drive a single component during the one or more positive signal portions of the single component drive signal and to detect with that single component during one or more negative signal portions of this single component drive signal. In some examples, a drive-sense circuit 28 is configured to drive a single component during one or more positive and negative signal portions of the single component drive signal and to detect with that single component during the one or more positive and negative signal portions of this single component drive signal.

In addition, note that any desired application using acoustic waves may be implemented using an acoustic device operating as both a source and a detector in cooperation with a drive-sense circuit 28 that is configured to drive a signal to such an acoustic device and simultaneously to detect the signal and/or any other signals associated with the acoustic device. For example, an acoustic wave ranging system that transmits acoustic waves and detects the reflected waves may be implemented using one or more acoustic devices operating as both one or more sources and one or more detectors (e.g., Sound Navigation And Ranging (SONAR)).

Figure 46B:
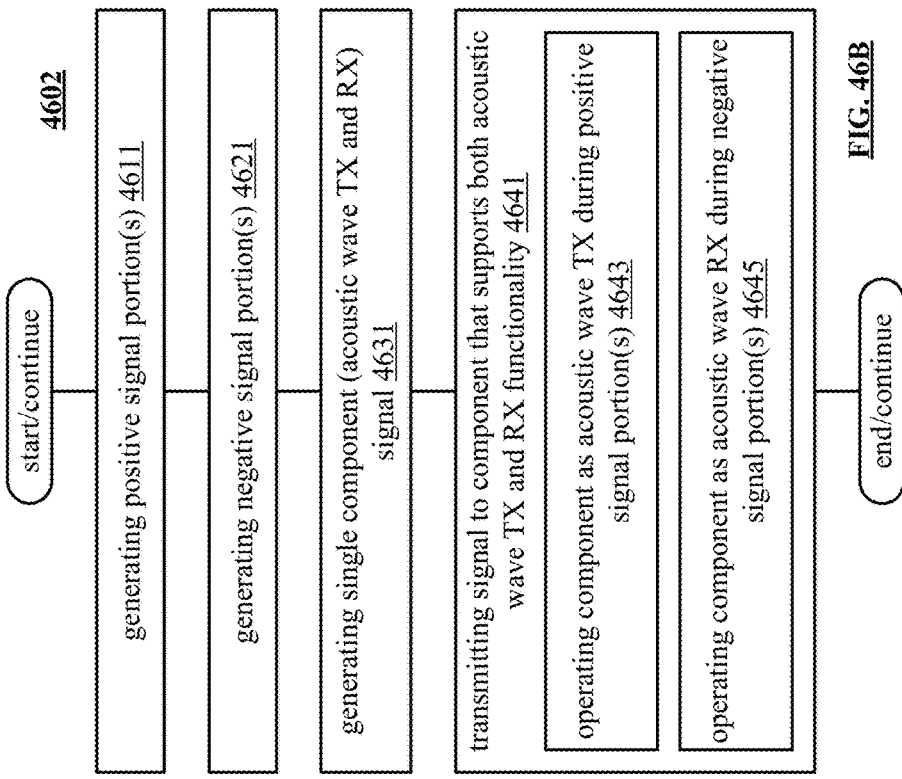
FIG. 46B is a schematic block diagram illustrating an embodiment of a method for execution by one or more devices in accordance with the present invention.
Figure 46A:
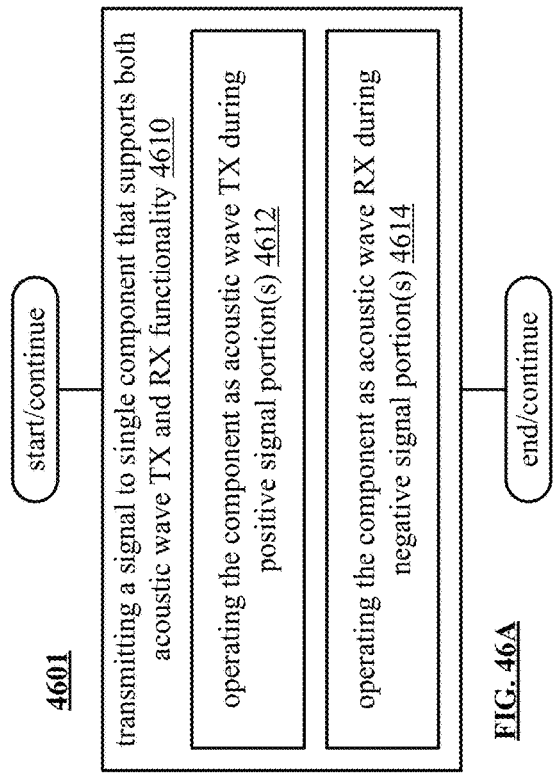
FIG. 46A is a schematic block diagram illustrating an embodiment of a method for execution by one or more devices in accordance with the present invention.

FIG. 46A is a schematic block diagram illustrating an embodiment of a method 4601 for execution by one or more devices in accordance with the present invention. The method 4601 operates in step 4610 by transmitting a signal to a component that includes the functionality and capability to operate as both a source and a detector (e.g., as an acoustic source and as an acoustic detector, as a speaker and as a microphone, etc.). Such a component may itself be a speaker or a microphone. In general, the acoustic device that has the capability and functionality to operate both as an acoustic source and an acoustic sensor.

The method 4601, when performing this step 4610, also operates by operating the component as an acoustic wave transmitter (TX) during one or more positive signal portions in step 4612 and by operating the component as an acoustic wave receiver (RX) during one or more negative signal portions in step 4614.

FIG. 46B is a schematic block diagram illustrating an embodiment of a method 4602 for execution by one or more devices in accordance with the present invention. The method 4602 operates in step 4611 by generating one or more positive signal portions. The method 4602 operates in step 4621 by generating one or more negative signal portions.

The method 4602 operates in step 4631 by generating a single component signal (e.g., an acoustic wave TX/RX drive signal). The method 4602 operates in step 4641 by transmitting the single component signal to a component that supports both acoustic source and acoustic sensor functionality. Such a component may itself be a speaker or a microphone. In one specific example, the single component is a speaker. In another specific example, the single component is a microphone. The single component may be another acoustic device that has the capability and functionality to operate both an acoustic source and an acoustic sensor.

The method 4602, when performing this step 4641, also operates by operating the component as an acoustic wave transmitter (TX) during one or more positive signal portions in step 4643 and by operating the component as an acoustic wave receiver (RX) during one or more negative signal portions in step 4645.

Figure 47:
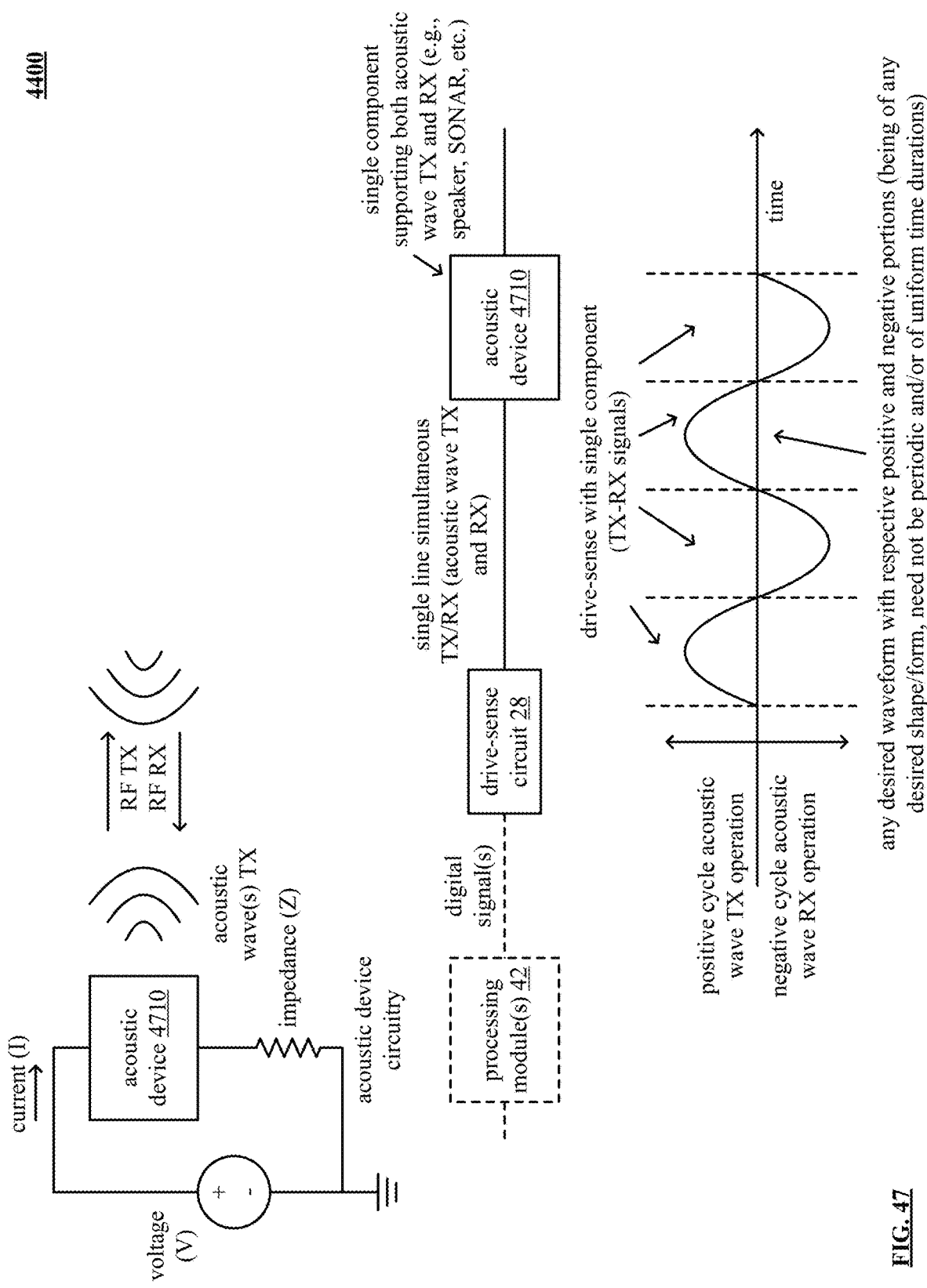
FIG. 47 is a schematic block diagram of an embodiment of an acoustic device operating as both a source and a detector in accordance with the present invention.

FIG. 47 is a schematic block diagram 4700 of an embodiment of an acoustic device operating as both a source and a detector in accordance with the present invention. An acoustic source device 4710 emits acoustic waves and/or receives acoustic waves when an appropriate current is passed through it. At the top left of the diagram, an acoustic device circuitry includes a voltage source that is applied to a speaker. If desired, an impedance (shown as Z, which may include resistive (e.g., such as from a resistor, R) and/or reactive (e.g., such as from an inductor, L and/or capacitor, C) may be employed to limit the amount of current passing through the speaker.

Similar to certain previous diagrams, this diagram shows a drive-sense circuit 28 and one or more processing modules 42. In this diagram, the drive-sense circuit 28 is configured to drive an acoustic drive signal via a single line to an acoustic device 4710 and simultaneously to sense that acoustic drive signal via the single line.

Note that any received acoustic is also coupled into the acoustic drive signal that is being driven and sensed via the single line. As such, during both respective positive and negative portions of the acoustic drive signal, the drive-sense circuit 28 is configured to drive the acoustic drive signal via the single line to the acoustic source device 4710 and simultaneously to sense that acoustic drive signal via the single line. The acoustic device 4410 operates as a source emitting acoustic waves and simultaneously operates as a sensor detecting acoustic waves incident on the acoustic device 4710. Note that the acoustic drive signal may have any desired form. For example, any desired waveform with respective positive and negative portions having any desired shape/form may be driven and sensed by the drive-sense circuit 28. Note also that the acoustic drive signal need not be periodic, and the positive and/or negative portions thereof need not be of uniform time durations.

Among other features and aspects of the drive-sense circuit 28, the sensitivity of the drive-sense circuit 28 and its ability to detect extremely small signals even in situations of very low signal to noise ratio (SNR) allows the single component, the acoustic device 4410, to be operated supporting both source and detector functionality (e.g., speaker and microphone functionality). In general, note that the acoustic device 4410 may be any acoustic device that includes the functionality and capability to operate as both an acoustic source and an acoustic detector.

FIG. 48 is a schematic block diagram 4800 of an embodiment of an electromagnetic wave device operating as both a source and a detector in accordance with the present invention. An electromagnetic (EM) wave source device (e.g., such as an antenna, antennas, an antenna array, etc.) emits EM waves when an appropriate current is passed through it. At the top left of the diagram, a radar circuitry includes a voltage source that is applied to an EM wave source device (e.g., such as an antenna, antennas, an antenna array, etc.). If desired, an impedance (shown as Z, which may include resistive (e.g., such as from a resistor, R) and/or reactive (e.g., such as from an inductor, L and/or capacitor, C) may be employed to limit the amount of current passing through the EM wave source device.

An EM wave sensor device (e.g., such as an antenna, antennas, an antenna array, etc.) detects EM waves incident on it when an appropriate current is passed through it. At the top right of the diagram, a radar circuitry includes a voltage source that is applied to the EM wave source device (e.g., such as an antenna, antennas, an antenna array, etc.). If desired, an impedance (shown as Z, which may include resistive (e.g., such as from a resistor, R) and/or reactive (e.g., such as from an inductor, L and/or capacitor, C) may be employed to limit the amount of current passing through the EM wave sensor device.

Similar to certain previous diagrams, this diagram shows a drive-sense circuit 28 and one or more processing modules 42. In this diagram, the drive-sense circuit 28 is configured to drive an EM wave drive signal via a single line to an antenna 4810 and simultaneously to sense that EM wave drive signal via the single line. During positive portions of the EM wave drive signal, the antenna 4810 (e.g., alt. antennas, an antenna array, etc.) operates as a source emitting EM waves. During negative portions of the EM wave drive signal, the antenna 4810 operates as a sensor detecting EM waves incident on the antenna 4810. Note that the EM wave drive signal may have any desired form. For example, any desired waveform with respective positive and negative portions having any desired shape/form may be driven and sensed by the drive-sense circuit 28. Note also that the EM wave drive signal need not be periodic, and the positive and/or negative portions thereof need not be of uniform time durations.

Among other features and aspects of the drive-sense circuit 28, the sensitivity of the drive-sense circuit 28 and its ability to detect extremely small signals even in situations of very low signal to noise ratio (SNR) allows the single component, the antenna 4810, to be operated supporting both source and detector functionality (e.g., an antenna, antennas, an antenna array, etc.). In general, note that the antenna 4810 may be any EM wave device that includes the functionality and capability to operate as both an EM wave source and an EM wave detector.

FIG. 49 is a schematic block diagram 4900 of an embodiment of an electromagnetic wave device operating as both a source and a detector in accordance with the present invention. Similar to certain previous diagrams, this diagram shows an antenna 4810, a drive-sense circuit 28, and one or more processing modules 42. The drive-sense circuit 28 is configured to drive an electromagnetic (EM) wave drive signal via a single line to the antenna 4710 and simultaneously to sense that EM wave drive signal via the single line. Note that the antenna 4710 may be implemented as a singular antenna, antennas, an antenna array, etc. and/or generally as any EM wave device that includes the functionality and capability to operate as both an EM wave source and an EM wave detector including antennas of any types of design, shape, characteristic, etc.

A single component drive signal (e.g., an EM wave TX/RX drive signal) includes one or more positive signal portions and one or more negative signal portions. Again, note that any one or more types of signals having any one or more characteristics may be used to form a drive signal to be provided from a drive-sense circuit 28. Note also that the one or more positive signal portions need not be similar in form, type, etc. as the one or more negative signal portions.

As can be seen with respect to the waveform on the bottom right of the diagram, a drive-sense circuit 28 is configured to drive a single component during the one or more positive signal portions of the single component drive signal and to detect with that single component during one or more negative signal portions of this single component drive signal. In some examples, a drive-sense circuit 28 is configured to drive a single component during one or more positive and negative signal portions of the single component drive signal and to detect with that single component during the one or more positive and negative signal portions of this single component drive signal.

In addition, note that any desired application using EM waves may be implemented using an EM wave device operating as both a source and a detector in cooperation with a drive-sense circuit 28 that is configured to drive a signal to such an EM wave device and simultaneously to detect the signal and/or any other signals associated with the EM wave device. For example, an EM wave ranging system that transmits EM waves and detects the reflected waves may be implemented using one or more EM wave devices operating as both one or more sources and one or more detectors (e.g., Radio Detection and Ranging (RADAR)).

Figure 50A:
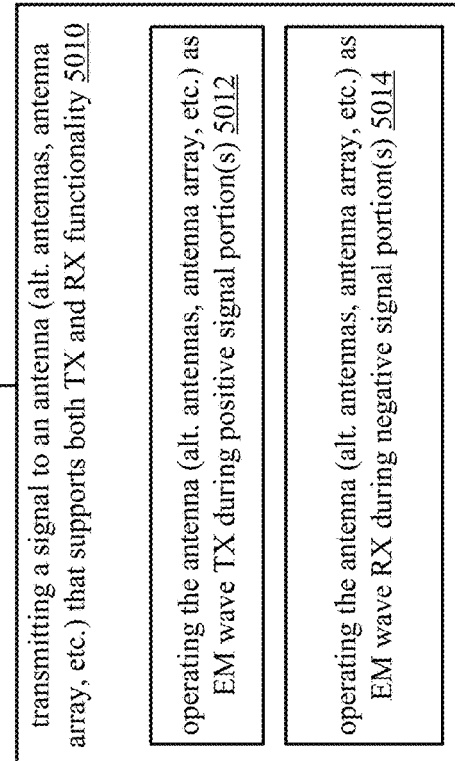
FIG. 50A is a schematic block diagram illustrating an embodiment of a method for execution by one or more devices in accordance with the present invention.

FIG. 50A is a schematic block diagram illustrating an embodiment of a method for execution by one or more devices in accordance with the present invention.

The method 5001 operates in step 5010 by transmitting a signal to a component that includes the functionality and capability to operate as both a source and a detector (e.g., as an electromagnetic (EM) wave source and as an electromagnetic (EM) wave detector, such as an antenna, antennas, an antenna array, etc.). In general, the EM device that has the capability and functionality to operate both as an EM wave source and an EM wave sensor.

The method 5001, when performing this step 5010, also operates by operating the component as an EM wave transmitter (TX) during one or more positive signal portions in step 5012 and by operating the component as an EM wave receiver (RX) during one or more negative signal portions in step 5014.

Figure 50B:
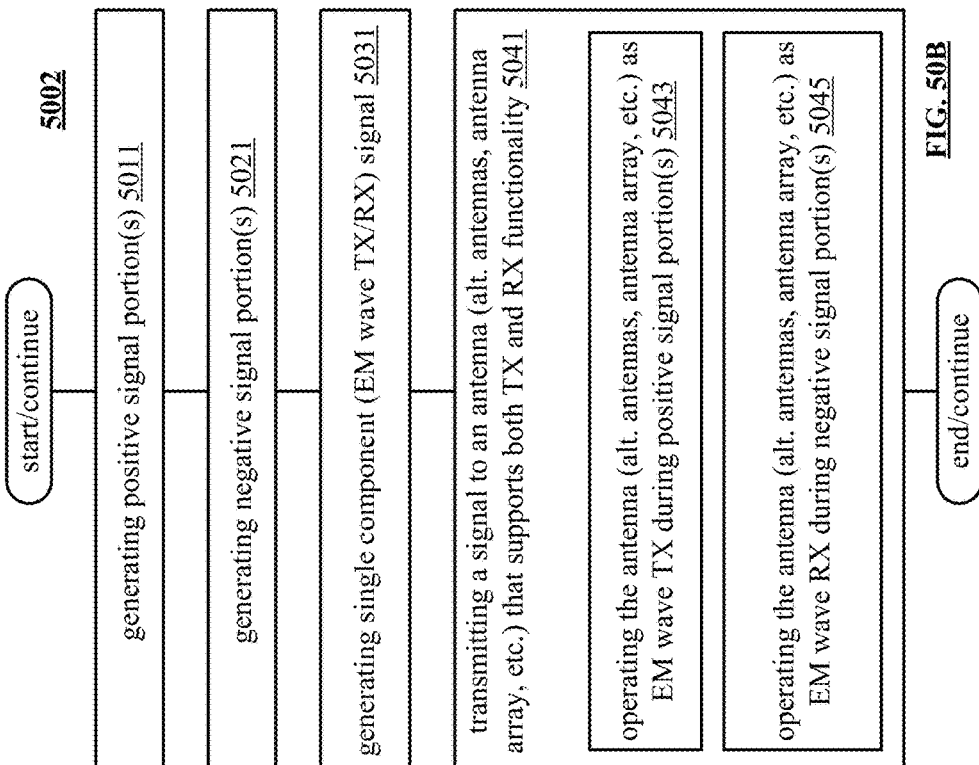
FIG. 50B is a schematic block diagram illustrating an embodiment of a method for execution by one or more devices in accordance with the present invention.

FIG. 50B is a schematic block diagram illustrating an embodiment of a method for execution by one or more devices in accordance with the present invention. The method 5002 operates in step 5011 by generating one or more positive signal portions. The method 5002 operates in step 5021 by generating one or more negative signal portions.

The method 5002 operates in step 5031 by generating a single component signal (e.g., an electromagnetic (EM) wave TX/RX drive signal). The method 5002 operates in step 5041 by transmitting the single component signal to a component that supports both EM source and EM sensor functionality. Such a component may itself be an antenna, antennas, an antenna array, etc. The single component may be any EM wave device that has the capability and functionality to operate both an EM wave source and an EM wave sensor.

The method 5002, when performing this step 5041, also operates by operating the component as an EM wave transmitter (TX) during one or more positive signal portions in step 5043 and by operating the component as an EM wave receiver (RX) during one or more negative signal portions in step 5045.

Figure 51:
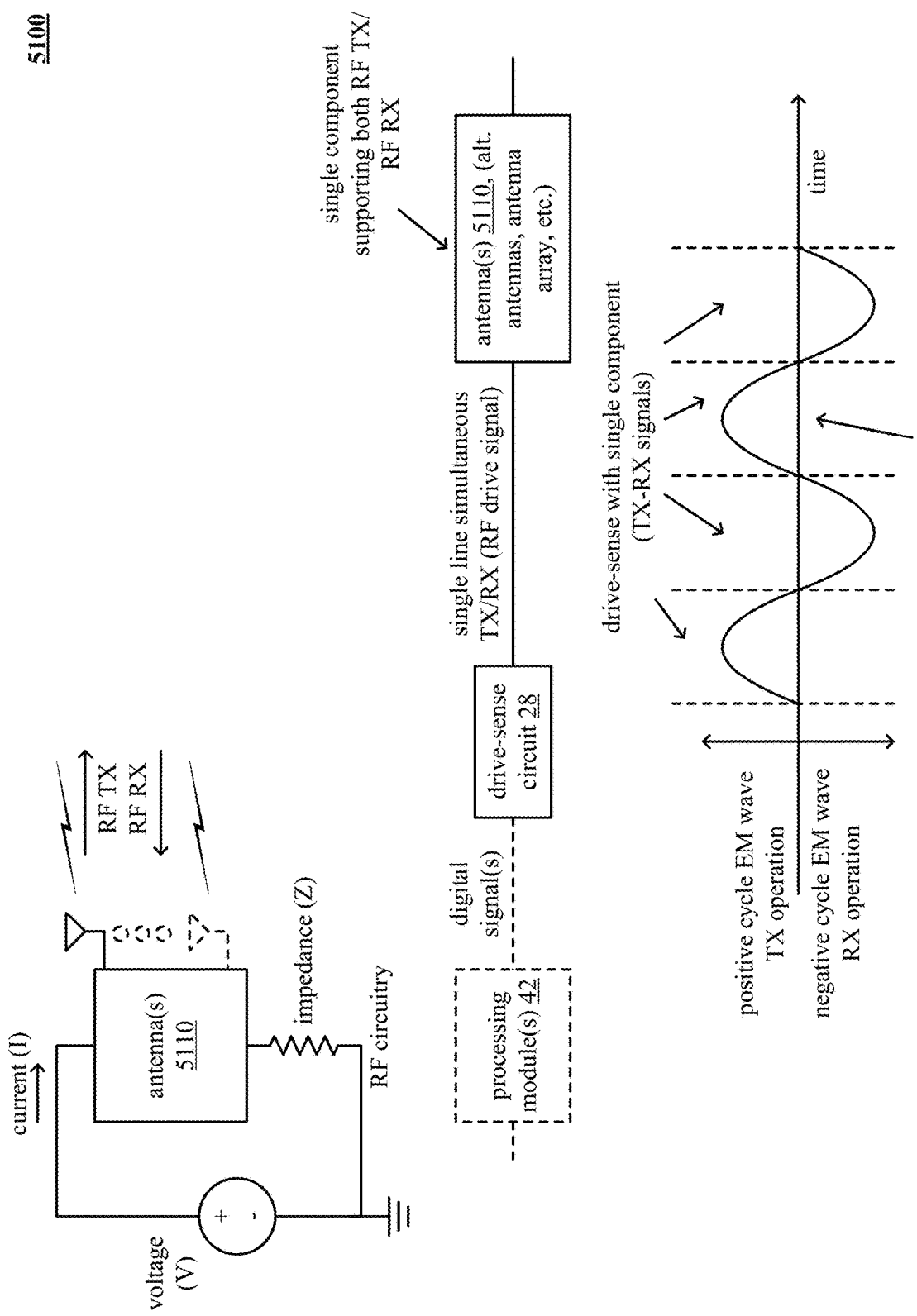
FIG. 51 is a schematic block diagram of an embodiment of a radio frequency (RF) device operating as both a source and a detector in accordance with the present invention.

FIG. 51 is a schematic block diagram of an embodiment of a radio frequency (RF) device operating as both a source and a detector in accordance with the present invention. An RF source device (e.g., such as an antenna, antennas, an antenna array, etc.) transmits and/or receives RF signals when an appropriate current is passed through it. At the top left of the diagram, an RF circuitry includes a voltage source that is applied to one or more antennas (e.g., such as an antenna, antennas, an antenna array, etc.) to facilitate transmission and/or receiving of RF signals. If desired, an impedance (shown as Z, which may include resistive (e.g., such as from a resistor, R) and/or reactive (e.g., such as from an inductor, L and/or capacitor, C) may be employed to limit the amount of current passing through the one or more antennas.

Similar to certain previous diagrams, this diagram shows a drive-sense circuit 28 and one or more processing modules 42. In this diagram, the drive-sense circuit 28 is configured to drive an RF drive signal via a single line to one or more antennas 5110 (e.g., such as an antenna, antennas, an antenna array, etc.) and simultaneously to sense that RF drive signal via the single line. Note that any received RF signal is also coupled into the RF drive signal that is being driven and sensed via the single line. As such, during both respective positive and negative portions of the RF drive signal, the drive-sense circuit 28 is configured to drive the RF drive signal via the single line to the one or more antennas 5110 and simultaneously to sense that RF drive signal via the single line.

Note that the RF drive signal may have any desired form. For example, any desired waveform with respective positive and negative portions having any desired shape/form may be driven and sensed by the drive-sense circuit 28. Note also that the RF drive signal need not be periodic, and the positive and/or negative portions thereof need not be of uniform time durations.

Among other features and aspects of the drive-sense circuit 28, the sensitivity of the drive-sense circuit 28 and its ability to detect extremely small signals even in situations of very low signal to noise ratio (SNR) allows the single component, the one or more antennas 5110, to be operated supporting both source and detector functionality (e.g., an antenna, antennas, an antenna array, etc.). In general, note that the one or more antennas 5110 may be any RF device that includes the functionality and capability to operate as both an RF signal source and an RF signal detector.

Figure 52:
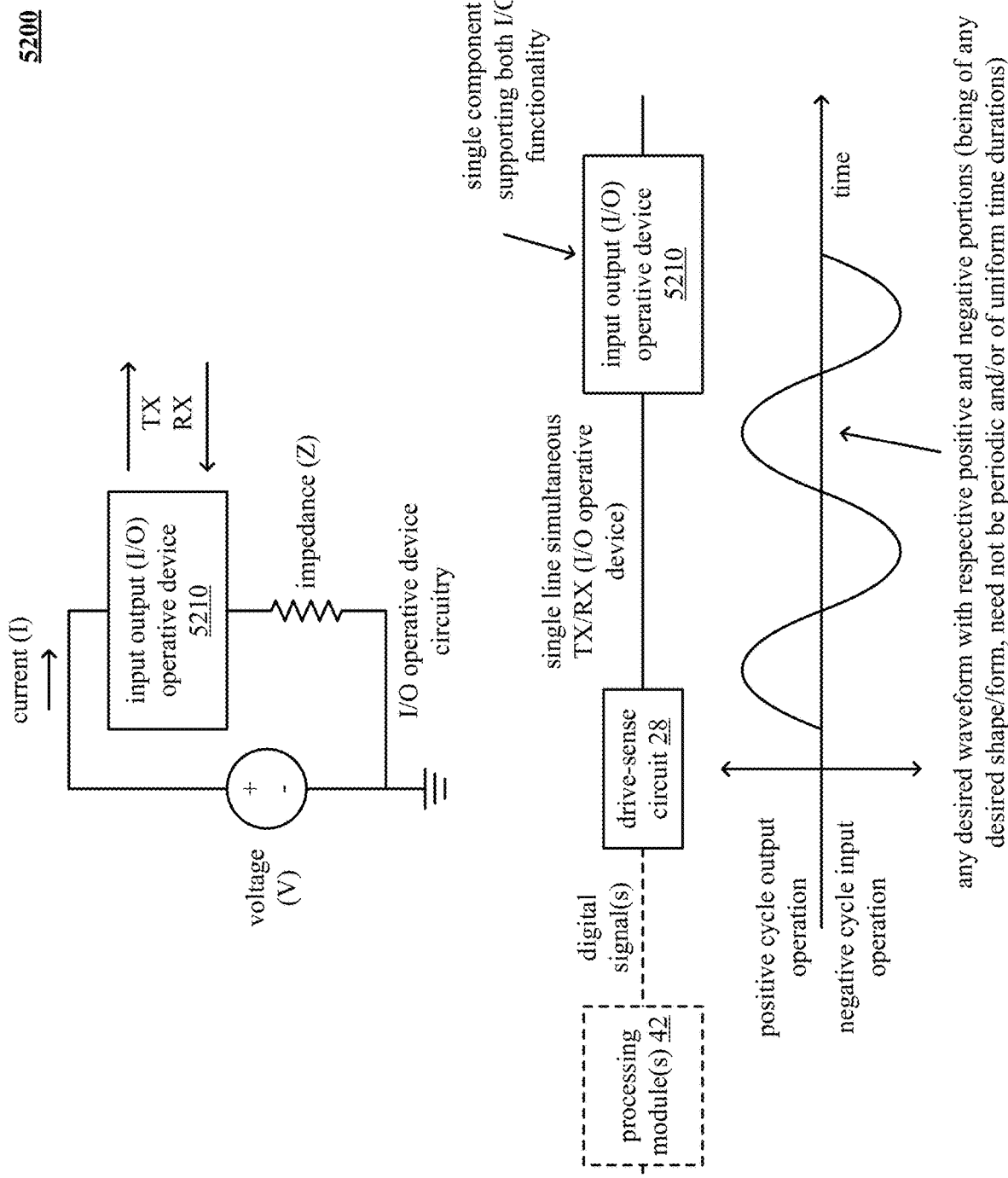
FIG. 52 is a schematic block diagram of an embodiment of an input/output (I/O) device operating as both a source and a detector in accordance with the present invention.

FIG. 52 is a schematic block diagram 5200 of an embodiment of an input/output (I/O) device operating as both a source and a detector in accordance with the present invention. An input/output (I/O) device operates as an output device when an appropriate current is passed through it in one direction and operates as an input device when an appropriate current is passed through it in the other direction. At the top of the diagram, input/output (I/O) device circuitry includes a voltage source that is applied to an input/output (I/O) device. If desired, an impedance (shown as Z, which may include resistive (e.g., such as from a resistor, R) and/or reactive (e.g., such as from an inductor, L and/or capacitor, C) may be employed to limit the amount of current passing through the input/output (I/O) device.

Similar to certain previous diagrams, this diagram shows a drive-sense circuit 28 and one or more processing modules 42. In this diagram, the drive-sense circuit 28 is configured to drive an input/output (I/O) device drive signal via a single line to an input/output (I/O) device 5110 and simultaneously to sense that input/output (I/O) device drive signal via the single line. During positive portions of the input/output (I/O) device drive signal, the input/output (I/O) device 5110 operates as an output device. During negative portions of the input/output (I/O) device drive signal, the input/output (I/O) device 5110 operates as an input device. Note that the input/output (I/O) device drive signal may have any desired form. For example, any desired waveform with respective positive and negative portions having any desired shape/form may be driven and sensed by the drive-sense circuit 28. Note also that the input/output (I/O) device drive signal need not be periodic, and the positive and/or negative portions thereof need not be of uniform time durations.

Among other features and aspects of the drive-sense circuit 28, the sensitivity of the drive-sense circuit 28 and its ability to detect extremely small signals even in situations of very low signal to noise ratio (SNR) allows the single component, the input/output (I/O) device 5110, to be operated supporting both output device and input device functionality. In general, note that the input/output (I/O) device 5110 may be any device that includes the functionality and capability to operate as both an output device and an input device (e.g., as a source and as a detector).

Figure 53:
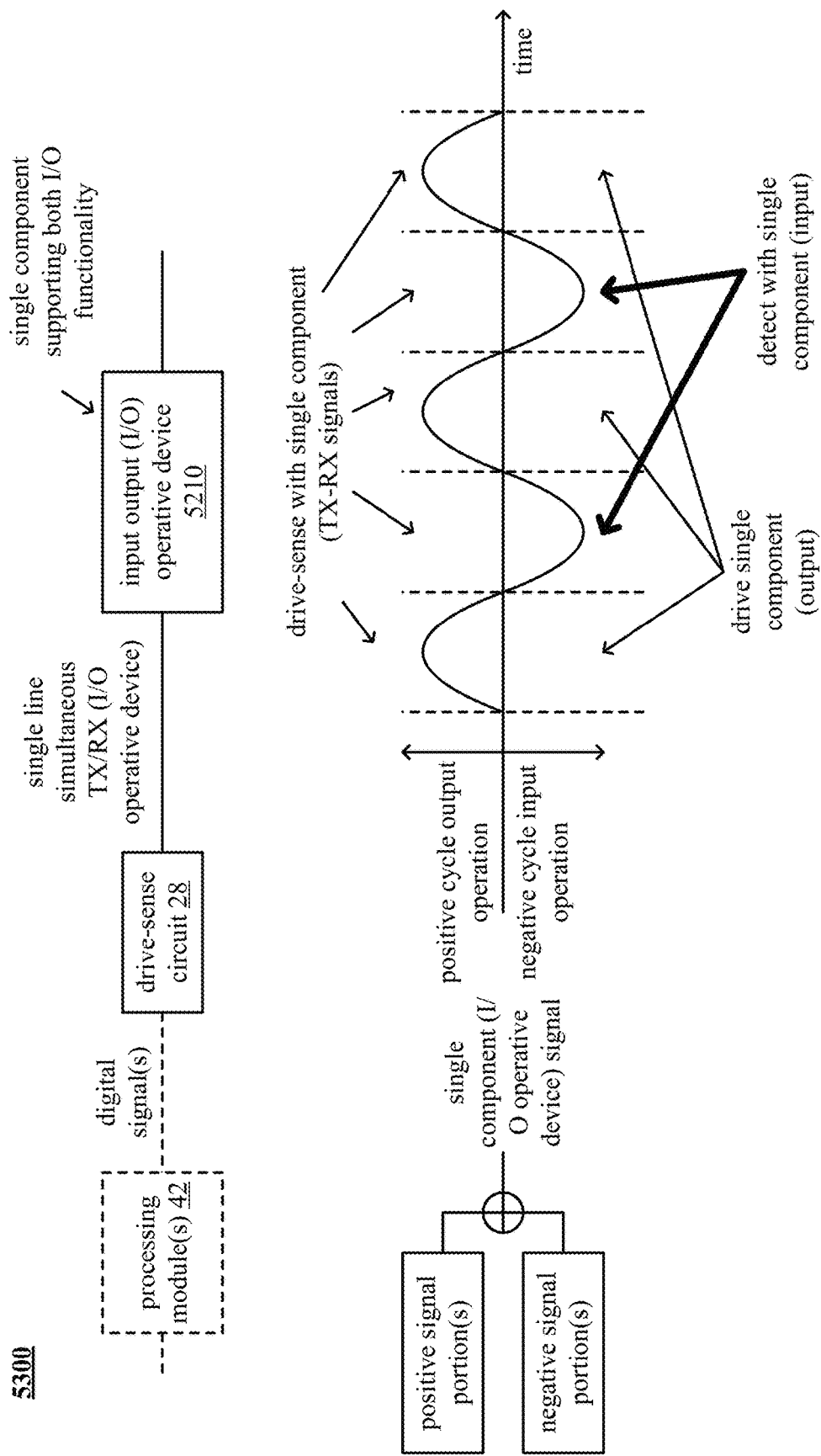
FIG. 53 is a schematic block diagram of an embodiment of an input/output (I/O) device operating as both a source and a detector in accordance with the present invention.

FIG. 53 is a schematic block diagram 5300 of an embodiment of an input/output (I/O) device operating as both a source and a detector in accordance with the present invention. Similar to certain previous diagrams, this diagram shows the input/output (I/O) device 5210, a drive-sense circuit 28, and one or more processing modules 42. The drive-sense circuit 28 is configured to drive an input/output (I/O) device drive signal via a single line to the input/output (I/O) device 5010 and simultaneously to sense that input/output (I/O) device drive signal via the single line. Note that the input/output (I/O) device 5010 may be implemented as any device that includes the functionality and capability to operate as both an output device and an input device (e.g., as a source and as a detector).

A single component drive signal (e.g., an input/output (I/O) device drive signal) includes one or more positive signal portions and one or more negative signal portions. Again, note that any one or more types of signals having any one or more characteristics may be used to form a drive signal to be provided from a drive-sense circuit 28. Note also that the one or more positive signal portions need not be similar in form, type, etc. as the one or more negative signal portions.

As can be seen with respect to the waveform on the bottom right of the diagram, a drive-sense circuit 28 is configured to drive a single component during the one or more positive signal portions of the single component drive signal and to detect with that single component during one or more negative signal portions of this single component drive signal. In some examples, a drive-sense circuit 28 is configured to drive a single component during one or more positive and negative signal portions of the single component drive signal and to detect with that single component during the one or more positive and negative signal portions of this single component drive signal.

FIG. 54A is a schematic block diagram illustrating an embodiment of a method 5401 for execution by one or more devices in accordance with the present invention. The method 5401 operates in step 5410 by transmitting a signal to a component that includes the functionality and capability to operate as both as both an output device and an input device (e.g., as a source and as a detector).

The method 5401, when performing this step 5410, also operates by operating the component as an output device during one or more positive signal portions in step 5412 and by operating the component as an input device during one or more negative signal portions in step 5414.

FIG. 54B is a schematic block diagram illustrating an embodiment of a method 5402 for execution by one or more devices in accordance with the present invention. The method 5402 operates in step 5411 by generating one or more positive signal portions. The method 5402 operates in step 5421 by generating one or more negative signal portions.

The method 5402 operates in step 5431 by generating a single component signal (e.g., an input/output (I/O) device drive signal). The method 5402 operates in step 5441 by transmitting the single component signal to a component that that includes the functionality and capability to operate as both an output device and an input device (e.g., as a source and as a detector).

The method 5402, when performing this step 5441, also operates by operating the component as an output device during one or more positive signal portions in step 5443 and by operating the component as an input device during one or more negative signal portions in step 5445.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and c.

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A source and sensor electromagnetic wave system, the system comprising:
    an antenna operably coupled to operate as a source and a sensor of electromagnetic waves; and
    a drive-sense circuit (DSC) operably coupled to the antenna via a single line, wherein, when enabled, the DSC configured to:
        provide a drive signal, via the single line, to the antenna to facilitate the antenna to operate as the source to transmit a first electromagnetic wave during a first time and to facilitate the antenna to operate as a sensor of a second electromagnetic wave during a second time and simultaneously sense, via the single line, a first effect on the drive signal during the antenna operating as the source and a second effect on the drive signal during the antenna operating as the sensor; and
        generate a digital signal representative of the first effect on the drive signal during the antenna operating as the source and the second effect on the drive signal during the antenna operating as the sensor.

2. The system of claim 1 further comprising:
an antenna array, including the antenna, operably coupled to operate as the source and the sensor of the electromagnetic waves; and
a plurality of DSCs, including the DSC, operably coupled to the antenna array via a plurality of respective single lines such that each DSC of the plurality of DSC is operably coupled to a respective antenna of the antenna array via a respective single line.

3. The system of claim 2 further comprising:
another DSC of the plurality of DSCs operably coupled to another antenna of the antenna array via another single line, wherein, when enabled, the another DSC configured to:
    provide another drive signal, via the another single line, to the another antenna to facilitate the another antenna to operate as another source during the first time and to facilitate the another antenna to operate as another sensor during the second time and simultaneously sense, via the another single line, a first other effect on the another drive signal during the another antenna operating as the another source and a second other effect on the another drive signal during the another antenna operating as the another sensor; and
    generate another digital signal representative of the first other effect on the another drive signal during the another antenna operating as the another source and the second other effect on the another drive signal during the another antenna operating as the another sensor.

4. The system of claim 1, wherein:
the drive signal includes a positive portion during the first time; and
the drive signal includes a negative portion during the second time.

5. The system of claim 1 further comprising:
memory that stores operational instructions; and
one or more processing modules operably coupled to the DSC and the memory, wherein, when enabled, the one or more processing modules configured to execute the operational instructions to:
    receive the digital signal representative of the first effect on the drive signal during the antenna operating as the source and the second effect on the drive signal during the antenna operating as the sensor; and
    process the digital signal to determine information regarding the first effect on the drive signal during the antenna operating as the source and the second effect on the drive signal during the antenna operating as the sensor.

6. The system of claim 1 further comprising:
a computing device operably coupled to the DSC, when enabled, DSC configured to:
    receive the digital signal representative of the first effect on the drive signal during the antenna operating as the source and the second effect on the drive signal during the antenna operating as the sensor; and process the digital signal to determine information regarding the first effect on the drive signal during the antenna operating as the source and the second effect on the drive signal during the antenna operating as the sensor.

7. The system of claim 6, wherein the computing device is in communication via a network that includes at least one of a wireless communication system, a cellular communication system, a wire lined communication system, a non-public intranet system, a public internet system, a local area network (LAN), or a wide area network (WAN).

8. The system of claim 1, wherein the electromagnetic waves include radio frequency (RF) waves.

9. The system of claim 1, wherein the DSC further comprises:
a power source circuit operably coupled to the antenna via the single line, wherein, when enabled, the power source circuit is configured to provide an analog signal via the single line coupling to the antenna, and wherein the analog signal includes at least one of a DC (direct current) component and an oscillating component; and
a power source change detection circuit operably coupled to the power source circuit, wherein, when enabled, the power source change detection circuit is configured to:
detect the first effect on the drive signal during the antenna operating as the source;
detect the second effect on the drive signal during the antenna operating as the sensor; and
generate the digital signal representative of the first effect on the drive signal during the antenna operating as the source and the second effect on the drive signal during the antenna operating as the sensor.

10. The system of claim 9 further comprising:
the power source circuit including a power source to source at least one of a voltage or a current to the antenna via first single line; and
the power source change detection circuit including:
a power source reference circuit configured to provide at least one of a voltage reference or a current reference; and
a comparator configured to compare the at least one of the voltage or the current provided to the antenna to the at least one of the voltage reference or the current reference in accordance with producing the drive signal.

11. A method for execution by a source and sensor electromagnetic wave system, the method comprising:
operating an antenna as a source and a sensor of electromagnetic waves; and
operating a drive-sense circuit (DSC) that is operably coupled to the antenna via a single line to:
provide a drive signal, via the single line, to the antenna to facilitate the antenna to operate as the source to transmit a first electromagnetic wave during a first time and to facilitate the antenna to operate as a sensor of a second electromagnetic wave during a second time and simultaneously sense, via the single line, a first effect on the drive signal during the antenna operating as the source and a second effect on the drive signal during the antenna operating as the sensor; and
generate a digital signal representative of the first effect on the drive signal during the antenna operating as the source and the second effect on the drive signal during the antenna operating as the sensor.

12. The method of claim 11 further comprising:
operating an antenna array, including the antenna, as the source and the sensor of the electromagnetic waves; and
operating a plurality of DSCs, including the DSC, wherein the plurality of DSCs is operably coupled to the antenna array via a plurality of respective single lines such that each DSC of the plurality of DSC is operably coupled to a respective antenna of the antenna array via a respective single line.

13. The method of claim 12 further comprising:
operating another DSC of the plurality of DSCs operably coupled to another antenna of the antenna array via another single line, wherein, when enabled, the another DSC configured to:
provide another drive signal, via the another single line, to the another antenna to facilitate the another antenna to operate as another source during the first time and to facilitate the another antenna to operate as another sensor during the second time and simultaneously sense, via the another single line, a first other effect on the another drive signal during the another antenna operating as the another source and a second other effect on the another drive signal during the another antenna operating as the another sensor; and
generate another digital signal representative of the first other effect on the another drive signal during the another antenna operating as the another source and the second other effect on the another drive signal during the another antenna operating as the another sensor.

14. The method of claim 11, wherein:
the drive signal includes a positive portion during the first time; and
the drive signal includes a negative portion during the second time.

15. The method of claim 11 further comprising operating one or more processing modules for:
receiving the digital signal representative of the first effect on the drive signal during the antenna operating as the source and the second effect on the drive signal during the antenna operating as the sensor; and
processing the digital signal to determine information regarding the first effect on the drive signal during the antenna operating as the source and the second effect on the drive signal during the antenna operating as the sensor.

16. The method of claim 11 further comprising operating a computing device for:
receiving the digital signal representative of the first effect on the drive signal during the antenna operating as the source and the second effect on the drive signal during the antenna operating as the sensor; and
processing the digital signal to determine information regarding the first effect on the drive signal during the antenna operating as the source and the second effect on the drive signal during the antenna operating as the sensor.

17. The method of claim 16, wherein the computing device is in communication via a network that includes at least one of a wireless communication system, a cellular communication system, a wire lined communication system, a non-public intranet system, a public internet system, a local area network (LAN), or a wide area network (WAN).

18. The method of claim 11, wherein the electromagnetic waves include radio frequency (RF) waves.

19. The method of claim 11, wherein the DSC further comprises:
- a power source circuit operably coupled to the antenna via the single line, wherein, when enabled, the power source circuit is configured to provide an analog signal via the single line coupling to the antenna, and wherein the analog signal includes at least one of a DC (direct current) component and an oscillating component; and
- a power source change detection circuit operably coupled to the power source circuit, wherein, when enabled, the power source change detection circuit is configured to:
  - detect the first effect on the drive signal during the antenna operating as the source;
  - detect the second effect on the drive signal during the antenna operating as the sensor; and
  - generate the digital signal representative of the first effect on the drive signal during the antenna operating as the source and the second effect on the drive signal during the antenna operating as the sensor.

20. The method of claim 19 further comprising:
- the power source circuit including a power source to source at least one of a voltage or a current to the antenna via first single line; and
- the power source change detection circuit including:
  - a power source reference circuit configured to provide at least one of a voltage reference or a current reference; and
  - a comparator configured to compare the at least one of the voltage or the current provided to the antenna to the at least one of the voltage reference or the current reference in accordance with producing the drive signal.

* * * * *